US012645790B2

(12) United States Patent
Kim et al.

(10) Patent No.:     US 12,645,790 B2
(45) Date of Patent:         Jun. 2, 2026

(54) MULTI-FACTOR DIGITAL TRANSMISSION SCREENING

(71) Applicant: U.S. Bank National Association, Minneapolis, MN (US)

(72) Inventors: Junghwan Kim, Toronto (CA); Charles Zhou, Columbus, OH (US); Ivko Cvejic, Milwaukee, WI (US); Sameer Samani, Atlanta, GA (US); Ray Matsuzaki, Cincinnati, OH (US); Julia Nolan, Hebron, KY (US)

(73) Assignee: U.S. Bank National Association, Minneapolis, MN (US)

( * ) Notice: Subject to any disclaimer, the term of this patent is extended or adjusted under 35 U.S.C. 154(b) by 62 days.

(21) Appl. No.: 18/907,308

(22) Filed: Oct. 4, 2024

(65) Prior Publication Data

US 2025/0291906 A1      Sep. 18, 2025

Related U.S. Application Data

(60) Provisional application No. 63/564,099, filed on Mar. 12, 2024.

(51) Int. Cl.
G06F 21/55               (2013.01)
(52) U.S. Cl.
CPC ...... G06F 21/554 (2013.01); *G06F 2221/034* (2013.01)
(58) Field of Classification Search
CPC .......................... G06F 21/554; G06F 2221/034
(Continued)

(56) References Cited

U.S. PATENT DOCUMENTS 8,903,756 B2 * 12/2014 Zhao ...................... G06N 5/043
706/55
10,904,270 B2 * 1/2021 Muddu ................... H04L 43/00
(Continued)

OTHER PUBLICATIONS

Geeks for Geeks, "Lex Program to check valid email," retrieved from the Internet at URL: <https://www.geeksforgeeks.org/lex-program-to-check-valid-email/> on Jan. 23, 2025, 7 pages.
(Continued)

*Primary Examiner* — Amare F Tabor
(74) *Attorney, Agent, or Firm* — Alston & Bird LLP

(57) ABSTRACT

Various embodiments are directed to apparatuses, methods, computer program products, and systems related to multi-factor digital transmission screening. In some embodiments, an outbound digital transmission originating from a monitored enterprise management system may be detected. One or more data elements associated with the outbound digital transmission may be applied to one or more anomalous transmission prediction models to generate a prediction associated with the outbound digital transmission. The one or more anomalous transmission prediction models may comprise at least a contextual analytical model configured to generate the prediction associated with the outbound digital transmission based at least in part on historical digital transmission activity data based on a plurality of past digital transmissions originating from the monitored enterprise management system. Responsive to the prediction corresponding to an anomalous transmission prediction, performance of one or more data exfiltration mitigation actions to mitigate risk of data theft may be initiated.

17 Claims, 33 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 11,595,413 | B2* | 2/2023 | Ting | G06N 20/00 |
| 12,223,046 | B2* | 2/2025 | Stockdale | G06F 21/566 |
| 2008/0086436 | A1* | 4/2008 | Zhao | G06F 16/3322 |
| | | | | 706/12 |
| 2020/0231466 | A1* | 7/2020 | Lu | G01N 33/18 |
| 2023/0043793 | A1* | 2/2023 | Shankar | H04L 67/535 |
| 2023/0244981 | A1* | 8/2023 | Cella | B25J 9/1682 |
| | | | | 706/12 |

OTHER PUBLICATIONS

NLTK, "Documentation," 2 pages, (Mar. 7, 2024). [Retrieved from the Internet May 16, 2025: URL: <https://web.archive.org/web/20240307072340/https://www.nltk.org/>].

NVIDIA Corporation, "Welcome to cuML's documentation!," 1 page, (Feb. 28, 2024). [Retrieved from the Internet May 12, 2025: URL: <https://web.archive.org/web/20240228115945/https://docs.rapids.ai/api/cuml/stable/>].

Scikit-Learn, "Machine Learning in Python," 2 pages, (Mar. 10, 2024). [Retrieved from the Internet May 16, 2025: URL: <https://web.archive.org/web/20240310054857/https://scikit-learn.org/stable/>].

Stack Overflow, "How to do a name similarity using clustering," retrieved from the Internet at URL: <https://stackoverflow.com/questions/72939503/how-to-do-a-name-similarity-using-clustering> on Jan. 23, 2025, 2 pages.

Stack Overflow, "Predict whether name is forename or surname from author string (lexical analysis)," retrieved from the Internet at URL: <https://stackoverflow.com/questions/34529175/predict-whether-name-is-forename-or-surname-from-author-string-lexical-analysis> on Jan. 23, 2025, 3 pages.

Wikipedia, "Jaccard index," 5 pages, (Mar. 9, 2024). [Retrieved from the Internet May 12, 2025: URL: <https://web.archive.org/web/20240309120432/https://en.wikipedia.org/wiki/Jaccard_index>].

Wikipedia, "Western Electric rules," 3 pages, (Jan. 8, 2024). [Retrieved from the Internet May 12, 2025: URL: <https://web.archive.org/web/20240108121655/https://en.wikipedia.org/wiki/Western_Electric_rules>].

XGBoost, "XGBoost Documentation," 2 pages, (Mar. 5, 2024). [Retrieved from the Internet May 12, 2025: URL: <https://web.archive.org/web/20240305010950/https://xgboost.readthedocs.io/en/stable/>].

* cited by examiner

FIG. 5A

DATA INGESTION

510a — EMAIL LOGS

520a — TABLE

530a — EMAIL TABLE

540a — HIERARCHY

FEATURES ENGINEERING

550a — FLATTEN MULTIPLE DATASETS

560a

561a — BUILD TEXT SIMILARITY FEATURES BASED ON "TO" AND "FROM"

562a — BUILD EMAIL METADATA FEATURES

570a — BUILD BEHAVIORAL FEAURES

MODEL EXECUTION

580a

581a — LEXICAL XGBOOST CLASSIFIER

582a — BEHAVIORAL XGBOOST CLASSIFIER

583a — SET HEURISTIC FILTERS AROUND LEXICAL AND BEHAVIORAL SCORES

584a — COMBINE OUTPUT FROM LEXICAL AND BEHAVIORAL PREDICTORS

590a — PREDICTION TABLE

Figure 5B:
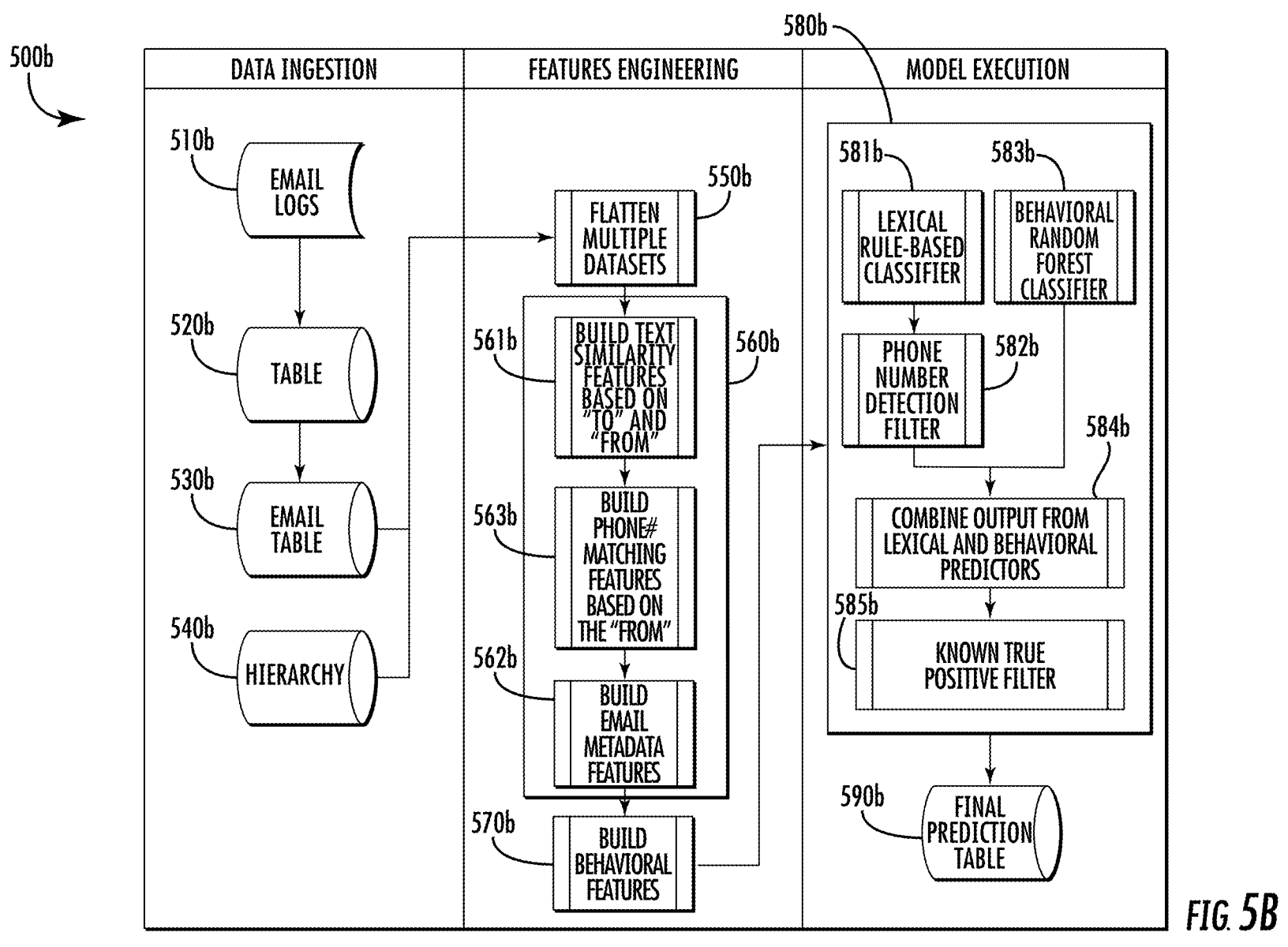

PARSE DIGITAL TRANSMISSION DATA AND USER PROFILE DATA TO IDENTIFY ONE OR MORE DATA ELEMENTS ～902

PROGRAMMATICALLY COMPARING SENDER DATA TO RECIPIENT DATA TO DETERMINE ONE OR MORE SIMILARITY SCORES ～904

GENERATE AN INTRA-TRANSMISSION ANALYTICAL MODEL DATA STRUCTURE BASED ON THE ONE OR MORE SIMILARITY SCORES AND THE ONE OR MORE DATA ELEMENTS ～906

|  | JC_FNAME | JC_HANDLERS | JC_LNAME | JC_NKNAME | ATTACHMENTS | BYTES | EXTERNAL | FORWARDS | REPLIES | RECIPIENTS | LABEL |
|---|---|---|---|---|---|---|---|---|---|---|---|
| COUNT | 998 | 998 | 998 | 998 | 998 | 998 | 998 | 998 | 998 | 998 | 998 |
| MEAN | 0.00704652 | 0.03047584 | 0.03296785 | 0.00131811 | 0.82965932 | 274260.724 | 0.00200401 | 0.08016032 | 0.79859719 | 3.02304609 | 0.09719439 |
| STD | 0.04439624 | 0.13203602 | 0.12689309 | 0.01435211 | 1.37503245 | 1451455.26 | 0.04474369 | 0.27167738 | 1.29829687 | 7.43237449 | 0.2963708 |
| MIN | 0 | 0 | 0 | 0 | 0 | 4169 | 0 | 0 | 0 | 1 | 0 |
| 25% | 0 | 0 | 0 | 0 | 0 | 13902.5 | 0 | 0 | 0 | 1 | 0 |
| 50% | 0 | 0 | 0 | 0 | 0 | 29334.5 | 0 | 0 | 0 | 1 | 0 |
| 75% | 0 | 0 | 0 | 0.2 | 1 | 96611 | 0 | 0 | 1 | 1 | 0 |
| MAX | 0.8 | 0.9 | 0.9 | 0.2 | 16 | 2815600 | 1 | 1 | 11 | 50 | 1 |

1304 — 1402

1304 — 1406

| | AVG_DAYS_BETWEEN | BLANK_SUB_RATIO_IN | BLANK_SUB_RATIO_OUT | DISTRICT_RECEIVERS | DISTINCT_RECIPIENTS | DISTRICT_SENDERS | FWDS_RATIO_IN | FWDS_RATIO_OUT |
|---|---|---|---|---|---|---|---|---|
| COUNT | 1492193 | 1492193 | 1492193 | 1492193 | 1492193 | 1492193 | 1492193 | 1492193 |
| MEAN | 14.40429633 | 0.996667175 | 0.979499683 | 6.887280667 | 1379.487409 | 6.170741988 | 0.990141905 | 0.8813357 |
| STD | 43.52782967 | 0.064139557 | 0.163799334 | 68.56765493 | 2190.109922 | 37.48347355 | 0.1097378 | 0.382101524 |
| MIN | — | — | — | — | — | — | — | — |
| 25% | — | — | — | — | 280 | 2 | — | — |
| 50% | 0 | — | — | — | 708 | 3 | — | — |
| 75% | 8 | — | — | 3 | 1511 | 5 | — | — |
| MAX | 548 | 1 | 1 | 3577 | 23644 | 2253 | 1 | 1 |

| | REPLIES_RATIO_IN | REPLIES_RATIO_OUT | STDDEV_DAYS_BETWEEN | TOTAL_RECEIVERS | TOTAL_RECIPIENTS | TOTAL_SENDERS | TUPLE_TRAFFIC_IN | TUPLE_TRAFFIC_OUT |
|---|---|---|---|---|---|---|---|---|
| COUNT | 1492193 | 1492193 | 1492193 | 1492193 | 1492193 | 1492193 | 1492193 | 1492193 |
| MEAN | 0.945487956 | 0.193564378 | 12.40172326 | 46.2041693 | 6930.593727 | 97.50891205 | 327.7005052 | 582.9333739 |
| STD | 0.271534234 | 0.873678554 | 35.31272174 | 971.0573088 | 13975.77258 | 1759.354245 | 1730.481834 | 16.0726757 |
| MIN | — | — | — | — | — | — | — | — |
| 25% | — | — | — | — | 1159 | 4 | — | 1 |
| 50% | — | 0.58 | — | 3 | 3550 | 10 | 1 | 2 |
| 75% | — | — | 6 | 18 | 8098 | 28 | 2 | 5 |
| MAX | 1 | 1 | 387.49 | 60905 | 255995 | 117564 | 8443 | 5951 |

| | AVG_DAYS_BETWEEN | BLANK_SUB_RATIO_IN | BLANK_SUB_RATIO_OUT | DSTNCT_RECEIVERS | DSTNCT_RECIPIENTS | DSTNCT_SENDERS | FWDS_RATIO_IN | FWDS_RATIO_OUT |
|---|---|---|---|---|---|---|---|---|
| COUNT | 55250 | 55250 | 55250 | 55250 | 55250 | 55250 | 55250 | 55250 |
| MEAN | 13.7140838 | 0.996892489 | 0.971452851 | 6.591221719 | 1386.809683 | 6.220705882 | 0.589363489 | 0.882693213 |
| STD | 41.8910333 | 0.06185216 | 0.191941107 | 66.4033966 | 2186.892553 | 37.9309748 | 0.111442969 | 0.374143787 |
| MIN | — | — | — | — | — | — | — | — |
| 25% | — | — | — | — | 286 | 2 | — | — |
| 50% | 0 | — | — | — | 713 | 3 | — | — |
| 75% | 7.9075 | — | — | 3 | 1518 | 5 | — | — |
| MAX | 548 | 1 | 1 | 3577 | 23454 | 1473 | — | — |

1602

| | REPLIES_RATIO_IN | REPLIES_RATIO_OUT | STDDEV_DAYS_BETWEEN | TOTAL_RECEIVERS | TOTAL_RECIPIENTS | TOTAL_SENDERS | TUPLE_TRAFFIC_IN | TUPLE_TRAFFIC_OUT |
|---|---|---|---|---|---|---|---|---|
| COUNT | 55250 | 55250 | 55250 | 55250 | 55250 | 55250 | 55250 | 55250 |
| MEAN | 0.944845249 | 0.200913308 | 12.13702353 | 46.30685973 | 6971.730697 | 94.25708597 | 3.918733032 | 6.486660533 |
| STD | 0.273942595 | 0.88196707 | 34.57364274 | 1011.548922 | 13871.12612 | 1701.605939 | 22.61634879 | 18.05960309 |
| MIN | — | — | — | — | — | — | — | — |
| 25% | — | — | — | — | 1193 | 4 | 1 | 1 |
| 50% | — | 0.59 | — | 3 | 3589 | 10 | 1 | 2 |
| 75% | — | 1 | 6.3 | 18 | 8134.75 | 29 | 2 | 5 |
| MAX | 1 | 1 | 385.37 | 60905 | 234529 | 112315 | 2021 | 913 |

FIG. 16A

Figure 17A:
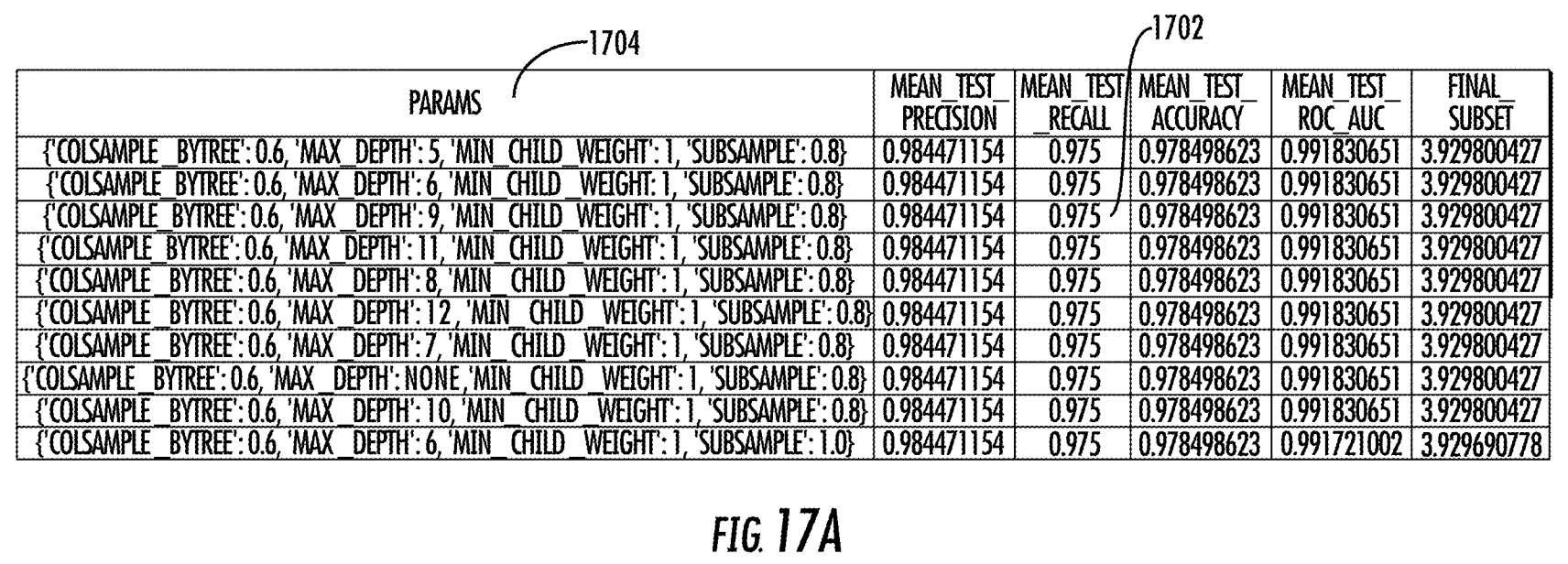

| PARAMS | MEAN TEST_PRECISION | MEAN TEST_RECALL | MEAN TEST_ACCURACY | MEAN TEST_ROC_AUC | FINAL_SUBSET |
|---|---|---|---|---|---|
| {'COLSAMPLE_BYTREE': 0.6, 'MAX_DEPTH': 5, 'MIN_CHILD_WEIGHT': 1, 'SUBSAMPLE': 0.8} | 0.98447154 | 0.975 | 0.978498623 | 0.991830651 | 3.929800427 |
| {'COLSAMPLE_BYTREE': 0.6, 'MAX_DEPTH': 6, 'MIN_CHILD_WEIGHT': 1, 'SUBSAMPLE': 0.8} | 0.98447154 | 0.975 | 0.978498623 | 0.991830651 | 3.929800427 |
| {'COLSAMPLE_BYTREE': 0.6, 'MAX_DEPTH': 9, 'MIN_CHILD_WEIGHT': 1, 'SUBSAMPLE': 0.8} | 0.98447154 | 0.975 | 0.978498623 | 0.991830651 | 3.929800427 |
| {'COLSAMPLE_BYTREE': 0.6, 'MAX_DEPTH': 11, 'MIN_CHILD_WEIGHT': 1, 'SUBSAMPLE': 0.8} | 0.98447154 | 0.975 | 0.978498623 | 0.991830651 | 3.929800427 |
| {'COLSAMPLE_BYTREE': 0.6, 'MAX_DEPTH': 8, 'MIN_CHILD_WEIGHT': 1, 'SUBSAMPLE': 0.8} | 0.98447154 | 0.975 | 0.978498623 | 0.991830651 | 3.929800427 |
| {'COLSAMPLE_BYTREE': 0.6, 'MAX_DEPTH': 12, 'MIN_CHILD_WEIGHT': 1, 'SUBSAMPLE': 0.8} | 0.98447154 | 0.975 | 0.978498623 | 0.991830651 | 3.929800427 |
| {'COLSAMPLE_BYTREE': 0.6, 'MAX_DEPTH': 7, 'MIN_CHILD_WEIGHT': 1, 'SUBSAMPLE': 0.8} | 0.98447154 | 0.975 | 0.978498623 | 0.991830651 | 3.929800427 |
| {'COLSAMPLE_BYTREE': 0.6, 'MAX_DEPTH': NONE, 'MIN_CHILD_WEIGHT': 1, 'SUBSAMPLE': 0.8} | 0.98447154 | 0.975 | 0.978498623 | 0.991830651 | 3.929800427 |
| {'COLSAMPLE_BYTREE': 0.6, 'MAX_DEPTH': 10, 'MIN_CHILD_WEIGHT': 1, 'SUBSAMPLE': 0.8} | 0.98447154 | 0.975 | 0.978498623 | 0.991830651 | 3.929800427 |
| {'COLSAMPLE_BYTREE': 0.6, 'MAX_DEPTH': 6, 'MIN_CHILD_WEIGHT': 1, 'SUBSAMPLE': 1.0} | 0.98447154 | 0.975 | 0.978498623 | 0.991721002 | 3.929690778 |

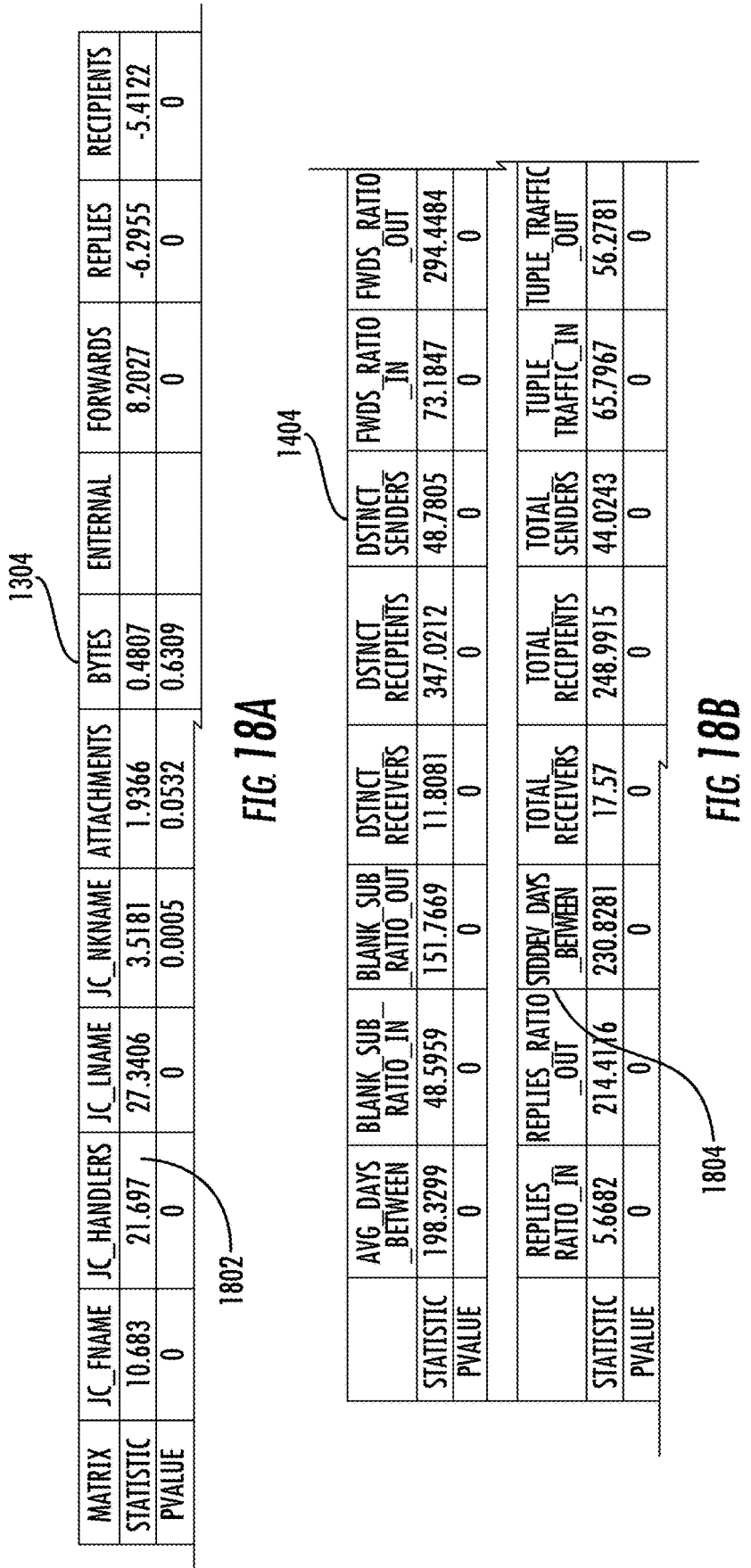

| MATRIX | JC_FNAME | JC_HANDLERS | JC_LNAME | JC_NKNAME | ATTACHMENTS | BYTES | ENTERNAL | FORWARDS | REPLIES | RECIPIENTS |
|---|---|---|---|---|---|---|---|---|---|---|
| STATISTIC | 10.683 | 21.697 | 27.3406 | 3.5181 | 1.9366 | 0.4807 | | 8.2027 | -6.2955 | -5.4122 |
| PVALUE | 0 | 0 | 0 | 0.0005 | 0.0532 | 0.6309 | | 0 | 0 | 0 |

FIG 18A

| | AVG_DAYS BETWEEN | BLANK_SUB_RATIO_IN | BLANK_SUB_RATIO_OUT | DSTNCT RECEIVERS | DSTNCT RECIPIENTS | DSTNCT SENDERS | FWDS_RATIO_IN | FWDS_RATIO_OUT |
|---|---|---|---|---|---|---|---|---|
| STATISTIC | 198.3299 | 48.5959 | 151.7669 | 11.8081 | 347.0212 | 48.7805 | 73.1847 | 294.4484 |
| PVALUE | 0 | 0 | 0 | 0 | 0 | 0 | 0 | 0 |

| | REPLIES_RATIO_IN | REPLIES_RATIO_OUT | STDDEV_DAYS_BETWEEN | TOTAL RECEIVERS | TOTAL RECIPIENTS | TOTAL SENDERS | TUPLE TRAFFIC_IN | TUPLE_TRAFFIC_OUT |
|---|---|---|---|---|---|---|---|---|
| STATISTIC | 5.6682 | 214.4176 | 230.8281 | 17.57 | 248.9915 | 44.0243 | 65.7967 | 56.2781 |
| PVALUE | 0 | 0 | 0 | 0 | 0 | 0 | 0 | 0 |

FIG 18B

| | FORWARDS_REMOVED | JC_FNAME_REMOVED | JC_HANDLERS_REMOVED | JC_LNAME_REMOVED | JC_NKNAME_REMOVED | RECIPIENTS_REMOVED | REPLIES_REMOVED | FULL VARIABLES |
|---|---|---|---|---|---|---|---|---|
| ACCURACY | 0 | 0 | 0.1 | 0.3 | -0.1 | 0 | 0 | 99.4 |
| RECALL | 0 | -1.1 | -1.1 | -2.1 | -2.1 | 0 | 0 | 95.9 |
| PRECISION | 0 | 1 | 0 | -1.1 | 1 | 0 | 0 | 97.9 |
| ROC AUC | 0 | -0.4 | 0.5 | -1.1 | -0.9 | 0 | 0 | 97.8 |

2502

2500

2602

| MATRIX | AVG_DAYS_BETWEEN_REMOVED | BLANK_SUB_RATIO_IN_REMOVED | BLANK_SUB_RATIO_OUT_REMOVED | DSTNCT_RECEIVERS_REMOVED | FULL VARIABLES |
|---|---|---|---|---|---|
| ACCURACY | 0 | 0 | -0.1 | 0 | 99.4 |
| RECALL | -1.1 | -0.1 | -3.2 | -0.5 | 93.5 |
| PRECISION | 0.1 | 0.7 | -0.5 | -0.1 | 86.4 |
| ROC AUC | -0.5 | 0 | -1.6 | -0.2 | 96.5 |
| MCC | -0.4 | 0.4 | -1.8 | -0.2 | 89.5 |

| MATRIX | DSTNCT_RECIPIENTS_REMOVED | DSTNCT_SENDERS_REMOVED | FWDS_RATIO_IN_REMOVED | FWDS_RATIO_OUT_REMOVED | FULL VARIABLES |
|---|---|---|---|---|---|
| ACCURACY | 0 | 0 | 0 | -0.1 | 99.4 |
| RECALL | 0 | -0.5 | -0.3 | -1.1 | 93.5 |
| PRECISION | 0.6 | 0.2 | -0.2 | -0.2 | 86.4 |
| ROC AUC | 0 | -0.2 | -0.1 | -0.5 | 96.5 |
| MCC | 0.4 | 0 | -0.2 | -0.6 | 89.5 |

| MATRIX | REPLIES_RATIO_IN_REMOVED | REPLIES_RATIO_OUT_REMOVED | STD_DAYS_BETWEEN_REMOVED | TOTAL_RECEIVERS_REMOVED | FULL VARIABLES |
|---|---|---|---|---|---|
| ACCURACY | 0 | -0.2 | 0 | 0 | 99.4 |
| RECALL | -0.1 | -3.5 | 0.2 | 0.2 | 93.5 |
| PRECISION | 0.1 | -2.5 | 0.2 | 0.5 | 86.4 |
| ROC AUC | 0 | -1.7 | 0.1 | 0.1 | 96.5 |
| MCC | 0 | -3 | 0.3 | 0.5 | 89.5 |

| MATRIX | TOTAL_RECIPIENTS_REMOVED | TOTAL_SENDERS_REMOVED | TURPLE_TRAFFIC_IN_REMOVED | TURPLE_TRAFFIC_OUT_REMOVED | FULL VARIABLES |
|---|---|---|---|---|---|
| ACCURACY | 0 | 0 | -0.1 | 0 | 99.4 |
| RECALL | -0.5 | 0.2 | -0.6 | 0.2 | 93.5 |
| PRECISION | 0.2 | 0.1 | -0.4 | -0.3 | 86.4 |
| ROC AUC | -0.2 | 0.1 | -0.3 | 0.1 | 96.5 |
| MCC | -0.1 | 0.2 | -0.4 | 0 | 89.5 |

*FIG. 26*

MULTI-FACTOR DIGITAL TRANSMISSION SCREENING

CROSS REFERENCE TO RELATED APPLICATIONS

This application claims priority to U.S. Provisional Patent Application No. 63/564,099, filed on Mar. 12, 2024, which is incorporated herein by reference in its entirety.

BACKGROUND

Complexities arise with respect to screening digital transmissions sent from within an enterprise system that include enterprise-specific, confidential, and/or privileged information to prevent data exfiltration from the enterprise system, where the complexities are associated with, for example, inspecting each of the digital transmissions sent from the enterprise system to an external recipient to detect exfiltration activities rapidly and with a high degree of accuracy. Through applied effort, ingenuity, and innovation, these identified deficiencies and problems have been solved by developing solutions that are configured in accordance with the embodiments of the present disclosure, many examples of which are described in detail herein.

BRIEF SUMMARY

Various embodiments are directed to apparatuses, methods, systems, computer-readable media, and computer program products for multi-factor digital transmission screening. In various embodiments, for example, a method may be provided that includes applying one or more, anomalous transmission prediction models, which may include trained machine learning models, to a digital transmission to generate an indication of anomalous transmission.

In some embodiments, applying the one or more anomalous transmission prediction models comprises applying at least two anomalous transmission prediction models to digital transmission data associated with the digital transmission. The two anomalous transmission prediction models may be applied in parallel or sequentially. Examples of the at least two anomalous transmission prediction models include (a) a first anomalous transmission prediction model configured to predict whether the digital transmission is an anomalous transmission based on one or more lexical features defined by the digital transmission, and (b) a second anomalous transmission prediction model configured to predict whether the digital transmission is an anomalous transmission based on one or more contextual features defined by historical digital transmission activity data (e.g., contextual features indicative of an altered or otherwise anomalous behavior). For example, the at least two anomalous transmission prediction models may include an intra-transmission analytical model and a contextual analytical model. In some embodiments one or more of the intra-transmission analytical model or the contextual analytical model comprises a machine learning model. In an example embodiment, at least the contextual analytical model comprises a machine learning model. In some embodiments, the intra-transmission analytical model is a rules-based model.

In some embodiments, applying the intra-transmission analytical model includes executing at least one natural language processing operation with respect to the digital transmission data associated with the digital transmission. In some embodiments, the digital transmission is associated with a user identifier. Applying the contextual analytical model may include generating a contextual analytical model output based at least in part on historical digital transmission data associated with the user identifier.

In response to determining that the digital transmission is an anomalous transmission, the method may further include generating an anomalous transmission flag associated with the digital transmission data and may include storing updated digital transmission data associated with the digital transmission at an enterprise system data repository, the updated digital transmission data including the anomalous transmission flag associated with the digital transmission data. In some embodiments, additional or alternative responsive measures may include intercepting the digital transmission to at least temporarily prevent an external transmission of the digital transmission from an enterprise system to an external digital transmission system.

In some embodiments, responsive to generating the anomalous transmission flag associated with the digital transmission data, the method may include transmitting or diverting at least a portion of the digital transmission data associated with the anomalous transmission flag to a client device (e.g., a device not in the original chain of digital transmission). The at least a portion of the digital transmission data may include some or all of the digital transmission (e.g., a text string and/or attachment associated with the digital transmission). The digital transmission may be configured for rendering at a display of the client device.

Other embodiments may include at least one non-transitory computer-readable medium comprising computer program instructions, the computer program instructions configured to, when executed by one or more processors, perform any of the foregoing methods. In yet some other embodiments, a system and/or one or more apparatuses may be provided that include at least one non-transitory computer-readable medium comprising computer program instructions, the computer program instructions configured to, when executed by one or more processors, cause the system to perform any of the foregoing methods.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 5a illustrates an example system architecture and various associated operation flows in accordance with one or more embodiments of the present disclosure.

FIG. 5b illustrates another example system architecture and various associated operation flows in accordance with one or more embodiments of the present disclosure.

FIG. 15a illustrates a contextual analytical model training data feature statistics in accordance with an example embodiment of the present disclosure.

FIG. 16a illustrates a contextual analytical model test data feature statistics in accordance with an example embodiment of the present disclosure.

FIG. 17a illustrates a portion of a first quantitative results of parameters obtained with grid search for an intra-transmission analytical model training data set in accordance with an example embodiment of the present disclosure.

FIG. 18a illustrates two-sample t-test results for an intra-transmission analytical model in accordance with an example embodiment of the present disclosure.

FIG. 18b illustrates two-sample t-test results for a contextual analytical model in accordance with an example embodiment of the present disclosure.

FIG. 26 illustrate sensitivity test data for a contextual analytical model in accordance with an example embodiment of the present disclosure.

DETAILED DESCRIPTION OF VARIOUS EMBODIMENTS

Figure 1:
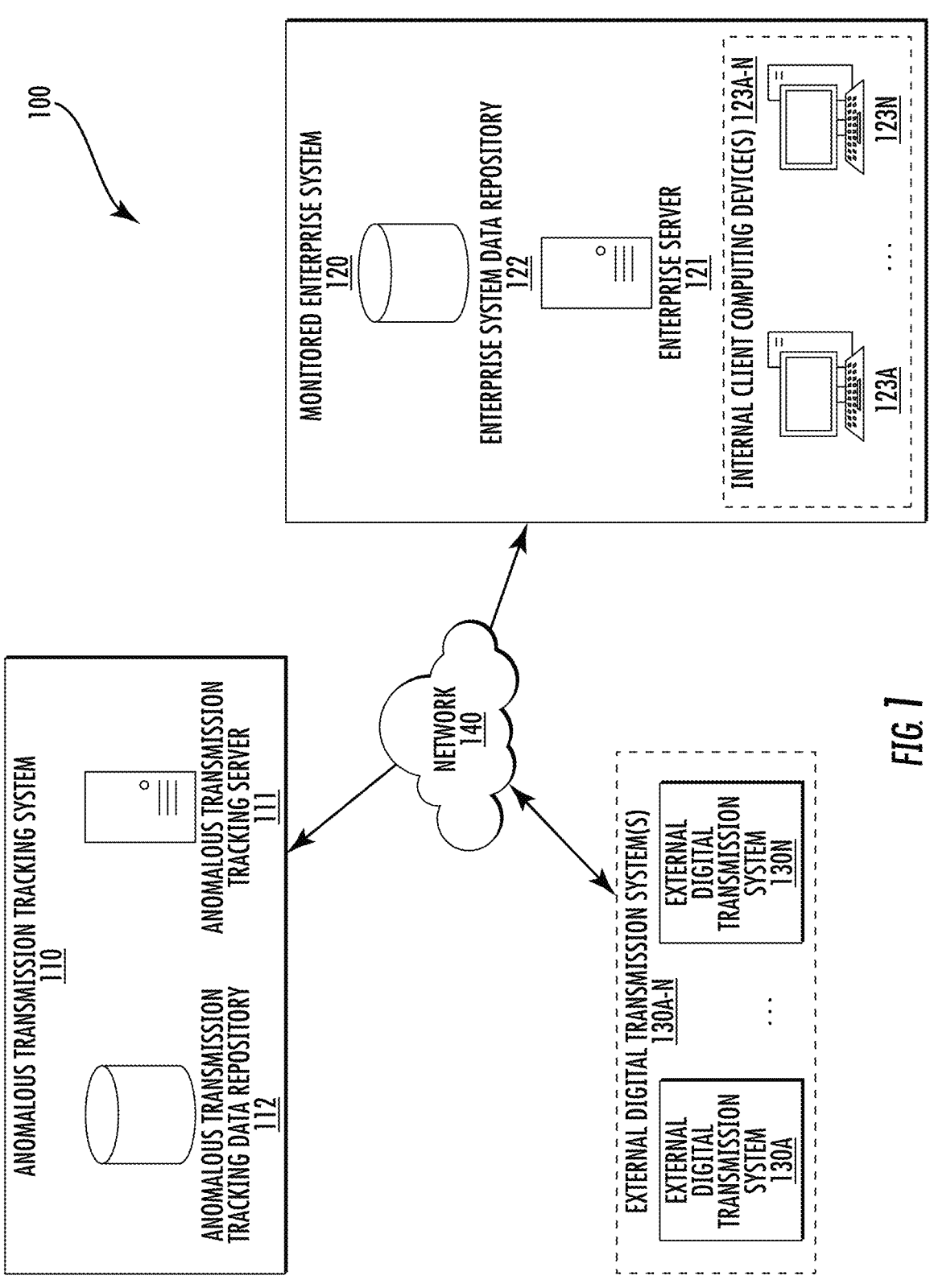
FIG. 1 illustrates a system that may benefit from technologies described herein.

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Embodiments of the present disclosure address technical problems associated with rapidly (e.g., without apparent interruption to the underlying transmission between two computing systems, apparatuses (e.g., user devices), or the like) and accurately detecting a digital transmission sent from within an enterprise system that includes enterprise-specific, confidential, and/or privileged information to prevent data exfiltration from within the enterprise system. For example, various embodiments of the present disclosure relate to an anomalous transmission tracking system configured to use one or more anomalous transmission prediction models to detect that a digital transmission sent from an enterprise server is likely to define an anomalous transmission in order to mitigate the associated risk of data exfiltration that accompanies external data transmissions sent from the enterprise system.

Large enterprises, such as financial institutions, have long been a lucrative target for insider attacks. According to a 2020 cyber breaches worldwide report published in Statista.com, insider threat was an element of data breach in 50 percent of the data breach occurrences. The most common type of insider threat incident was data exfiltration via digital transmissions such as emails, at an alarming rate of 43.75% of the total insider threat incidents. Data theft leads to loss of intellectual property to the organizations and potentially cause huge losses and damage. Large organizations may have millions of outbound emails per day making it impossible to effectively and efficiently screen each one, either manually or using existing technology, and particularly impossible to screen while seamlessly maintaining delivery of normal, non-anomalous emails. Conducting a manual review of each of organization's outbound emails requires a paramount effort on behalf of the organization.

Aspects described herein may resist and mitigate data theft of corporate assets via emails by narrowing down to the potential subset of emails that needs additional scrutiny (e.g., administrator or other manual review) via automated screening and/or by improving the downstream interception and analysis of such emails. The automated screening may, in some instances, divert anomalous emails into a second processing flow for further analysis or perform other downstream actions. Examples of other downstream actions beyond data security include user behavior analytics and detecting undesirable user behavior involving email, among others. Embodiments described herein may further provide the aforementioned resistance and mitigation with accuracy and speed that allows normal outbound emails (e.g., non-anomalous digital transmissions that must be sent in the ordinary course of the enterprise) to continue substantially uninterrupted to their recipient system.

Cybersecurity is a fast-evolving industry, as hackers/insiders and security providers both continuously try to outsmart each other. Preventing and detecting attacks by insiders has proven to be difficult as they are often able to capitalize on their familiarity with the enterprise's systems to launch attacks without attracting notice. Accordingly, there is a need for understanding user behavior to enable effective threat detection and response and for continually updating automated screening tools to adjust for changes and variations in exfiltration techniques. This disclosure includes two anomalous transmission prediction models: intra-transmission analytical model (also referred to herein interchangeably as a lexical model or personal email lexical model) and contextual analytical model (e.g., also referred to herein interchangeably a behavioral model or personal email behavioral model) to identify potential personal/non-business-related emails (e.g., anomalous transmission). The personal email behavioral model may be based on user behavior analytics and the personal email lexical model may be based on lexical similarity (e.g., similarity between a sender email address and a recipient email address) in accordance with the various embodiments disclosed herein.

In some embodiments, each model may be run on outbound digital transmission data (e.g., email metadata) and used to independently predict the likelihood of an anomalous transmission. The models may be run entirely independently (e.g., without relation to the other model's timing), concurrently, or sequentially, and the model results may be combined in some embodiments to produce better coverage (recall) of personal emails. For example, either model independently predicting an anomalous transmission may be sufficient to trigger a flag and secondary analysis of the transmission. The models may be based on Natural Language Processing (NLP) and other machine learning techniques and may facilitate automatic determination of whether an outbound email is a personal email communication as opposed to business communication, which may trigger a heightened exfiltration review. The system may then take one or more programmatic (e.g., automatic) steps to reduce the threat of exfiltration and/or stop subsequent exfiltration, including but not limited to generating a data set of flagged digital transmissions for subsequent screening, locking or suspending a user's account, generating a prompt or alert on another enterprise user's device, or the like. In some examples, other analyses are performed or other data sets are gathered in between the flagging and detailed review. For instance, when an email is flagged for further review (e.g., manual review), the content of the email (e.g., subject, body, and any attachments) can be sent for review. In some instances, one or more of the sender's other messages or their communication history is sent for review. In still further instances, such content and history are not sent for review. But in some implementations, downstream analysis may obtain relevant information from a message database or other datastore using an email message identifier or a sender identifier.

Embodiments herein overcome the aforementioned drawbacks associated with manual review of outbound digital transmissions, and more, by programmatically inspecting outbound digital transmissions generated by the enterprise system using one or more anomalous transmission prediction models to screen for anomalous transmissions that may represent an increased risk of exfiltration. The present disclosure practically minimizes the amount of unnecessary manual review being executed by reviewers associated with the enterprise system, and further, technically reduces the computational power and processing bandwidth that is required of the enterprise system by drastically reducing the size of the datasets and corresponding communications that are processed for manual review.

Further, some embodiments of the present disclosure are configured to screen outbound digital transmissions associated with the enterprise system using a programmatic inspection of the data transmission before the digital transmission is sent to the external client computing device associated with the recipient (e.g., before the digital transmission leaves the enterprise system in some embodiments), and the present disclosure enables increased data security operations without effecting the transmission time associated with the digital transmission. By using the one or more anomalous transmission prediction models to detect that an outbound digital transmission is an anomalous transmission (e.g., before the digital transmission is transmitted from the enterprise system in some embodiments), the present disclosure implements proactive operations to keep potentially dangerous, confidential, sensitive, or otherwise private data securely stored on a network and prevents unauthorized digital transmissions and/or data exfiltration with increased efficiency, accuracy, and speed that makes large scale exfiltration screening functional without disrupting the normal flow of non-anomalous transmissions that must be sent from the network. For example, some embodiments of the present disclosure intercept an outbound digital transmission and programmatically detects whether the outbound digital transmission is an anomalous transmission without affecting the transmission time to an extent that is practically perceivable by an external recipient of the programmatically inspected digital transmission. For example, the present disclosure uses one or more anomalous transmission prediction models (e.g., intra-transmission analytical models and/or contextual analytical models) to detect anomalous transmissions at a speed that is not practically feasible for an analogous manual review process, such that, in some embodiments, anomalous transmissions may be identified prior to the digital transmission being sent to the recipient entity and standard transmissions that do not pose a data privacy risk may be allowed to proceed to the external recipient without requiring any delay in transmission that is required for manual review processes.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network," which may include networks of networks, such as the internet. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such media may take many forms, non-limiting examples of which are provided herein. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization, or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer may read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

The terms "enterprise system," "enterprise management system," or "monitored enterprise management system" are used interchangeably to refer to one or more computing devices embodied in hardware, software, firmware, and/or a combination thereof, operated by and/or otherwise controlled by an enterprise entity (e.g., a business or an organization) or an agent thereof for purposes of supporting one or more actions performed by the enterprise entity. For example, an enterprise system may include a software program, application, platform, or service that is configured to communicate with an external digital transmission system for purposes of performing one or more actions that define various functions and/or operations of the enterprise system, including a communication operation defined by a digital transmission generated by an internal client computing device of the enterprise system being transmitted to one or more external digital transmission systems (e.g., an external client computing device associated with a designated recipient of the digital transmission). For example, as described herein, an enterprise system is a system operated by an enterprise such as a bank having a plurality of users, each being capable of initiating and/or receiving a digital transmission from/to the enterprise system. In certain embodiments, the enterprise system is defined by a collection of computing devices including an enterprise server, an enterprise system data repository, and one or more networked client devices.

In some embodiments, the enterprise system is embodied by one or more computing devices configured to perform functionality associated with the generation and transmittal of one or more digital transmissions generated by internal client computing devices associated with the enterprise system. In certain embodiments, the enterprise system comprises additional storage repositories (e.g., databases) associated with tasks, functions, and/or actions that may be performed via the enterprise system, such as, for example, tasks, functions, and/or actions that may be performed in order to facilitate one or more functions or operations of the enterprise system. In some embodiments, the enterprise system comprises and/or otherwise communicates with the anomalous transmission tracking system, and vice versa, through one or more application program interfaces (APIs). In certain circumstances, an enterprise system operates on a compiled code base or repository that is separate and distinct from that which supports the anomalous transmission tracking system. Further, in certain embodiments, the anomalous transmission tracking system makes up part of the enterprise system, such that the enterprise system operates on a compiled code base or repository that is at least partially utilized to support the anomalous transmission tracking system.

The term "enterprise server" or "monitored enterprise server" refers to one or more computing devices associated with an enterprise system and configured to receive, store, and otherwise process data in order to enable networked communication of digital transmissions between networked client computing devices connected thereto, including between internal client computing devices and external client computing devices defined by external digital transmission systems. In various embodiments, an enterprise server is configured to receive, generate, transmit, store, and/or otherwise process data including data structures, data elements, data packets, and/or the like to be communicated between the verification system and one or more third-party systems. For example, an enterprise server is configured to execute various instructions, actions, and/or the like so as to enable an internal client computing device of the enterprise system to generate a digital transmission and execute an external digital transmission operation to provide the digital transmission to an external digital transmission system (e.g., via a network). Further, an enterprise server is configured to execute various instructions, actions, and/or the like so as to enable an anomalous transmission tracking system (e.g., an anomalous transmission tracking server) communicatively connected thereto to execute at least a portion of a digital transmission inspection operation. In certain embodiments, the functionality of the enterprise server is provided via a single server, or, alternatively, via a collection of servers having a common functionality, or, in further alternative embodiments, the functionality of the enterprise servers is segmented among a plurality of servers or collections of servers performing subsets of the described functionality of the enterprise server.

The terms "client device," "computing device," "client computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" and the aforementioned similar terminology may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and the like.

"Client device" and the aforementioned similar terminology may include remotely accessible computing devices, such as user terminals providing access to a portion of a network server. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like. A client computing device may be an internal client computing device associated with an enterprise system, or, alternatively, may be an external client computing device associated with an external data transmission system.

The term "enterprise system data repository" refers to a database or computing location associated with an enterprise system where data is stored, accessed, modified, and otherwise maintained by the enterprise system. The enterprise system data repository may be used by the enterprise system to store data, including digital transmission data, which may be accessed by an anomalous transmission tracking system in order to facilitate at least one operation of the anomalous transmission tracking system, such as, for example, one or more operations of a digital transmission inspection workflow. The enterprise system data repository facilitates storage of various data, including digital transmission data, user profile data, and historical digital transmission activity data defined by a data storage protocol that is native to the enterprise system. In certain embodiments, the enterprise system data repository embodies a data storage device or devices, a separate database server or servers, or as a combination of data storage devices and separate database servers. Further, in some embodiments, the enterprise system data repository may be embodied as a distributed repository such that some of the stored data is stored centrally in a location within the enterprise system and other data stored in a single remote location or a plurality of remote locations. Alternatively, in some embodiments, the enterprise system data repository may be distributed over a plurality of remote storage locations only such as in a cloud storage environment.

"User" in this context refers to an individual, a group of individuals, a business, an organization, and/or the like that access an enterprise system using one or more networked devices. In certain embodiments, a user is associated with a system enterprise embodied by an enterprise (e.g., a business) that operates the enterprise system, such as an employee of the enterprise. The relationship of the enterprise with which the user is associated to the enterprise system is defined by access credentials that are common, at least in part, to all users associated with that organization.

The terms "user profile," "user account," and "user account details" refer to information associated with a user that is stored and tracked by the enterprise system, including, for example, a user identifier, an email address (e.g., any portion of or the entirety of an email address, including an email handler and/or domain) a real name (e.g., Jane Smith), a username (e.g., janesmith01), a password, a user first name, a user last name, a user nickname, a time zone, metadata indicating historical digital transmission activity data associated with a user identifier, and/or the like. In an example, an email address may be "JohnDoe123@example.com" and the associated email handler may be "JohnDoe123".

The term "user identifier" refers to one or more items of data by which a particular user of the enterprise system may be uniquely identified. For example, a user identifier may correspond to a particular set of bits or a particular sequence of data that uniquely identifies a user, such as ASCII text, a pointer, a memory address, and the like.

The term "anomalous transmission tracking system" may refer to a hardware and software platform for executing a multi-factor transmission screening operation for one or more outbound digital transmissions associated with the enterprise system. The anomalous transmission tracking system comprises at least one computing device configured to predict whether an outbound digital transmission generated within the enterprise system defines an anomalous transmission by executing one or more anomalous transmission prediction models. The anomalous transmission tracking system comprises an apparatus comprising at least one processor, and at least one non-transitory memory comprising instructions that, with the at least one processor, cause the apparatus to execute one or more inspection operations defining a digital transmission inspection workflow associated with a digital transmission identifier.

In some examples, the anomalous transmission tracking system may take the form of one or more central anomalous transmission tracking servers disposed in communication with one or more additional servers running software applications and having access to one or more databases storing digital content items, application-related data, and/or the like. In certain embodiments, the anomalous transmission tracking system is defined by a collection of computing devices including an anomalous transmission tracking server and an anomalous transmission tracking system data repository. In certain embodiments, an anomalous transmission tracking system is embodied by one or more computing devices configured to execute one or more digital transmission inspection operations so as to define a digital transmission inspection workflow by facilitating various data processes configured to result in prediction that a digital transmission associated with the enterprise system is an anomalous transmission.

The term "anomalous transmission tracking server" refers to one or more computing devices communicatively connected with or otherwise functioning with or in an enterprise system and configured to receive, store, and otherwise process data in order to facilitate execution of a digital transmission inspection workflow. In various embodiments, an anomalous transmission tracking server is configured to receive, generate, transmit, store, and/or otherwise process data including data structures, data objects, data elements, and/or the like to be used within the anomalous transmission tracking system and/or communicated between the anomalous transmission tracking system and the enterprise system. For example, an anomalous transmission tracking server is configured to execute various instructions, actions, and/or the like so as to enable the anomalous transmission tracking system to execute at least a portion of a digital transmission inspection operation. The functionality of the anomalous transmission tracking server may be provided via a single server or a collection of servers having a common functionality, or the functionality of the anomalous transmission tracking server may be segmented among a plurality of servers or collections of servers performing subsets of the described functionality of the anomalous transmission tracking server, such as in a cloud networking environment.

In certain embodiments, the anomalous transmission tracking server is configured to generate an intra-transmission analytical model data structure configured to be provided to an intra-transmission analytical model by executing one or more data processing operations (e.g., natural language processing) with respect to digital transmission data retrieved from the enterprise system. Further, the anomalous transmission tracking server is configured to execute an intra-transmission analytical model to detect whether the digital transmission defines an anomalous transmission. In certain embodiments, the anomalous transmission tracking server is configured to generate a contextual analytical model data structure configured to be provided to a contextual analytical model by executing one or more data processing operations with respect to historical digital transmission activity data retrieved from the enterprise system. Further, the anomalous transmission tracking server is configured to execute a contextual analytical model to detect whether the digital transmission defines an anomalous transmission.

In certain embodiments, the anomalous transmission tracking server is configured to detect a digital transmission generated by the enterprise system, identify the digital transmission as an outbound digital transmission, intercept the digital transmission, and execute a digital transmission inspection workflow resulting in a prediction that the digital transmission is a standard transmission without affecting the transmission time define by the transmission of the digital transmission from the internal client computing device to the external client computing device.

The term "anomalous transmission tracking data repository" may refer to a database or computing location associated with an anomalous transmission tracking system where data is stored, accessed, modified, and otherwise maintained by the anomalous transmission tracking system. The anomalous transmission tracking system data repository may be used by the anomalous transmission tracking system to store data, including processed digital transmission data retrieved from the enterprise system and intra-transmission analytical model data structures and contextual analytical model data structures, in order to facilitate at least one operation of the anomalous transmission tracking system, such as, for example, a digital transmission inspection operation. The anomalous transmission tracking system data repository facilitates storage of various data, including intra-transmission analytical model data structures and contextual analytical model data structures, in data formats configured to be operable with the intra-transmission analytical model and the contextual analytical model, respectively. In certain embodiments, the anomalous transmission tracking system database may embody a data storage device or devices, a separate database server or servers, or as a combination of data storage devices and separate database servers.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose-built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or another computing device.

In some embodiments, a "component" may correspond to a service. Additionally or alternatively, in some embodiments, a component may correspond to a library (e.g., a library of components, a library of services, etc.). Additionally or alternatively, in some embodiments, a component may correspond to one or more modules. Additionally or alternatively, in some embodiments, a component may correspond to one or more machine learning models. For example, in some embodiments, a component may correspond to a service associated with a type of service, a service associated with a type of library, a service associated with a type of feature, a service associated with an executable code, two or more interconnected services, and/or another type of service associated with an enterprise server.

The term "workflow" refers to a set of actions that represent one or more processes related to an enterprise system and/or one or more components. A workflow may include a set of statuses and/or a set of transitions that represent one or more processes. For example, a status may represent a state of an action and/or a task performed with respect to an enterprise system and/or one or more components. A transition may represent a link between status. Actions for a workflow may be configured to dynamically alter a current status of a workflow and/or to initiate a transition.

The terms "internal component," "internal resource," or similar terms refer to a program, application, platform, or component that is configured by a developer to provide functionality to another one or more of their programs, applications, platforms, or components, either directly or indirectly through one or more other components, as opposed to using an external component. Internal components operate on a compiled code base or repository that is at least partially shared by an application which utilizes the functionality provided by the internal component. In some embodiments, the application code base and the internal component code base are hosted on the same computing device or across an intranet of computing devices. An application communicates with internal components within a shared architectural programming layer without external network or firewall separation.

In some embodiments, an internal component is used only within the application layer which utilizes the internal components functionality. Information related to internal components may be collected and compiled into component objects which may also be referred to as internal component objects. An example embodiment of an internal component is a load balancer configured for routing and mapping API and/or component locations. Internal components may be configured for information-based shard routing, or in other words, routing, and mapping API and/or component locations based on predefined custom component requirements associated with an application. For example, an internal component may be configured to identify where communication traffic originates from and then reply to the communications utilizing another component for reply communication.

The term "internal entity" refers to refers to an entity, module, service, or circuitry associated with the enterprise system (e.g., the enterprise server) that is configured to transmit a digital transmission generated by an internal client computing device to a client computing device associated with digital transmission recipient. As an example, an internal entity is configured to transmit an outbound digital transmission associated with an external recipient to an external entity defined by an external digital transmission system.

The term "external entity" refers to refers to an entity, module, service, or circuitry associated with an external computing system (e.g., an external digital transmission system) that is configured to receive an outbound digital transmission transmitted from an internal entity defined by the enterprise system. As an example, an anomalous transmission tracking system may intercept an outbound digital transmission as the outbound digital transmission is in transit between an internal entity and the external entity (e.g., after the digital transmission is transmitted from the internal entity and before the digital transmission is received by the external entity).

The term "interface element" refers to a rendering of a visualization and/or human interpretation of data associated with an enterprise system. In one or more embodiments, an interface element may additionally or alternatively be formatted for transmission via one or more networks. In one or more embodiments, an interface element may include one or more graphical elements and/or one or more textual elements.

The term "digital transmission data" and similar terms are used interchangeably to refer to data related to any particular data transmission. Non-limiting examples of digital transmission data include one or more of digital transmission identifier, digital transmission message content, digital transmission metadata, a sender user identifier, a recipient identifier, and/or the like. For example, digital transmission data may include metadata associated with a digital transmission. In example embodiments, the digital transmission data need not include every possible data type/field. For example, in some instances, the digital transmission data may be generated without digital transmission message content (e.g., body of the email, subject line of the email, etc.) and/or the digital transmission data may be edited to remove the digital transmission message content prior to being used with the various embodiments discussed herein. For example, the digital transmission data may include digital transmission metadata associated with an email communication, such as sender, recipient, etc. without the contents of the message, such as the body of the email, subject line of the email, etc. In some examples, the processes described herein may further protect user privacy and provide data security via storing digital transmission metadata only.

The term "digital transmission identifier" refers to one or more items of data by which a digital transmission may be uniquely identified.

The term "digital transmission metadata" refers to one or more items of digital transmission data associated with a digital transmission other than the digital transmission message content, such as, but not limited to, one or more items of data associated with a digital transmission identifier, attachment count data, digital transmission size data, keyword count data (e.g., "reply" count data, "forward" count data, "external" count data), and recipient count data.

The term "anomalous digital transmission flag" refers to an item of data associated with a digital transmission data structure that is indicative of whether a particular digital transmission associated with the data structure has been predicted by the anomalous transmission tracking system to be an anomalous transmission.

The term "anomalous transmission" refers to a digital transmission associated with the enterprise system that is generated by an internal client computing device and defines a personal digital transmission designated for transmission to an external personal account associated with an external digital transmission system that is accessible to the sender user. For example, an anomalous transmission is defined by an "email home," which is sent from the enterprise email account of the sender user to an external personal email account.

The term "standard transmission" refers to a digital transmission associated with the enterprise system that is not an anomalous transmission. For example, a standard transmission may be a digital transmission generated by an internal client computing device that defines a non-personal digital transmission such that the digital transmission does not represent a communication from a sender user to an external personal account accessible to the sender user that is associated with an external digital transmission system (e.g., an email home by the sender from an enterprise-associated email address).

The term "sender identifier" refers to one or more items of data by which a particular user of the enterprise system that sends a particular digital transmission may be uniquely identified. For example, a sender identifier associated with a particular digital transmission may be one or more items of data by which a particular user associated with a user profile that is associated with the client device from which the digital transmission was sent may be uniquely identified. For example, a sender identifier may comprise ASCII text, a pointer, a memory address, and the like.

The term "recipient identifier" refers to one or more items of data by which a particular user of a particular user of an external digital transmission enterprise system and/or the enterprise system that is the intended recipient of a digital transmission may be uniquely identified. For example, a recipient identifier may comprise ASCII text, a pointer, a memory address, and the like.

The terms "machine learning model," "trained machine learning model," "model," "one or more models," or "ML" refer to a machine learning task or mechanism. Machine learning is a method used to devise complex models and algorithms that lend themselves to prediction. A machine learning model is a computer-implemented algorithm that may learn from data with or without relying solely on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like. In some embodiments, the machine learning model may include one or more deep learning processes.

A machine learning model is initially fit or trained on a training dataset (e.g., a set of examples used to fit the parameters of the model). The model may be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting may include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g., the number of hidden units in a neural network). In some embodiments, the model may be trained and/or trained in real-time (e.g., online training) while in use.

The machine learning models as described herein may make use of multiple machine learning engines, e.g., for analysis, transformation, and other needs. The system may train different machine learning models for different needs and different machine learning-based engines. The system may generate new models (based on the gathered training data) and may evaluate their performance against the existing models. Training data may include any of the gathered information, as well as information on actions performed based on the various recommendations.

The machine learning models may be any suitable model for the task or activity implemented by each machine learning-based engine. Machine learning models may be some form of neural network. The underlying machine learning models may be learning models (supervised or unsupervised). As examples, such algorithms may be prediction (e.g., linear regression, logistic regression) algorithms, classification (e.g., decision trees, k-nearest neighbors) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative models (e.g., GANs).

In some embodiments, machine learning models may implement statistical algorithms, such as dimensionality reduction, hypothesis testing, one-way analysis of variance (ANOVA) testing, principal component analysis, conjoint analysis, neural networks, support vector machines, decision trees (including random forest methods, K-Nearest Neighbors, XGBoost algorithms), ensemble methods, and other techniques. Other machine learning models may be generative models (such as Generative Adversarial Networks or auto-encoders).

In various embodiments, the machine learning models may undergo a training or learning phase before they are released into a production or runtime phase or may begin operation with models from existing systems or models. During a training or learning phase, the machine learning models may be tuned to focus on specific variables, to reduce error margins, or to otherwise optimize their performance. The machine learning models may initially receive input from a wide variety of data, such as the gathered data described herein. The machine learning models herein may undergo a second or multiple subsequent training phases for retraining the models.

The term "anomalous transmission prediction model" refers to one or more data objects representative of a model definition specifically configured to inspect a digital transmission to predict whether the digital transmission defines an anomalous transmission. Examples of an anomalous transmission prediction model includes, but is not limited to, an intra-transmission analytical model and a contextual analytical model as described herein.

The term "intra-transmission analytical model" refers to one or more data objects representative of a model definition specifically configured to inspect a digital transmission to predict whether the digital transmission defines an anomalous transmission based on one or more lexical features defined by the digital transmission. The intra-transmission analytical model may be a machine learning model that uses text analysis comprising natural language processing to process various textual data defined by the digital transmission and generate a plurality of lexical (e.g., Jaccard) similarity score features and metadata features (e.g., recipient count, "reply" keyword count, "forward keyword count) to predict whether the digital transmission defines an anomalous transmission (e.g., an email home or other personal/non-enterprise communication). In some embodiments, the intra-transmission analytical model comprise a rules-based model. In such some embodiments, the intra-transmission analytical model may comprise one or more rules-based algorithms leveraged to predict whether a digital transmission defines an anomalous transaction based on the plurality of lexical similarity score features and metadata features. In some embodiments, the rules-based model may include a rules layer atop one or more machine learning models (e.g., natural language processing applied to digital transmission metadata, which may be analyzed to generate a similarity score, which may then be input into a rules-based model, such as a rules-based decision tree). Non-limiting examples of such machine learning models include random forest, XGBoost, decision tree, support vector machines, K-Nearest Neighbor (KNN), or the like. In some embodiments, an intra-transmission analytical model may be referred to as a lexical model.

The term "contextual analytical model" refers to refers to one or more data objects representative of a model definition specifically configured to inspect a digital transmission to predict whether the digital transmission defines an anomalous transmission based on one or more contextual features defined by a digital transaction history associated with one or more of the sender user and the recipient (e.g., the designated recipient handler) of digital transmission to predict whether the digital transmission defines an anomalous transmission. The contextual analytical model may be configured to identify changes (e.g., changes above a predetermined threshold) in digital transmission patterns of one or more users. The contextual analytical model may be a machine learning model that processes various historical digital transmission activity data that correspond to historical digital transmission activity between sender users associated with the enterprise system and external recipients. The contextual analytical model is configured to output a prediction of whether the digital transmission defines an anomalous transmission (e.g., an email home, potentially with exfiltrated enterprise data) based on one or more contextual analytical features (also referred to herein interchangeably as contextual features) built using the historical digital transmission activity data. In some embodiments, the contextual analytical model comprises a machine learning model such as a random forest model. In an example embodiment, the contextual analytical model comprise a random forest model that includes at least one random forest algorithm. In such example embodiments, the random forest algorithm of the contextual analytical model may comprise one or more decision trees. Each decision tree may be constructed (e.g., built) based on at least a portion of one or more contextual analytical features built based on historical digital transmission activity. In some embodiments, a contextual analytical model may be referred to as a behavioral model or a behavioral machine learning probabilistic model.

The term "automatic" or "automatically" refers to any step or steps of an electronic process or processes that takes place without interaction by an outside entity.

The terms "substantially instantaneous" or "real time" refer to a timeframe in which something electronically occurs, meaning without contextually meaningful delay. For example, a client device submits a request and expects an almost immediate response, such that contextually meaningful delay might be 10 minutes or more in such a situation.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, virtual reality device, augmented reality device, the like, or any combination of the aforementioned devices.

FIG. 1 illustrates an example system architecture 100 within which embodiments of the present disclosure may operate. The system architecture 100 includes an anomalous transmission tracking system 110 configured to interact with an enterprise system 120. As illustrated, the enterprise system 120 may include at least one enterprise server(s) 121 accessible via the communication network 140. Collectively, the at least one enterprise server(s) 121 is configured for facilitating a transmission of a digital transmission generated at an internal client computing device 123A associated therewith to another of the internal client computing devices 123B-N and/or one or more external client computing devices associated with an external digital transmission system 130A-N (e.g., an external digital transmission server thereof). For example, an enterprise server 121 may be configured for facilitating a transmission of a digital transmission generated at an internal client computing device associated therewith to an external client computing device associated with an external digital transmission system 130A.

The enterprise server 121 may generate and/or receive digital transmission data associated with a digital transmission from the internal client computing device 123A associated with a sender user identifier. Further, an enterprise server 121 may be configured to communicate with an external digital transmission server of an external digital transmission system 130A (e.g., via a network 140) to transmit at least a portion of the digital transmission data associated with the digital transmission to an external client computing device of the external digital transmission system 130A that is associated with a recipient of the digital transmission.

As illustrated, the enterprise system 120 may further include one or more enterprise system data repositories 122, which may define one or more cache memory storage areas and/or one or more long term storage areas, such as for storing various data associated with the enterprise system (e.g., digital transmission data, user profile data, historical digital transmission activity data, and/or the like). In various embodiments, historical digital transmission activity data associated with a plurality of digital transmissions transmitted via the enterprise server 121 may be stored at the enterprise system data repository 122 in a data table embodying a stored digital transmission log (e.g., an email log).

The enterprise system data repository 122 may further be configured to store a plurality of user profile data corresponding to each of the users associated with the enterprise system 120. For example, in an example circumstance wherein the enterprise system 120 embodies a networked system operated by an enterprise, the enterprise system data repository 122 may be configured to store user profile data associated with each user of the enterprise system 120 in a data table embodying a stored user hierarchy (e.g., an email user hierarchy). In some embodiments, the enterprise system data repository may be further configured to store personal email address associated with at least some of the users of the enterprise system 120 in a data table (e.g., personal email table) embodying a stored user hierarchy. In various embodiments, the enterprise system data repository 122 may be communicatively connected with the enterprise server 121 such that the enterprise server 121 may access data stored at the enterprise system data repository 122 to facilitate one or more operations of the enterprise server. Further, in various embodiments, the enterprise system data repository 122 may be communicatively connected with the anomalous transmission tracking system 110 (e.g., the anomalous transmission tracking server 111) such that the anomalous transmission tracking server 111 may selectively access the enterprise system data repository 122 to retrieve data (e.g., digital transmission data, user profile data, historical digital transmission activity data, and/or the like) needed by the anomalous transmission tracking server 111 to facilitate execution of, for example, a digital transmission inspection workflow.

An internal client computing device 123A-N may include a mobile device, a smart phone, a tablet computer, a laptop computer, a wearable device, a personal computer, an enterprise computer, a virtual reality device, an augmented reality device, or another type of computing device. In certain embodiments, at least one internal client computing device from the one or more internal client computing device 123A-N may be configured to generate a digital transmission, such as, for example, an email message. As shown, the internal client computing devices 123A-N associated with the enterprise system 120 may be configured to interact with one or more external client computing devices 130A-N associated with an external digital transmission system 130A. For example, a digital transmission may be generated at a first internal client computing device 123A associated with the enterprise server 121 and transmitted to an external client computing device of the first external digital transmission system 130A via the network 140.

The anomalous transmission tracking system 110, the enterprise server 121, and/or the one or more client devices 123A-N may be in communication using a network 140. The network may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network (e.g., network routers, etc.). For example, the network may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JSON objects sent via a WebSocket channel. In some embodiments, the protocol is JSON over RPC, JSON over REST/HTTP, the like, or combinations thereof.

As illustrated, the anomalous transmission tracking system 110 may comprise an anomalous transmission tracking server 111 and an anomalous transmission tracking data repository 112. In various embodiments, the anomalous transmission tracking server 111 may be configured to interact with one or more components, devices, and/or repositories managed by the enterprise server 121 of the enterprise system 120 supported by the anomalous transmission tracking system 110. For example, the anomalous transmission tracking system 110 (e.g., via the anomalous transmission tracking server 111) may be configured to interact with one or more of an enterprise server 121 and one or more internal client computing devices 123A-N associated with the enterprise system 120, such as internal client computing device 123A and/or internal client computing device 123N. In various embodiments, the anomalous transmission tracking server 111 may be configured to retrieve, receive, and/or transmit digital transmission data associated with one or more digital transmissions associated with the enterprise server 121. As described herein, a digital transmission may comprise one or more of an email message, an instant message, a file transfer, and/or the like.

In particular, the anomalous transmission tracking server 111 may comprise one or more computing devices configured to communicate with one or more components of the enterprise system 120 (e.g., an enterprise server 121, an enterprise system data repository 122, and one or more of the internal client computing devices 123A-N) via a network 140 to execute a digital transmission inspection workflow with respect to a digital transmission generated by the enterprise system (e.g., sent from an internal client computing device 123A via the enterprise server 121) to programmatically detect whether the digital transmission is an anomalous transmission.

In various embodiments, the anomalous transmission tracking server 111 may be configured to execute one or more machine learning models to detect an anomalous transmission associated with the enterprise system 120, which may correspond to a "personal" digital transmission sent from an internal client computing device 123A by a user associated with the enterprise system (e.g., a sender user) to an external client computing device of an external digital transmission system 130A that is associated with the sender user. As described herein, the anomalous transmission tracking server 111 may be configured to execute both an intra-transmission analytical model and a contextual analytical model (each of which may comprise one or more machine learning algorithms) to detect whether an outbound digital transmission associated with the enterprise server 121 is an anomalous transmission.

For example, in various embodiments, an outbound digital transmission detected by the anomalous transmission tracking system 110 (e.g., the anomalous transmission tracking server 111) may comprise an email message generated by a sender user associated with the enterprise system 120 (e.g., an email user of the enterprise that operates the enterprise system) at an internal client computing device 123A that is sent to an external client computing device that is not associated with the enterprise system 120. In such an example circumstance, the anomalous transmission tracking system 110 may detect the outbound email message prior to the email message being transmitted to the external digital transmission system 130A (e.g., an external entity thereof). The anomalous transmission tracking system 110 may intercept the email message (e.g., and corresponding metadata associated therewith) to facilitate execution of a digital transmission inspection workflow. As an example, the anomalous transmission tracking server 111 may execute a digital transmission inspection workflow by using both an intra-transmission analytical model and a contextual analytical model to programmatically detect whether the email message is an anomalous transmission, such as, for example, an email home sent from the enterprise email account of the sender user to an external personal email account accessible to the sender user. In some embodiments, the anomalous transmission tracking system 110 may be configured to detect the outbound email message subsequent to the email message being transmitted to the external digital transmission system 130A.

In various embodiments, the anomalous transmission tracking system 110 may include an anomalous transmission tracking data repository 112. The anomalous transmission tracking data repository 112 may include one or more storage units, such as multiple distributed storage units that are connected through a computer network. Moreover, each storage unit in an anomalous transmission tracking data repository 112 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof. In various embodiments, the anomalous transmission tracking data repository 112 accessible to the anomalous transmission tracking server 111 such that the anomalous transmission tracking server 111, utilizing means such as one or more software and/or hardware modules, may perform various data storage processes and/or execute various operations in order to facilitate the execution of one or more digital transmission inspection workflows, as described herein. For example, in various embodiments, the anomalous transmission tracking server 111 of the anomalous transmission tracking system 110 may be configured to retrieve, receive, and/or otherwise process various data structures comprising digital transmission data associated with the enterprise system 120, such as digital transmission data stored in the enterprise system data repository 122 in a data format supported by the enterprise system 120 to facilitate operation of the enterprise server 121. In various embodiments, the anomalous transmission tracking server 111 may be configured to at least temporarily store one or more data structures generated during a digital transmission inspection workflow at the anomalous transmission tracking data repository 112, such as, for example, an intra-transmission analytical model data structure and/or a contextual analytical model data structure generated by the anomalous transmission tracking server 111 to define the respective model input data structures provided to the anomalous transmission prediction models (e.g., the intra-transmission analytical model and the contextual analytical model).

In one or more embodiments, the anomalous transmission tracking system 110 may be configured to receive one or more digital transmissions from one or more of the internal client computing devices 123A-N associated with the enterprise system 120. In various embodiments, the anomalous transmission tracking system 110 may be configured such that a digital transmission received by the anomalous transmission tracking server 111 and/or detected by the anomalous transmission tracking server 111 may cause one or more actions with respect to the anomalous transmission tracking system 110. A digital transmission sent from the one or more internal client computing devices 123A-N may be intercepted by the anomalous transmission tracking system 110, which may be configured to retrieve the digital transmission (e.g., and the digital transmission data associated therewith) via one or more of a communication channel associated with the enterprise system, a component interface defined by the enterprise system 120, an API defined one or more of the enterprise server 121 and the anomalous transmission tracking server 111, the like, or combinations thereof. In various embodiments, the communication channel between the anomalous transmission tracking system 110 (e.g., the anomalous transmission tracking server 111) and one or more of the enterprise server 121 and an internal client computing device 123A may be related to a portal, widget, chat, email, web, text, notification, telephone, video, and/or other type of communication.

The non-limiting example embodiment of system architecture 100 depicted in FIG. 1 shows the example anomalous transmission tracking system 110 as a distinct system relative to the enterprise server 121. As illustrated, the anomalous transmission tracking system 110 is communicatively connected to the enterprise server 121 such that the anomalous transmission tracking system 110 (e.g., the anomalous transmission tracking server 111) is configured to communicate with and/or access components of the enterprise system 120 in order to execute a digital transmission inspection workflow with minimal anomalous transmission tracking system 110 interference in the various operations of the enterprise server 121, communicatively connected with the enterprise server 121.

Further, it should be understood that in various embodiments of the present disclosure, the anomalous transmission tracking system 110 may be provided as a component of the enterprise system 120. For example, in such an example circumstance, the anomalous transmission tracking server 111 of the anomalous transmission tracking system 110 may define a component of the enterprise server 121, wherein the functionality of the anomalous transmission tracking server would be executed by a specific component, circuitry, and/or the like defined by the enterprise server 121.

Figure 2:
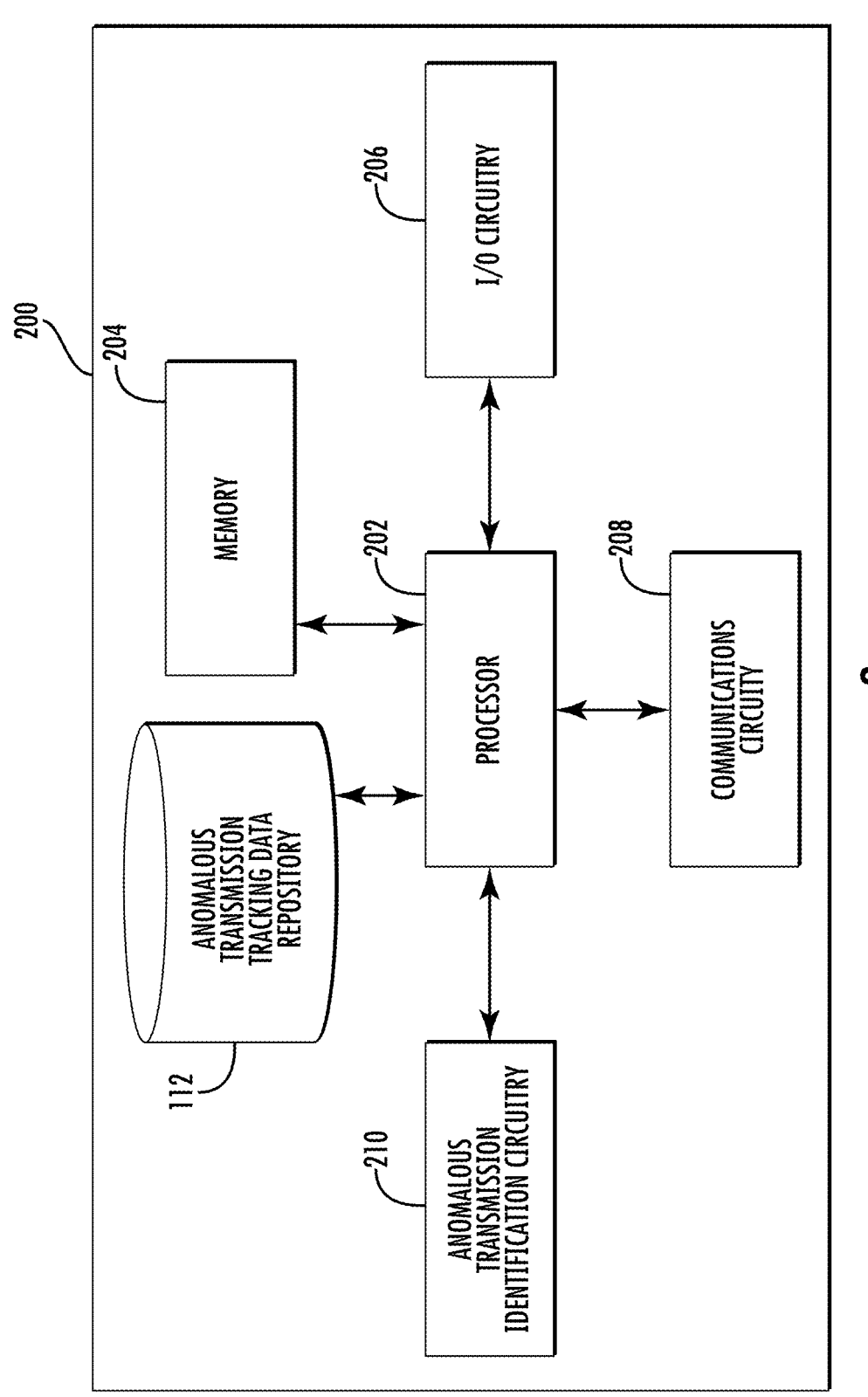
FIG. 2 illustrates a block diagram of an anomalous transmission tracking apparatus configured in accordance with one or more embodiments of the present disclosure.

The anomalous transmission tracking server 111 may be embodied by one or more computing systems, such as apparatus 200 shown in FIG. 2. The apparatus 200 may include processor 202, memory 204, input/output circuitry 206, communications circuitry 208, and anomalous transmission identification circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some non-limiting embodiments, the processor 202 may be configured to execute instructions stored in the memory 204 or otherwise accessible to the processor 202. In some non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The anomalous transmission identification circuitry 210 may be any means such as a device or circuitry embodied in either hardware or a combination of hardware and software that is configured to perform predictive data analysis operations (e.g., using one or anomalous transmission prediction models, which may comprise one or more machine learning models) to determine whether digital transmissions transmitted from an enterprise system is anomalous transmissions. For example, the anomalous transmission identification circuitry 210 may include specialized circuitry that are configured to perform machine learning operations in an expedited manner, such as graphical processing unit (GPU) circuitry and/or tensor processing unit (TPU) circuitry. In various embodiments, the anomalous transmission identification circuitry 210 may be configured to determine that a digital transmission sent from an internal client computing device associated with the enterprise system may be an outbound digital transmission, based at least in part on one or more data processing operations that may be executed by the anomalous transmission identification circuitry 210 to determine that a recipient identifier associated with a particular digital transmission is associated with an external digital transmission service. In various embodiments, upon determining that a digital transmission is an outbound digital transmission, the anomalous transmission identification circuitry 210 of the apparatus 200 may intercept the outbound digital transmission. In some embodiments, the digital transmission may be intercepted such that the outbound digital transmission and/or the digital transmission data associated therewith is prevented from being transmitted from the enterprise system to an external digital transmission system (e.g., an external digital transmission server and/or an external client computing device associated with the recipient identifier).

Further, in various embodiments, the anomalous transmission identification circuitry 210 may be configured to facilitate execution of a digital transmission inspection workflow by the apparatus 200. For example, based at least in part on digital transmission data associated with the outbound digital transmission, the anomalous transmission identification circuitry 210 may execute one or more anomalous transmission prediction models. For example, the anomalous transmission identification circuitry 210 may be configured to execute a plurality of anomalous transmission prediction models comprising a first anomalous transmission prediction model (e.g., intra-transmission analytical model) configured to inspect the digital transmission by analyzing the outbound digital transmission and the digital transmission data (or certain portions of the digital transmission data) associated therewith (e.g., the recipient, sender, subject, body, attachments, and/or metadata associated with the outbound digital transmission), and a second anomalous transmission prediction model (e.g., contextual analytical model) configured to inspect the outbound digital transmission by analyzing historical digital transmission activity data associated with the sender and the recipient of the outbound digital transmission. In this regard, the intra-transmission analytical model and contextual analytical model may collectively define some embodiments of an anomalous transmission prediction model framework for detecting anomalous digital transmissions. The intra-transmission analytical model and the contextual analytical model may be built (e.g., generated, trained, tested, validated, and/or the like) using one or more model development techniques/processes described herein. A model development process in accordance with some embodiments described herein may define a model development workflow for building an intra-transmission analytical model as well as a model development workflow for building a contextual analytical model. In particular, for example, the models of an anomalous transmission prediction model framework may be built using a first example model development process based or second example model development process, as described herein.

In various embodiments, the intra-transmission analytical model built in accordance with the first example model development process is an XGBoost-based intra-transmission analytical model and the contextual analytical model built in accordance with the first development process is an XGBoost-based contextual analytical model. In various embodiments, the intra-transmission analytical model built in accordance with the second example model development process is a rules-based intra-transmission analytical model and the contextual analytical model built in accordance with the second development process is a random forest-based contextual analytical model.

In various embodiments, the first anomalous transmission prediction model used by the apparatus 200 (e.g., the anomalous transmission identification circuitry 210) to inspect the outbound digital transmission may analyze the outbound digital transmission to determine if the outbound digital transmission is an anomalous transmission (e.g., within a certain degree of confidence of not being an enterprise-related transmission). In various embodiments, the first anomalous transmission prediction model may use text analysis with respect to the outbound digital transmission and/or related digital transmission data (e.g., digital transmission metadata, etc.) associated therewith. For example, the first anomalous transmission prediction model may use text analysis comprising natural language processing to process various textual data defined by the outbound digital transmission. In one or more example embodiments, the first anomalous transmission prediction model uses one or more rules-based models. In one or more example embodiments, the first anomalous transmission prediction model uses one or more decision tree algorithm models. Further, in one or more example embodiments, the first anomalous transmission prediction model uses one or more gradient boosting algorithms. In various embodiments, the first anomalous transmission prediction model executed by the apparatus 200 to inspect the outbound digital transmission may comprise an intra-transmission analytical model. In various embodiments, the intra-transmission analytical model defining the first anomalous transmission prediction model may be configured to predict whether the outbound digital transmission is an anomalous transmission by analyzing one or more lexical features defined by the outbound digital transmission, including one or more metadata elements associated with the outbound digital transmission and one or more lexical similarity scores corresponding to lexical similarities between the sender name and/or handler and the recipient handler.

In various embodiments, the anomalous transmission identification circuitry 210 may be configured to generate an intra-transmission analytical model data structure, as described herein, by performing a textual analysis (e.g., a natural language processing operation) of the digital transmission (e.g., digital transmission data associated therewith) and generating a plurality of data elements corresponding to the plurality of lexical similarity features and metadata features used by the intra-transmission analytical model. For example, the anomalous transmission identification circuitry 210 may be configured to execute a Jaccard similarity algorithm to determine a plurality of lexical similarity scores (e.g., four lexical similarity scores) using a sender data and recipient data associated with the digital transmission, as described herein with respect to the example method illustrated in FIG. 9. Further, the anomalous transmission identification circuitry 210 may be configured to process the metadata associated with the digital transmission to determine a plurality of metadata corresponding to N (e.g., where N is three, five, or the like) metadata variables utilized by the intra-transmission analytical model (e.g., reply keyword count data, forward keyword count data, and recipient count data). Further, in some embodiments, the anomalous transmission identification circuitry 210 may be configured to process certain metadata (e.g., phone number data) associated with the digital transmission to determine additional metadata corresponding to additional metadata variables applied to an output of the intra-transmission analytical model. Such additional metadata variables may include area code match, length match, prefix match, and/or line match (described further below) and may be used by a phone number detection filter in some embodiments to improve performance of the anomalous transmission prediction process described herein. In some embodiments, processes such as, but not limited to, phone number detection filters, nickname filters, and the like may be optionally added to the model framework.

Further, in various embodiments, the second anomalous transmission prediction model used by the apparatus 200 (e.g., the anomalous transmission identification circuitry 210) to inspect the outbound digital transmission may analyze historical digital transmission activity data stored by an enterprise system to predict if the outbound digital transmission is an anomalous transmission (e.g., within a certain degree of confidence of not being an enterprise-related transmission). In various embodiments, the second anomalous transmission prediction model may analyze historical digital transmission activity data associated with one or more of the digital transmission sender and the digital transmission recipient. In one or more example embodiments, the second anomalous transmission prediction model uses one or more decision tree algorithm models. Further, in one or more example embodiments, the second anomalous transmission prediction model uses one or more gradient boosting algorithms. In various embodiments, the second anomalous transmission prediction model executed by the apparatus 200 to inspect the outbound digital transmission may comprise a contextual analytical model. In various embodiments, the contextual analytical model defining the second anomalous transmission prediction model may be configured to predict whether the outbound digital transmission is an anomalous transmission by analyzing historical digital transmission activity data stored by the enterprise system to compare one or more contextual characteristics of the digital transmission to corresponding aspects defined by the pattern of digital transmission activity between the sender and the recipient.

In various embodiments, the anomalous transmission identification circuitry 210 may be configured to generate a contextual analytical model data structure, as described herein, by processing historical digital transmission activity data associated the sender and the recipient to derive a plurality of contextual features (e.g., behavioral features) and generate a corresponding plurality of data elements formatted for use by the contextual analytical model. For example, the anomalous transmission identification circuitry 210 may be configured to derive each of the contextual features used by the contextual analytical model, as described herein. The contextual features generated by the anomalous transmission identification circuitry 210 may depend on the model development process (e.g., model data set thereof) used to build the contextual analytical model. For example, a contextual analytical model built using a first example model development process as described herein may use 16 particular contextual features in the example embodiment described herein (see, e.g., Table 1a). Variations of these contextual features are also possible. In such an example, the anomalous transmission identification circuitry 210 may be configured to generate the 16 contextual features for the contextual analytical model. As another example, a contextual analytical model built using a second example model development process as described herein may use 17 particular contextual features in the example embodiment described herein (see, e.g., Table 1b). Variations of these contextual features are also possible. In such examples, the anomalous transmission identification circuitry 210 may be configured to generate the 17 contextual features for the contextual analytical model. The two example processes described herein are examples, and other model generation processes may be used in some embodiments.

In various embodiments, the anomalous transmission identification circuitry 210 of an example apparatus 200 may be configured to execute the one or more anomalous transmission prediction models to predict whether an outbound digital transmission is an anomalous transmission. In various embodiments, the one or more anomalous transmission prediction models may comprise an intra-transmission analytical model and a contextual analytical model, each of which may be based at least in part on one or more decision tree algorithms and/or one or more rules-based algorithms. According to various embodiments, an intra-transmission analytical model built in accordance with a first example model development process as described herein may be based on one or more decision-tree algorithms (e.g., using XGBoost) and a contextual analytical model built in accordance with the first example model development process may be based on one or more decision-tree algorithms (e.g., using XGBoost). According to various embodiments, an intra-transmission analytical model built in accordance with a second example model development process as described herein may be based on one or more rules-based algorithms and a contextual analytical model built in accordance with the second example model development process may be based on one or more decision-tree algorithms (e.g., Random Forest). The rules-based algorithm may include a rules layer atop one or more machine learning algorithms. The model development processes may be interchanged and/or other model development processes may be used for the intra-transmission analytical model and/or the contextual analytical model.

Figure 8:
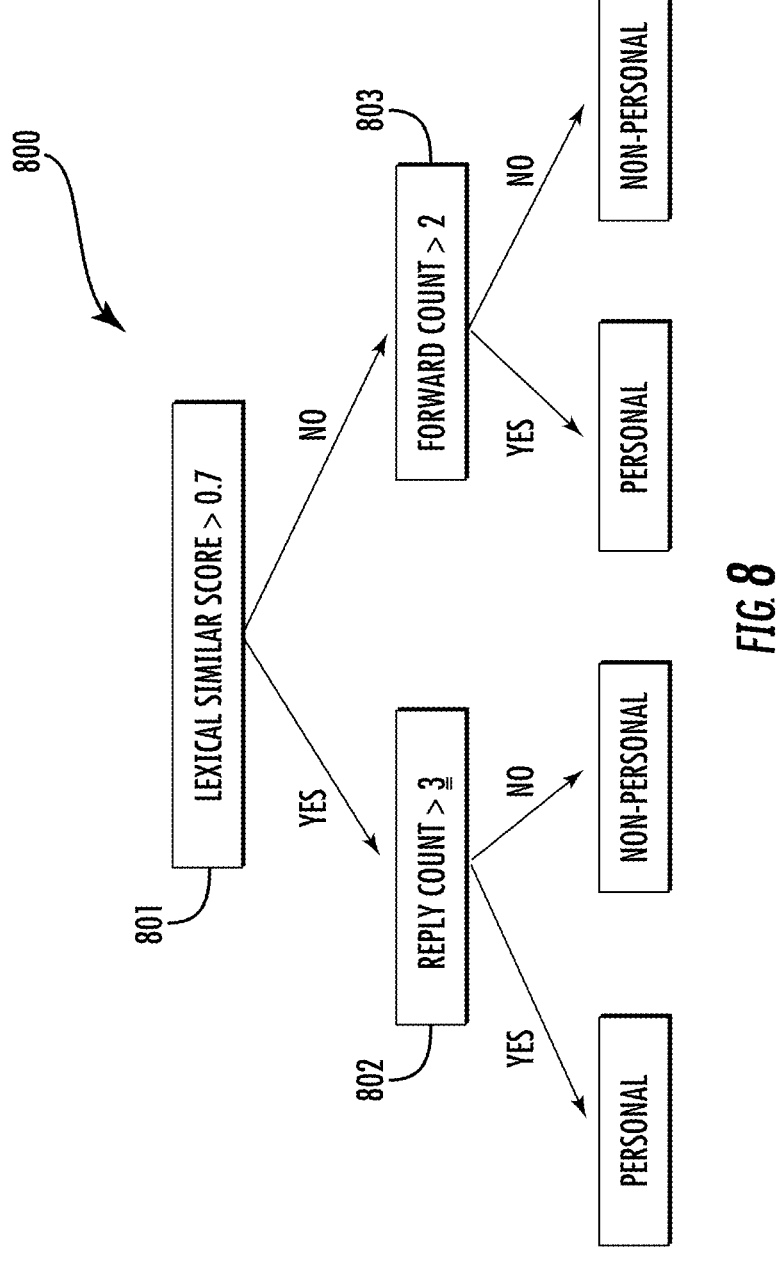
FIG. 8 illustrates a flowchart depicting an example decision tree used in one or more machine learning models in accordance with one or more embodiments of the present disclosure.

As a non-limiting example provided for illustrative purposes, FIG. 8 illustrates one example of a decision tree 800 corresponding to a decision tree algorithm that may be executed (e.g., by one or more anomalous transmission prediction models) to check various programmatically defined checklists for particular data (e.g., digital transmission data) and classifies the particular data according to the destination of the checklist. In particular, FIG. 8 illustrates an example decision tree 800 corresponding to a decision tree algorithm that may be executed by an intra-transmission analytical model built in accordance with the first example model development process described herein. As illustrated, the decision tree algorithm, at a first Block 801, determines whether the lexical similarity score associated with a data transmission, as defined by an intra-transmission analytical model data structure, is greater than 0.7.

Upon determining that the answer is yes, the algorithm proceeds to determine whether, at Block 802, the reply count associated with digital transmission is greater than or equal to 3. If the answer is determined to be yes, the machine learning model (e.g., the intra-transmission analytical model) may output a prediction that that the digital transmission is an anomalous transmission. If the inquiry at Block 802 results in a negative response, the machine learning model (e.g., the intra-transmission analytical model) may output a prediction that the digital transmission is a standard transmission.

Returning back to the inquiry of Block 801, upon determining that the inquiry results in a negative response (e.g., the lexical similarity score is less than 0.7), the algorithm may proceed to determine whether, at Block 803, the forward count associated with digital transmission is greater than 2. If the inquiry at Block 803 produces a positive response, the machine learning model (e.g., the intra-transmission analytical model) may output a prediction that that the digital transmission is an anomalous transmission. Further, if the inquiry at Block 803 produces a negative response, the machine learning model (e.g., the intra-transmission analytical model) may output a prediction that the digital transmission is a standard transmission.

In various embodiments, an example XGBoost algorithm or other machine learning algorithm (e.g., Random Forest) and/or a rules-based algorithm utilized by one or more of the intra-transmission analytical model or the contextual analytical model may sequentially create a plurality of decision trees similar to the illustrated tree 800. For example, the XGBoost algorithm may create the first tree 800 and find the difference between the model prediction resulting from execution of the first tree and the actual observation. Subsequently, the XGBoost algorithm may create a second tree to predict the difference. In an example circumstance where an error is still present between the predicted result of the second tree and the actual observation, a third tree may be created to make up for the prediction error of the second tree. In various embodiments, the XGBoost algorithm used by the one or more anomalous transmission prediction models defined by the anomalous transmission tracking system will continue to generate additional trees until a predefined number of trees has been produced and/or the prediction error gap satisfies a predefined error threshold (e.g., +0.0002%). In this way, the XGBoost algorithm may be configured to continuously make up for the errors of the previous decision tree and derive near-perfect performance. The intra-transmission analytical model and/or the contextual analytical model may utilize an XGBoost algorithm in various embodiments, including example embodiments, where the intra-transmission analytical model and the contextual analytical model are built in accordance with the first example model development process described herein. The intra-transmission analytical model may utilize a rules-based algorithm and the contextual analytical model may utilize a random forest algorithm in various embodiments, including example embodiments, where the intra-transmission analytical model and the contextual analytical model are built in accordance with the second example model development process described herein.

In one example, the XGBoost model defined by the one or more anomalous transmission prediction models of the anomalous transmission tracking system includes 100 decision trees, which may be a default value, in the same structure as the example tree 800 illustrated in FIG. 8. The plurality of trees is formed by the XGBoost model under two conditions, including a first condition that prevents each from utilizing each of the contextual analytical model variables (e.g., contextual analytical features) associated with the contextual analytical model. Instead, the contextual analytical model may be configured to randomly extracts 80% of the contextual analytical model variables and grow up as illustrated in FIG. 8. As described above, in one example embodiment, where the contextual analytical model is built based on the first example model development process described herein, the number of contextual analytical variables may be 16. Further, the plurality of 100 decision trees may be generated under a second condition requiring that the max_depth be set to 8, so that a separation may occur only up to 8 levels. As such, upon a new model input data structure (e.g., new contextual analytical model data structure) being provided to the XGBoost algorithm, the 100 decision trees may predict the error of the previous tree and the plurality of predicted errors may be summed to make a final prediction, which may define the contextual analytical model output.

It is also noted that all or some of the information discussed herein may be based on data that is received, generated and/or maintained by one or more components of apparatus 200. In some embodiments, one or more external systems (such as a remote cloud computing and/or data storage system) may also be leveraged to provide at least some of the functionality discussed herein.

Example Multi-Factor Transmission Screening

The present disclosure relates generally to systems, methods, and apparatuses for inspecting a digital transmission using one or more machine learning models to detect an anomalous digital transmission. Various embodiments described herein are directed to an anomalous transmission tracking system that intercepts or otherwise receives and programmatically screens outbound digital transmissions transmitted from an enterprise system by using two or more machine learning models to determine whether the outbound digital transmission is an anomalous transmission. The anomalous transmission tracking system may determine whether the outbound digital transmission is an anomalous transmission without interrupting the expected timing of the transmission (e.g., near real time or real time analysis, such that recipients of nominal, enterprise communications do not observe a delay between sending and receipt relative to normal digital transmission timing).

The anomalous transmission tracking system may use two distinctly configured anomalous transmission prediction models together to consider different aspects of a digital transmission in determining whether the outbound digital transmission is an anomalous transmission. For example, embodiments herein include using a first anomalous transmission prediction model (e.g., an intra-transmission analytical model) configured to inspect the digital transmission by analyzing the outbound digital transmission and the digital transmission data associated therewith (e.g., the recipient, sender, subject, body, attachments, and/or metadata associated with the outbound digital transmission), and a second anomalous transmission prediction model (e.g., a contextual analytical model) configured to inspect the outbound digital transmission by analyzing historical digital transmission activity data associated with the sender and the recipient of the outbound digital transmission. The intra-transmission analytical model and the contextual analytical model may be generated in accordance with one of a plurality of model development process such as, for example, a first model development process or a second model development process as described herein.

In some embodiments, the intra-transmission analytical model and contextual analytical model may be run separately and/or independently of each other (e.g., each being run as a standalone model with or without running the other). In some embodiments, the models may each be run concurrently or sequentially on outbound digital transmissions. The models may be run according to several different timing configurations. For example, in some instances, one or both of the intra-transmission analytical model and contextual analytical model may be run in real time on outbound digital transmissions. In some embodiments, either one of the intra-transmission analytical model and contextual analytical model may detect an anomalous digital transmission, and such independent detection may trigger the various downstream processes (e.g., an "email home" flag and/or subsequent steps) discussed herein independently of the other model in some embodiments. The outbound digital transmissions may be sent by the enterprise system in real-time without interruption, and the model analysis(es) may be run periodically based on one or more predetermined schedules and/or workflows (e.g., upon receipt of a batch data set of digital transmission metadata). In some embodiments, one or both of the intra-transmission analytical model and contextual analytical model may be run on batched digital transmission data (e.g., digital transmission metadata). In some instances, the digital transmission data may be captured during transmission from the enterprise system (e.g., via a firewall or digital transmission screening apparatus upstream or downstream of a firewall), and the captured digital transmission data (e.g., digital transmission metadata) may be batched and sent at regular intervals (e.g., based upon a predetermined time period, such as each day) for analysis via one or both models. The model analysis may thereby run following receipt of the periodic batches. In some examples, the system does not use the models to process emails in real time. In such an example, a system may be configured to use one or more models to classify a previous day's emails at a given time the following day (e.g., at 4:30 a.m. the following day).

In various embodiments, an intra-transmission analytical model may use text analysis comprising natural language processing to process various textual data defined by the outbound digital transmission and generating a first specifically formatted model input data structure that is configured to be provided to the first anomalous transmission prediction model. In various embodiments, the intra-transmission analytical model may be configured to ingest the first specifically formatted model input data structure and provide a programmatic prediction of whether the outbound digital transmission is an anomalous transmission based on the various features (e.g., lexical features) defined by the outbound digital transmission itself.

The anomalous transmission tracking system may further use historical digital transmission activity data stored by the enterprise system (e.g., data defining the transmission history of various digital transmission activities associated with internal sender users of the enterprise system and external recipients) and may be configured to generate a second specifically formatted model input data structure that is configured to be provided to the contextual analytical model. In various embodiments, the contextual analytical model may be configured to ingest the second specifically formatted model input data structure and provide a programmatic prediction of whether the outbound digital transmission is an anomalous transmission based on various features (e.g., contextual features) defined by the historical digital transaction activities of senders and recipients associated with the enterprise system. Further, embodiments herein include programmatically combining the respective model outputs from the intra-transmission analytical model and the contextual analytical model to facilitate a robust determination of whether the outbound digital transmission is an anomalous transmission that considers both lexical aspects and contextual aspects of the outbound digital transmission without interrupting the expected timing of the transmission.

The anomalous transmission tracking system may, upon determining that the outbound digital transmission is an anomalous transmission based on the one or more outputs of the machine learning models, trigger a notification operation wherein a notification communication may be automatically generated and communicated to an internal client computing device associated with a user (e.g., a reviewer) that is responsible for manually reviewing outbound digital transmissions to identify exfiltration activities. In some further embodiments, the suspected anomalous digital transmission may be quarantined or otherwise prevented from reaching the external digital transmission system associated with the recipient once flagged. In various embodiments, automatically transmitting the notification communication to the internal client computing device associated with the user includes causing one or more of a notification message, an anomalous digital transmission flag, and at least a portion of the outbound digital transmission identified as an anomalous transmission to be rendered at a display (e.g., a graphical user interface) defined by the internal client computing device, such that the employee user associated therewith may review the digital transmission to determine whether the digital transmission defines an impermissible exfiltration of enterprise data (e.g., information, documents, and/or the like).

In some embodiments, upon determining that the outbound digital transmission is a standard (e.g., normal, enterprise transmission that is not anomalous) transmission based on the one or more outputs of the machine learning models, the system may facilitate or otherwise permit the transmission of the outbound digital transmission to the external digital transmission system associated with the recipient. Upon the outbound digital transmission being inspected using the two machine learning models defined by the present disclosure (e.g., an intra-transmission analytical model and a contextual analytical model) and determining that digital transmission is a standard transmission (e.g., not an anomalous transmission), the transmission of the outbound digital transmission may continue without being sent to any further downstream internal client computing devices for further manual review. As such, the present disclosure practically minimizes the amount of unnecessary internal review, technically reduces the computational power and processing bandwidth that is required of the enterprise system by drastically reducing the size of the datasets and corresponding communications that are processed for enhanced review (e.g., manual or other programmatic review), and minimizes or eliminates any delay of non-anomalous digital transmissions.

Figure 3:
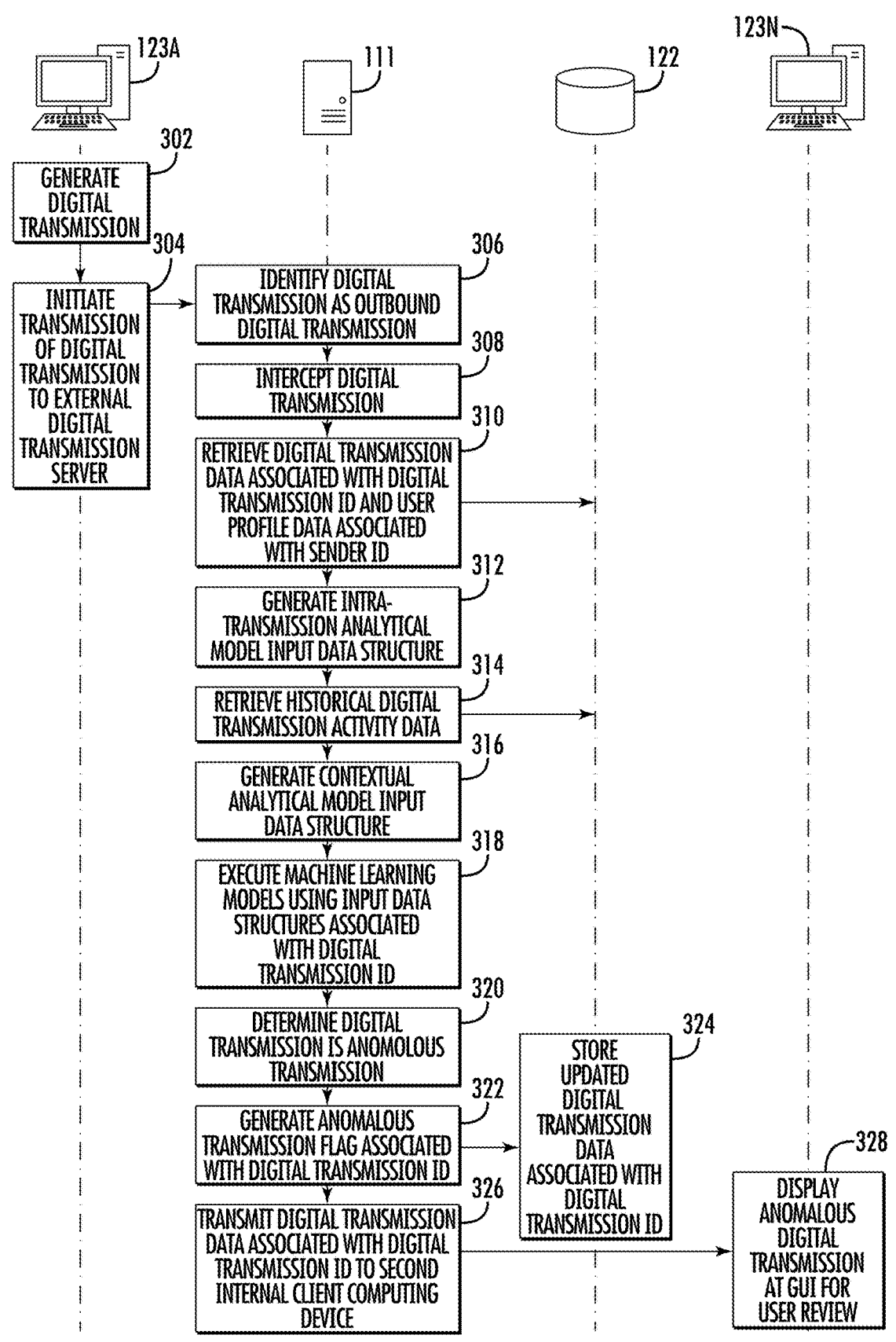
FIG. 3 illustrates a lane diagram showing functionality of various components in accordance with one or more embodiments of the present disclosure.

Referring now to FIG. 3, illustrates a diagram showing functionality of various components in accordance with one or more embodiments of the present disclosure. In particular, FIG. 3 depicts example operations for executing a digital transmission inspection workflow to determine that an outbound digital transmission is an anomalous transmission, in accordance with various embodiments of the present disclosure. As shown at Block 302, a digital transmission may be generated at an internal client computing device 123A associated with a monitored enterprise server of an enterprise system. In various embodiments, a digital transmission may embody a digital communication of data transmitted between a plurality of computing entities. In various embodiments, as non-limiting examples, a digital transmission generated by the internal client computing device 123A may comprise one or more of an email message, an instant message, a file transfer, and/or the like. For example, the digital transmission may be an email message generated at the internal client computing device 123A by a sender user, the generated email message being defined at least in part by digital transmission data including a recipient identifier and a sender identifier, which may correspond to the user identifier associated with a user profile that is associated with the internal client computing device 123A at which the email message was generated. In various embodiments, the recipient identifier associated with the generated digital transmission may be associated with an external digital transmission system such that the digital transmission defines an outbound transmission configured for transmission to an external client computing device.

As shown at Block 304, a transmission of the generated digital transmission may be initiated at the internal client computing device 123A. For example, in various embodiments, the enterprise system may utilize an internal entity associated therewith to transmit an outbound digital transmission to an external entity defined by an external digital transmission system associated with a recipient of the digital transmission. For example, the initiation of the outbound transmission of the generated digital transmission to an external client computing device associated with the recipient identifier may be caused by sender user interaction with the internal client computing device 123A (e.g., user input at an interface thereof). In various embodiments, an anomalous transmission tracking system 110 may identify the generated digital transmission as being an outbound transmission, as shown at Block 306. For example, the anomalous transmission tracking system 110 (e.g., an anomalous transmission tracking server thereof) may determine that the recipient identifier defined by the digital transmission data associated with the digital transmission is associated with an external digital transmission system, and therefore, that the digital transmission configured to be transmitted by the enterprise server to an external client computing device associated with an external digital transmission server.

As shown at Block 308, upon identifying the digital transmission as an outbound digital transmission, the digital transmission may be intercepted by the anomalous transmission tracking system 110 for an anomalous transmission screening prior to the digital transmission data associated therewith being transmitted beyond the enterprise system. In various embodiments, the anomalous transmission tracking system 110 may intercept the outbound digital transmission as the outbound digital transmission is in transit between an internal entity of the enterprise system and an external entity associated with the external digital transmission system. For example, the outbound digital transmission may be intercepted by the anomalous transmission tracking system 110 after the digital transmission is transmitted from the internal entity and before the digital transmission is received by the external entity. In some embodiments, an existing digital transmission system (e.g., email system) or anti-malware system may be configured to obtain the digital transmissions for analysis.

In various embodiments, the digital transmission being intercepted by the anomalous transmission tracking system 110 may cause the transmission of the digital transmission to the external client computing device to be at least temporarily suspended. In various embodiments, the anomalous transmission tracking system 110 may cause the enterprise server to restrict the digital transmission from being transmitted to the external client computing device associated with the recipient identifier until the digital transmission has been screened (e.g., processed) by the anomalous transmission tracking system 110, as described herein. In various embodiments, the digital transmission being intercepted by the anomalous transmission tracking system 110 may be defined by the anomalous transmission tracking system 110 accessing the digital transmission data associated therewith before it is sent to one or more external digital transmission systems such that the anomalous transmission tracking system 110 processes the digital transmission data to execute an anomalous transmission inspection workflow without affecting a transmission time required for the enterprise server to transmit the digital transmission data to the external digital transmission system associated with the external client computing device.

As shown at Block 310, digital transmission data associated with the digital transmission identifier and user profile data associated with the sender identifier may be retrieved from an enterprise system data repository 122. In various embodiments, the digital transmission data retrieved by the anomalous transmission tracking server 111 may be defined by data associated with the digital transmission identifier corresponding to the intercepted digital transmission, such as, for example, at least a portion of the metadata associated with the outbound digital transmission sent from the internal client device. In various embodiments, the anomalous transmission tracking server 111 may retrieve digital transmission data associated with the outbound digital transmission identifier from one or more stored data tables defined by the enterprise system data repository 122. For example, the digital transmission data may be defined by a plurality of data elements corresponding to respective features defined by the digital transmission, such as, for example metadata associated with the digital transmission. In various embodiments, digital transmission data and historical digital transmission activity data may be stored at the enterprise system data repository 122 in one or more data tables embodying, for example, a daily email log data table, a sender information data table associated with a user identifier corresponding to the sender of a digital transmission, a recipient data table with a recipient handler identifier corresponding to the recipient of a digital transmission.

Further, in various embodiments, the user profile data retrieved by the anomalous transmission tracking server 111 may be defined by at least a portion of the stored user data associated with a user identifier that is determined to be associated with the sender user (e.g., a sender identifier) of the outbound digital transmission. For example, in various embodiments, the retrieved user profile data may comprise user nickname data (e.g., a nickname identifier associated with the user identifier) such that the anomalous transmission tracking server 111 retrieves sender nickname data (e.g., a sender nickname identifier) defining one or more nicknames known to be used by the sender of the outbound digital transmission. In some embodiments, the retrieved user profile data may comprise email user phone data (e.g., phone number associated with the user identifier) such that the anomalous transmission tracking server 111 retrieves sender phone data (e.g., sender phone number data) defining one or more phone numbers known to be used by the sender of the outbound digital transmission. In various embodiments, the anomalous transmission tracking server 111 may retrieve user profile data from one or more data table stored at the enterprise system data repository 122, such as, for example, user nickname data table, a user data table associated with the user identifier, and/or the like.

As shown at Block 312, an intra-transmission analytical model data structure may be generated by the anomalous transmission tracking server 111. The anomalous transmission tracking server 111 may generate an intra-transmission analytical model data structure based at least in part on the retrieved digital transmission data. Further, the intra-transmission analytical model data structure generated by the anomalous transmission tracking server 111 may depend at least in part on the model development process leveraged to build the intra-transmission analytical model for which the intra-transmission analytical model data structure is being generated. For example, the intra-transmission analytical model data structure for an intra-transmission analytical model built using a first example model development process may be different from the intra-transmission analytical model data structure for an intra-transmission analytical model built using a second example model development process.

Figure 9:
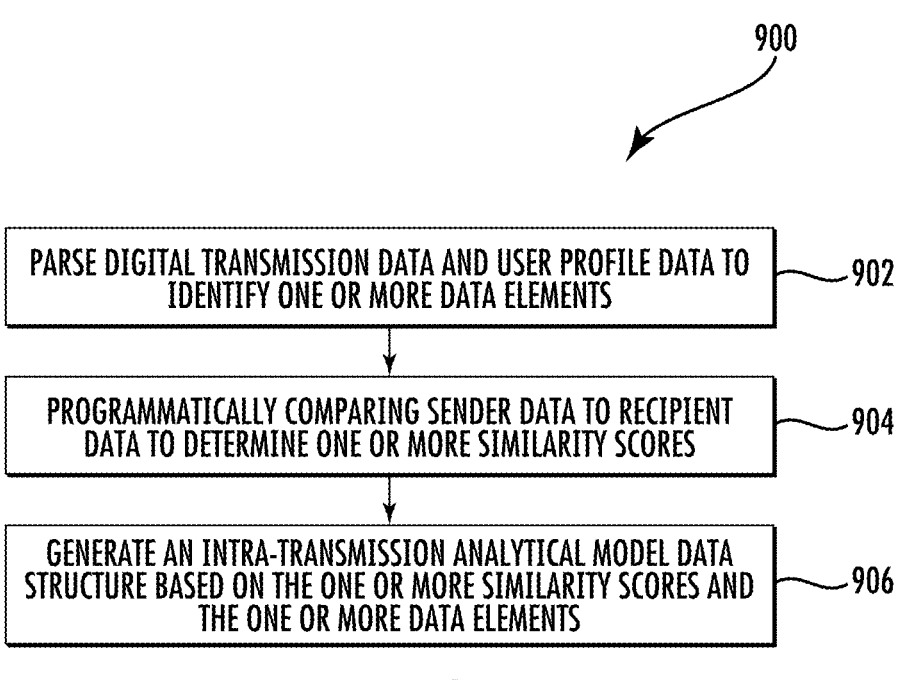
FIG. 9 illustrates a flowchart depicting operations performed in accordance with an example embodiment of the present disclosure.

FIG. 9 illustrates a flowchart showing various operations associated with an example method of generating an intra-transmission analytical model data structure. As shown at Block 902, an example anomalous transmission tracking system (e.g., the anomalous transmission tracking server 111) may parse the digital transmission data and user profile data retrieved from the enterprise system data repository to identify one or more data elements.

In various embodiments, the user profile data and the digital transmission data associated with the digital transmission identifier may be parsed to determine, as non-limiting examples, sender data (e.g., sender first name data, sender last name data, sender handler data, and sender nickname data), recipient data (e.g., recipient first name data, recipient last name data, and recipient handler data), attachment count data, digital transmission size data, keyword count data, recipient count data, and/or the like. For example, keyword count data may comprise a first keyword count data element defined by a value corresponding to the number of times "external", "[external]", or "[partner external]" are found in one or more portions of the digital transmission (e.g., instances of "external" an email subject line). Further, keyword count data may further comprise a second keyword count data element defined by a value corresponding to the number of times "forward", "FWD:", or "FW:" are found in one or more portions of the digital transmission (e.g., instances of "FWD:" an email subject line). Further still, in various embodiments, keyword count data may further comprise a third keyword count data element defined by a value corresponding to the number of times "reply" or "RE:" are found in one or more portions of the digital transmission (e.g., instances of "RE:" an email subject line).

As shown in Block 904, various sender data may be programmatically compared to recipient data to determine one or more similarity scores corresponding to a lexical similarity between various data elements defined by the sender data and the recipient data, respectively. For example, in various embodiments, the first similarity score may be a Jaccard similarity score determined using a Jaccard similarity algorithm. The Jaccard index is a statistical technique that provides ratio of intersection over union, which may be utilized by an anomalous transmission tracking system 110 to determine the lexical similarity between two data strings (e.g., text strings) with tokenizing techniques. In various embodiments, the one or more similarity scores may be calculated based on the optimal N-gram (where N is an integer such as 2, 4, or the like). Such optimal N-gram may be determined by performing feature engineering. Further, optimal N-gram used to calculate the one or more similarity scores may depend on the model development process used to build the intra-transmission analytical model. In an example embodiment, where the intra-transmission analytical model is built in accordance with a first example model development process described herein, the optimal N-gram may be 5-gram. In such example embodiment, the one or more similarity scores may be calculated with 5-gram to optimize the lexical similarity scores by minimizing the false effects (e.g., false positive effect and false negative effect). In another example embodiment, where the intra-transmission analytical model is built in accordance with a second example model development process described herein, the optimal N-gram may be 4-gram. It will be appreciated that in other embodiments, the one or more similarity scores may be calculated with 2-gram, 6-gram, or any suitable N-gram.

In various embodiments, the one or more similarity scores may comprise a first similarity score that is programmatically determined by comparing sender first name data (e.g., a first name of the sender) and recipient handler data (e.g., an email handler of the recipient). In various embodiments, the one or more similarity scores may further comprise a second similarity score that is programmatically determined by comparing sender handler data (e.g., an email handler of the sender) and recipient handler data (e.g., an email handler of the recipient). In various embodiments, the one or more similarity scores may further comprise a third similarity score that is programmatically determined by comparing sender last name data (e.g., a last name of the sender) and recipient handler data (e.g., an email handler of the recipient). In various embodiments, the one or more similarity scores may further comprise a fourth similarity score that is programmatically determined by comparing sender nickname data (e.g., a nickname of the sender) and recipient handler data (e.g., an email handler of the recipient).

As shown in Block 906, an intra-transmission analytical model data structure may be generated based on the one or more similarity scores and at least a portion of the one or more data elements associated with the digital transmission. In various embodiments, an intra-transmission analytical model data structure may be defined by a plurality of data elements associated with the digital transmission identifier that are collectively structured in a format that is operable with the intra-transmission analytical model defined by the anomalous transmission tracking system 110 such that the intra-transmission analytical model data structure associated with the digital transmission may be provided to the intra-transmission analytical model to predict whether the digital transmission is an anomalous transmission, as described herein.

In various embodiments, an intra-transmission analytical model data structure may comprise a plurality of data elements associated with the digital transmission identifier that each may be an input variable to be processed by an intra-transmission analytical model of the anomalous transmission tracking system 110. For example, the plurality of data elements defined by an intra-transmission analytical model data structure may comprise each of the plurality of determined lexical similarity scores (e.g., the first, second, third, and fourth similarity scores described above with respect to Block 904), and a plurality of the identified data elements defined by the metadata associated with the digital transmission. For example, in various embodiments, the generated intra-transmission analytical model data structure may include four similarity score model inputs defined by the first, second, third, and fourth similarity scores described above with respect to Block 904, respectively, and three digital transmission metadata model inputs defined by recipient count data, forward keyword count data, reply keyword count data, respectively.

Referring back to FIG. 3, the anomalous transmission tracking system 110 may retrieve historical digital transmission activity data associated with the sender and the recipient of the digital transmission (e.g., associated with the sender user identifier and the recipient transmission handler identifier associated with the digital transmission identifier) from an enterprise system data repository 122, as shown at Block 314. In various embodiments, the historical digital transmission activity data retrieved by the anomalous transmission tracking system 110 may be defined by stored digital transmission data associated with one or more of the digital transmission sender and the digital transmission recipient that defines historical digital transmission activity of the sender, the recipient, and/or a combination thereof. In various embodiments, the anomalous transmission tracking system 110 (e.g., an anomalous transmission tracking server 111) may retrieve historical digital transmission activity data from one or more stored data tables representing transmission logs (e.g., daily email logs) stored at the enterprise system data repository 122. For example, in various embodiments, the stored transmission logs may include one or more of a daily email log data table, a sender information data table, a recipient data table.

As shown at Block 316, a contextual analytical model data structure may be generated by the anomalous transmission tracking server 111. The anomalous transmission tracking server 111 may generate a contextual analytical model data structure based at least in part on the retrieved historical digital transmission activity data. Further, the contextual analytical model data structure generated by the anomalous transmission tracking server 111 may depend at least in part on the model development process leveraged to build the contextual analytical model for which the contextual analytical model data structure is being generated. For example, the contextual analytical model data structure for a contextual analytical model built using a first example model development process may be different from the contextual analytical model data structure for a contextual analytical model built using a second example model development process. In various embodiments, generating a contextual analytical model data structure may comprise parsing the historical digital transmission activity data retrieved from the enterprise system data repository 122 to identify one or more data elements for the contextual analytical model data structure. In various embodiments, the historical digital transmission activity data associated with one or more of a sender user identifier (e.g., a sender handler identifier) and a recipient identifier (e.g., a recipient handler identifier) may be parsed by the anomalous transmission tracking system 110 to determine a plurality of data elements. In an example embodiment where the contextual analytical model is generated in accordance with a first example model development process described herein, the historical digital transmission activity data associated with one or more of a sender user identifier (e.g., a sender handler identifier) and a recipient identifier (e.g., a recipient handler identifier) may be parsed by the anomalous transmission tracking system 110 to determine, as non-limiting examples, the plurality of data elements provided in table 1a below:

TABLE 1a

| SI No. | Data Element Name | Description |
|---|---|---|
| 1. | dstnct_senders | Distinct number of enterprise system users sending an outbound digital transmission to the same recipient digital transmission address (e.g., the same recipient external email address). |

TABLE 1a-continued

| SI No. | Data Element Name | Description |
|---|---|---|
| 2. | total_senders | Total number of digital transmissions sent from enterprise system users to the same external recipient digital transmission address. |
| 3. | tuple_traffic_out | Total number of digital transmissions going from the sender digital transmission address to the external recipient digital transmission address. |
| 4. | tuple_traffic_in | Total number of digital transmissions going from the external recipient digital transmission address to the sender digital transmission address. |
| 5. | dstnct_recipients | Distinct number of external transmission addresses that received transmissions from the sender digital transmission address. |
| 6. | total_recipients | Total number of external transmission addresses that received transmissions from the sender digital transmission address. |
| 7. | dstnct_receivers | Distinct number of internal transmission addresses associated with the enterprise system that received an email transmission from the external recipient digital transmission address. |
| 8. | total_receivers | Total number of internal transmission addresses associated with the enterprise system that received an email transmission from the external recipient digital transmission address. |
| 9. | avg_days_between | Average number of days between communication between the sender address tuple and an external recipient address tuple. |
| 10. | stddev_days_between | Standard deviation of days between communication between the sender address tuple and an external recipient address tuple. |
| 11. | blank_sub_ratio_out | The ratio of digital transmissions having a blank subject line sent from the sender digital transmission address to the external recipient digital transmission address. |
| 12. | fwds_ratio_out | The ratio of digital transmissions having a "forward" subject line sent from the sender digital transmission address to the external recipient digital transmission address. |
| 13. | replies_ratio_out | The ratio of digital transmissions having a "reply" subject line sent from the sender digital transmission address to the external recipient digital transmission address. |
| 14. | fwds_ratio_in | The ratio of digital transmissions having a "forward" subject line sent from the external recipient digital transmission address to the sender digital transmission address. |
| 15. | replies_ratio_in | The ratio of digital transmissions having a "reply" subject line sent from the external recipient digital transmission address to the sender digital transmission address. |
| 16. | blank_sub_ratio_in | The ratio of digital transmissions having a blank subject line sent from the external recipient digital transmission address to the sender digital transmission address. |

In an example embodiment where the contextual analytical model is generated in accordance with a second example model development process described herein, the historical digital transmission activity data associated with one or more of a sender user identifier (e.g., a sender handler identifier) and a recipient identifier (e.g., a recipient handler identifier) may be parsed by the anomalous transmission tracking system 110 to determine, as non-limiting examples, the plurality of data elements provided in Table 1b below:

TABLE 1b

| SI No. | Data Element Name/ Feature | Description |
|---|---|---|
| 1. | dstnct_senders | Distinct number of enterprise system users sending an outbound digital transmission to the same recipient digital transmission address (e.g., the same recipient external email address). |
| 2. | tuple_traffic_out | Total number of digital transmissions going from the sender digital transmission address to the external recipient digital transmission address. |

TABLE 1b-continued

| SI No. | Data Element Name/ Feature | Description |
|---|---|---|
| 3. | tuple__traffic__in | Total number of digital transmissions going from the external recipient digital transmission address to the sender digital transmission address. |
| 4. | dstnct__recipients | Distinct number of external transmission addresses that received transmissions from the sender digital transmission address. |
| 5. | dstnct__receivers | Distinct number of internal transmission addresses associated with the enterprise system that received an email transmission from the external recipient digital transmission address. |
| 6. | avg__days__between | Average number of days between communication between the sender address and an external recipient address tuple. |
| 7. | stddev__days__between | Standard deviation of days between communication between the sender address and an external recipient address tuple |
| 8. | blank__sub__ratio__out | The ratio of digital transmissions having a blank subject line sent from the sender digital transmission address to the external recipient digital transmission address. |
| 9. | fwds__ratio__out | The ratio of digital transmissions having a "forward" subject line sent from the sender digital transmission address to the external recipient digital transmission address. |
| 10. | replies__ratio__out | The ratio of digital transmissions having a "reply" subject line sent from the sender digital transmission address to the external recipient digital transmission address. |
| 11. | replies__ratio__in | The ratio of digital transmissions having a "reply" subject line sent from the external recipient digital transmission address to the sender digital transmission address. |
| 12. | blank__sub__ratio__in | The ratio of digital transmissions having a blank subject line sent from the external recipient digital transmission address to the sender digital transmission address. |
| 13 | Blank__sub__out | The number of digital transmissions having a blank subject line sent from the sender digital transmission address to the external recipient digital transmission address. |
| 14 | Fwd__sub__out | The number of digital transmissions having a "forward" subject line sent from the sender digital transmission address to the external recipient digital transmission address. |
| 15 | Blank__sub__in | The number of digital transmissions having a blank subject line sent from the external recipient digital transmission address to the sender digital transmission address. |
| 16 | Fwd__sub__in | The number of digital transmissions having a "forward" subject line sent from the external recipient digital transmission address to the sender digital transmission address. |
| 17 | Reply__sub__in | The number of digital transmissions having a "reply" subject line sent from the external recipient digital transmission address to the sender digital transmission address. |

In various embodiments, the contextual analytical model data structure may be generated based on the plurality of data elements corresponding to each (or a portion) of the above-listed data values derived from the historical digital transmission activity data associated with the sender and/or the recipient of the outbound digital transmission. For example, for a contextual analytical model built in accordance with a first example model development process described herein, the contextual analytical model data structure may be generated based on the plurality of data elements corresponding to each (or a portion) of the 16 data elements listed in Table 1a. As another example, for a contextual analytical model built in accordance with a second example model development process described herein, the contextual analytical model data structure may be generated based on the plurality of data elements corresponding to each (or a portion) of the seventeen data elements listed in Table 1b. In various embodiments, a contextual analytical model data structure may be defined by a plurality of data elements associated with the digital transmission identifier that are collectively structured in a format that is operable with the contextual analytical model defined by the anomalous transmission tracking system 110 such that the contextual analytical model data structure associated with the digital transmission may be provided to the contextual analytical model to predict whether the digital transmission is an anomalous transmission, as described herein. In various embodiments, a contextual analytical model data structure may comprise a plurality of data elements associated with the digital transmission identifier that each may be an input variable to be processed by a contextual analytical model of the anomalous transmission tracking system 110.

As shown at Block 318, the method 300 may continue with executing one or more anomalous transmission prediction models using input data structures associated with the digital transmission identifier. In various embodiments, an example anomalous transmission tracking system 110 may be configured to execute two anomalous transmission prediction models, including an intra-transmission analytical model and a contextual analytical model. The anomalous transmission tracking system 110 may execute the intra-transmission analytical model by providing the intra-transmission analytical model with the generated intra-transmission analytical model data structure associated with the digital transmission identifier, as described above with respect to Block 312. Further, anomalous transmission tracking system 110 may execute the contextual analytical model by providing the contextual analytical model with the generated contextual analytical model data structure associated with the digital transmission identifier, as described above with respect to Block 316.

Based at least in part on the model output of the one or more anomalous transmission prediction models, the anomalous transmission tracking system 110 may determine that the outbound digital transmission is an anomalous transmission, as shown at Block 320. For example, in various embodiments, the anomalous transmission tracking system 110 may determine that the outbound digital transmission is an anomalous transmission based at least on a first model output provided by the intra-transmission analytical model, a second model output provided by the contextual analytical model, and/or a combined model output defined by a combination of the first and second model outputs. In various embodiments, the respective model outputs for the intra-transmission analytical model and the contextual analytical model are each defined by a personal digital transmission flag that indicates that the corresponding model determined the digital transmission to be a personal digital transmission (e.g., an email home) based on the input data structure.

Based on whether the intra-transmission analytical model and the contextual analytical model produce one or more personal digital transmission flags, the anomalous transmission tracking system 110 may determine that the digital transmission is an anomalous transmission, which may require further manual or programmatic review to identify whether the anomalous transmission is impermissibly exfiltrating data from the enterprise system. In some embodiments, each model may have different strengths that, when combined, produce more comprehensive coverage for accurate results. For example, anomalous transmissions with low lexical similarity in sender and recipient may not be identified by the intra-transmission analytical model as potentially anomalous, but the contextual analytical model may still trigger a flag. In some example embodiments, the digital transmission flag may not calculate or may exclude any output or result based on the contents of the digital transmission (e.g., whether the contents are confidential, sensitive, or the like) and may flag the communication based on the analysis of the intended recipient and/or context surrounding the transmission.

In some embodiments, a pre-screening filter may be applied to the inputs of either model. For example, a subset of transmission means or protocols may be selected for screening. In some embodiments, for example, common personal webmails and domains may be selected for screening while common enterprise transmission recipients may be filtered out prior to training and/or application of the model(s).

In various embodiments, the anomalous transmission tracking system 110 may be configured to predict whether the outbound digital transmission is an anomalous transmission by combining the respective model outputs of the intra-transmission analytical model and the contextual analytical model. In various embodiments, a given outbound digital transmission may be predicted to be an anomalous transmission if either of the output of the intra-transmission analytical model or the output of the contextual analytical model is an anomalous transmission prediction.

In some other embodiments, the final prediction for an outbound digital transmission may be based on the confidence level associated with the output of the intra-transmission analytical model and the confidence level of the output of the contextual analytical model. The confidence level can be produced in any of a variety of ways. For instance, machine learning classification algorithms can compare the similarity of the personal email patterns they learned during the training process (e.g., during model development) with the corresponding email pattern, and output a confidence level based on that similarity. The confidence level can be provided to the downstream user along with the classification label. As an illustrative example, an intra-transmission analytical model may be executed to produce a model output defined by a prediction that the outbound digital transmission is an anomalous transmission, including a defined confidence level of 80%, which is derived based at least in part on the lexical similarity score features and the metadata features generated in association with the outbound data transmission. Further, a contextual analytical model may be executed to produce a model output defined by a prediction that the outbound digital transmission is an anomalous transmission, including a defined confidence level of 88%, which is derived based at least in part on the contextual analytical features associated with the historical digital transmission activity data associated with the sender user and the recipient.

In various embodiments, the intra-transmission analytical model output of an anomalous transmission predicted with 80% confidence and the intra-transmission analytical model output of an anomalous transmission predicted with 88% confidence may be combined to produce a final model output, which may be utilized to determine the final prediction of the anomalous transmission tracking system 110 with respect to the outbound digital transmission. For example, in such an example circumstance, the final model output may be defined by a combined prediction that the digital transmission is an anomalous transmission, which is predicted at a confidence level of 84%, reflective of the combined confidence levels of the intra-transmission analytical model output and the contextual analytical model output. In various embodiments, the combined model output may more heavily weight the output model of the contextual analytical model. For example, using the illustrative example, provided above, the final model output may be defined by a combined prediction that the digital transmission is an anomalous transmission, which is predicted at a confidence level of 86%, reflective of the combined confidence levels of the intra-transmission analytical model output and the contextual analytical model output, wherein the contextual analytical model output is weighed at a ratio of 2:1 relative to the intra-transmission analytical model output. In some embodiments, either model generating an indication of an anomalous digital transmission may be sufficient to trigger further secondary review.

In various embodiments, the intra-transmission analytical model and the contextual analytical model may be executed by the anomalous transmission tracking server 111 at least partially at the same time, sequentially, and/or in series. In various embodiments, the anomalous transmission tracking system 110 may be configured to determine that a final model output is a prediction of a positive result (e.g., an anomalous transmission) based on one or more of the model outputs satisfying a confidence level threshold that the digital transmission is an anomalous transmission. Alternatively, in various embodiments, the anomalous transmission tracking system 110 may be configured to determine that a final model output is a prediction of a positive result (e.g., an anomalous transmission) only in an example circumstance wherein each of the one or more of the machine learning model outputs satisfies a confidence level threshold that the digital transmission is an anomalous transmission.

In some embodiments, one or more filters may be applied to an output of the intra-transmission analytical model. Such one or more filters may be optional. In an example embodiment where the intra-transmission analytical model is built in accordance with the second example model development process described herein, the one or more filters may comprise a phone number detection filter (described further below) that may or may not be applied to an output of the intra-transmission analytical model. In such example embodiments, the intra-transmission analytical model may feed into the phone number detection filter. In examples, a phone number detection occurs as part of a process involving a rules-based model.

As shown at Block 322, upon determining that the digital transmission is an anomalous transmission, the anomalous transmission tracking system 110 may generate an anomalous transmission flag associated with the digital transmission identifier. In various embodiments, the anomalous transmission tracking system 110 may further append the anomalous transmission flag to the digital transmission data associated with the digital transmission identifier to define updated digital transmission data. In various embodiments, anomalous transmission tracking system 110 may transmit the updated digital transmission data associated with the digital transmission identifier, including the anomalous transmission flag, to the enterprise system data repository 122 for storage, as shown at Block 324.

In various embodiments, an anomalous transmission flag being appended to a data structure associated with the digital transmission identifier may prevent the enterprise system from executing further operations relating to the transmission of the digital transmission to the external digital transmission system associated with the recipient. The anomalous transmission flag appended to the digital transmission data associated with the digital transmission may function as an indication to any devices and/or users of the enterprise system that human interaction (e.g., a human-executed review) by a user of the enterprise system (e.g., a reviewer/agent of the enterprise that operates the enterprise system) is required in order for the digital transmission to be approved for transmission to an external digital transmission system.

In various embodiments, as shown at Block 326, the anomalous transmission tracking system 110 may transmit the updated digital transmission data associated with the digital transmission identifier, including the anomalous transmission flag appended thereto, to a second internal client computing device 123N associated with the enterprise system. For example, in various embodiments, the second internal client computing device 123N may be associated with a second user identifier associated with the enterprise server that is different than the first sender user identifier associated with the digital transmission identifier and/or the first internal client computing device 123A from which the digital transmission was sent. The updated digital transmission data transmitted by the anomalous transmission tracking system 110 may be configured to cause at least a portion of the updated digital transmission data, including the digital transmission determined to be an anomalous transmission, to be displayed at a graphic user interface defined by the second internal client computing device 123N for user review, as shown at Block 328. For example, the second internal client computing device 123N may be associated with a reviewer/agent of the enterprise system. The second internal client computing device 123N may be configured to display the anomalous transmission such that the employee user associated therewith may review the digital transmission to determine whether the digital transmission defines an impermissible exfiltration of enterprise data (e.g., information, documents, and/or the like). In various embodiments, the anomalous transmission tracking system 110 may initiate a suspension of sender identifier account associated with the digital transmission in response to an anomalous transmission prediction or take another action. In some examples, such suspension or other remediation occurs automatically in response to detection or is the result of manual review and intervention responsive to an email being flagged as a personal email.

Figure 4:
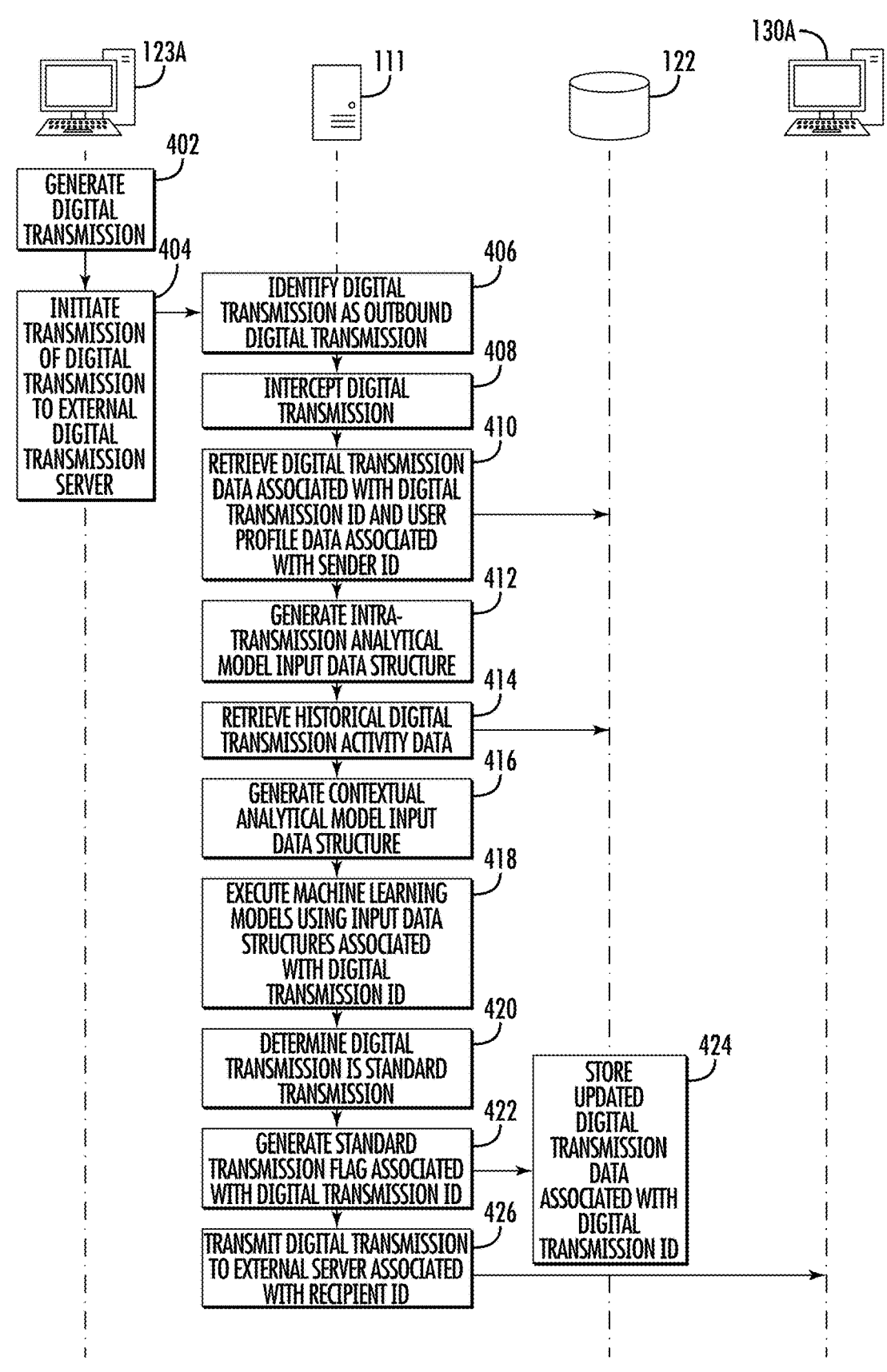
FIG. 4 illustrates a lane diagram showing functionality of various components in accordance with one or more embodiments of the present disclosure.

Referring now to FIG. 4, illustrates a lane diagram showing functionality of various components in accordance with one or more embodiments of the present disclosure. In particular, FIG. 4 depicts example operations for executing a digital transmission inspection workflow to determine that an outbound digital transmission is a standard transmission, in accordance with various embodiments of the present disclosure. As shown in FIG. 4, the various operations corresponding to the illustrated Blocks 402-418 are at least substantially similar to those described with respect to the Blocks 302-320 illustrated in FIG. 3. Accordingly, the present discussion begins with Block 418, at which the anomalous transmission tracking system 110 determines that the intercepted digital transmission is a standard transmission. Based at least in part on the model output of the one or more machine learning models, the anomalous transmission tracking system 110 may determine that the outbound digital transmission is a standard transmission. For example, in various embodiments, the anomalous transmission tracking system 110 may determine that the outbound digital transmission is a standard transmission based at least on a first model output provided by the intra-transmission analytical model, a second model output provided by the contextual analytical model, and/or a combined model output defined by a combination of the first and second model outputs.

As described herein, the respective model outputs for the intra-transmission analytical model and the contextual analytical model may each be defined by a standard transmission flag that indicates that the corresponding model determined the digital transmission to be a standard transmission (e.g., a non-personal email for transmitted for an enterprise-related purpose) based on the input data structure. In various embodiments, based on whether the intra-transmission analytical model and the contextual analytical model produce one or more standard transmission flags, the anomalous transmission tracking system 110 may determine that the digital transmission is a standard transmission. Further in various embodiments, the determination by the anomalous transmission tracking system 110 that a digital transmission is a standard transmission may be based on based neither the intra-transmission analytical model nor the contextual analytical model producing a personal digital transmission flag.

As shown at Block 422, upon determining that the digital transmission is a standard transmission, the anomalous transmission tracking system 110 may generate standard transmission flag associated with the digital transmission identifier. In various embodiments, the anomalous transmission tracking system 110 may further append the standard transmission flag to the digital transmission data associated with the digital transmission identifier to define updated digital transmission data. In various embodiments, anomalous transmission tracking system 110 may transmit the updated digital transmission data associated with the digital transmission identifier, including the anomalous transmission flag, to the enterprise system data repository 122 for storage, as shown at Block 424. In various embodiments, an anomalous transmission flag being appended to a data structure associated with the digital transmission identifier may function as an indication that the digital transmission associated therewith has been inspected by the anomalous transmission tracking system 110 and approved as a standard transmission, such that the enterprise system may proceed with further operations relating to the transmission of the digital transmission to the external digital transmission system (e.g., external digital transmission server 130) associated with the recipient.

Further, in various embodiments, as shown at Block 426, upon determining that the digital transmission is a standard transmission, the anomalous transmission tracking system 110 may transmit the digital transmission to the external digital transmission server 130 associated with the recipient of the digital transmission, as defined by the digital transmission data. In various embodiments wherein the anomalous transmission tracking system 110 defines a separate system that is not part of the enterprise system, the anomalous transmission tracking system 110 may either transmit the digital transmission to the external digital transmission server 130 itself or facilitate a transmission of the digital transmission to the external digital transmission server 130 by the enterprise system. For example, the anomalous transmission tracking system 110 may facilitate the enterprise system transmission of the digital transmission to the external digital transmission server 130 by either forgoing taking any further intervening action that would prevent the already-initiated transmission of the digital transmission to the external digital transmission server 130, or, additionally and/or alternatively, transmitting one or more instructional signals to the enterprise system that causes the enterprise system to proceed with the previously-initiated digital transmission.

FIG. 5a illustrates an example system architecture and various associated operation flows in accordance with one or more embodiments of the present disclosure. In particular, FIG. 5a depicts example anomalous transmission tracking system architecture, including various operations of a digital transmission inspection workflow executed by an example anomalous transmission tracking server. The example anomalous transmission tracking server of FIG. 5a may utilize one or more anomalous transmission prediction models built in accordance with a first example model development process described herein; however, some or all of the process may be substituted as described in various embodiments herein. For example, a process other than XGBoost may optionally be used. In some examples, a model selection process may be used to identify a model from among a plurality of possible models with the best performance as described herein. The example system architecture 500a illustrated in FIG. 5a is provided for illustrative purposes as a non-limiting example embodiment of an architecture for an anomalous transmission tracking system configured for communication with an enterprise system to detect anomalous transmissions associated with the enterprise system by executing a digital transmission inspection workflow.

In some embodiments, as illustrated by the example system architecture 500a, a digital transmission inspection workflow may begin with one or more data ingestion operations. In various embodiments, the anomalous transmission tracking system may execute a digital transmission inspection workflow in relation to a digital transmission comprising an email message sent from an internal client computing device by a sender user associated with the enterprise system to an external client computing device associated with a receiver having an email address associated with an external digital transmission system (e.g., outside the enterprise computing system and/or to a non-enterprise domain). As illustrated, a digital transmission inspection workflow associated with an outbound email message sent from an internal sender to an external recipient may include retrieving digital transmission data corresponding to the email message from an enterprise system data repository of the enterprise system. As illustrated at Block 510a, the anomalous transmission tracking system may access email logs stored by the enterprise system (e.g., at an enterprise system data repository).

In some embodiments, the operation of the illustrated architecture continues at Block 520a when the anomalous transmission tracking system (e.g., by way of anomalous transmission tracking server 111 or other computing device) processes the digital transmission data retrieved from the email logs to generate, and/or otherwise access a table, such as for example, a Hadoop Hive table. For example, in some embodiments, a Hadoop Hive table or other data set may comprise a data table defined by various data associated with the outbound email message, the email message sender, the email message recipient, which has been formatted in a specific format to facilitate the execution of one or more HADOOP data processing functions as part of the digital transmission inspection workflow.

In some embodiments, the operation of the illustrated architecture continues at Block 530a when the anomalous transmission tracking system (e.g., by way of anomalous transmission tracking server 111 or other computing device) processes the digital transmission data from one or more of the email logs and the table (e.g., Hadoop Hive table or the like) to generate, and/or otherwise access an email table (e.g., an email table or the like). In various embodiments, the email table may comprise a data table defined by various data associated with the outbound email message, the email message sender, the email message recipient, which has been formatted in a specific format to facilitate the execution of one or more functions (e.g., data store functions or the like) as part of the digital transmission inspection workflow.

In some embodiments, represented by Block 540a, the anomalous transmission tracking system (e.g., by way of anomalous transmission tracking server 111 or other computing device) accesses an email user hierarchy database stored by the enterprise system (e.g., within an enterprise system data repository). In various embodiments, the anomalous transmission tracking system may access the stored email user hierarchy to retrieve user profile data associated with the email sender of the email message (e.g., a stored nickname for the email user user).

In some embodiments, the operation of the illustrated architecture continues at Block 550a when the anomalous transmission tracking system (e.g., by way of anomalous transmission tracking server 111 or other computing device) processes at least a portion of the digital transmission data retrieved from one or more of the email logs, the Hadoop Hive table, the email table, and the stored email user hierarchy by flattening multiple datasets defined within the retrieved data.

In some embodiments, the operation of the illustrated architecture continues at Block 560a when the anomalous transmission tracking system (e.g., by way of anomalous transmission tracking server 111 or other computing device) builds a plurality of lexical features defined by the outbound email message for input into the intra-transmission analytical model of the anomalous transmission tracking system.

For example, in an example system architecture wherein the anomalous transmission tracking system utilizes an intra-transmission analytical model comprising a lexical machine learning model, the anomalous transmission tracking server may build the plurality of lexical features to define a model input data structure for the intra-transmission analytical model (e.g., intra-transmission analytical model data structure). For example, as illustrated, Block 560a may comprise Block 561a, wherein the anomalous transmission tracking system (e.g., by way of anomalous transmission tracking server 111 or other computing device) builds a plurality of text similarity features based on data corresponding to email sender and the email recipient. As described herein, building the text similarity features may comprise executing one or more algorithms, such as a plurality of Jaccard similarity algorithms using at least a portion of the flattened datasets to determine a plurality of lexical similarity scores (e.g., Jaccard similarity scores). The plurality of lexical similarity scores may define four distinct similarity features corresponding to the determined lexical similarities between the recipient email handler and some or all of the sender first name, sender last name, sender email handler, and sender nickname, respectively.

Further, as illustrated, Block 560a may comprise Block 562a, wherein the anomalous transmission tracking system (e.g., by way of anomalous transmission tracking server 111 or other computing device) builds a plurality of email metadata features based on retrieved digital transmission metadata associated with the email message. As described herein, building the metadata features may comprise generating a plurality of data elements pulled from the flattened datasets(s) corresponding to the metadata associated with the email message, including a first metadata feature defined by recipient count data associated with the email message, a second metadata feature defined by forward keyword count data associated with the email message, and/or a third metadata feature defined by reply keyword count data associated with the email message. The anomalous transmission tracking system (e.g., by way of anomalous transmission tracking server 111 or other computing device) may generate an intra-transmission analytical model data structure comprising a plurality of data elements corresponding to the features built in Block 560a that are configured be provided to the intra-transmission analytical model in a format that facilitates operation of the intra-transmission analytical model.

In some embodiments, the operation of the illustrated architecture continues at Block 570a when the anomalous transmission tracking system (e.g., by way of anomalous transmission tracking server 111 or other computing device) builds a plurality of behavioral features defined by the outbound email message for input into the contextual analytical model of the anomalous transmission tracking system. For example, in an example system architecture wherein the anomalous transmission tracking system utilizes a contextual analytical model comprising a behavioral machine learning model, the anomalous transmission tracking system, via an anomalous transmission tracking server thereof, may build a plurality of behavioral features based on historical transmission activity data related to the email sender and/or the designated recipient to define a model input data structure for the contextual analytical model (e.g., a contextual analytical model data structure).

Based on the historical transmission activity data retrieved from the enterprise system, such as, for example, sender email history data of the sender user, recipient email history data associated with the recipient, and email history data associated with one or more email messages sent from the sender to the recipient, the anomalous transmission tracking system may build a plurality of behavioral features that each characterize a respective aspect of the digital transmission history of the sender and/or the recipient. As described herein with respect to Table 1a, provided above, the plurality of behavioral features (e.g., contextual features) built at Block 570a may comprise 16 distinct data elements that each comprise a respective data derived from at least a portion of the datasets flattened at Block 550a. The anomalous transmission tracking system (e.g., by way of anomalous transmission tracking server 111 or other computing device) may generate a contextual analytical model data structure comprising a plurality of data elements corresponding to the features built in Block 570a that are configured be provided to the contextual analytical model in a format to facilitate operation of the contextual analytical model.

In some embodiments, the operation of the illustrated architecture continues at Block 580a when the anomalous transmission tracking system (e.g., by way of anomalous transmission tracking server 111 or other computing device) executes the one or more machine learning models defined by the anomalous transmission tracking system. As shown at Block 581a, the illustrated example anomalous transmission tracking system is configured to execute an intra-transmission analytical model using a lexical XGBoost classifier. The intra-transmission analytical model is provided with an intra-transmission analytical model data structure comprising the textual similarity features and the metadata features built at Block 560a (e.g., operations 561a and 562a, respectively) as a model input. The goal of this intra-transmission analytical model is to programmatically determine, based on the lexical features (e.g., the lexical similarity score features and the metadata features defined by the email message), if the outbound email message is a personal "email home" sent by the sender user from an internal client computing device associated with the enterprise system to a personal email account of the sender user that is associated with an external digital transmission system (e.g., an external email server).

Further, as shown at Block 582a, the illustrated example anomalous transmission tracking system is configured to execute a contextual analytical model using a behavioral XGBoost classifier. The contextual analytical model is provided with a contextual analytical model data structure comprising the behavioral features built at Block 570a as a model input. The contextual analytical model may be configured to programmatically determine, based on the plurality of behavioral features derived from the historical email activity data associated with the sender user and the recipient of the outbound email message, if the outbound email message is a personal "email home" sent by the sender user from an internal client computing device associated with the enterprise system to a personal email account of the sender user that is associated with an external digital transmission system (e.g., an external email domain/server).

In some embodiments, both the intra-transmission analytical model and the contextual analytical model are executed by running a Python model execution script on a container orchestration system or elsewhere to execute respective XGBoost algorithms that are each a kind of gradient boosting algorithm. In the example architecture 500a illustrated in FIG. 5a, the intra-transmission analytical model may be executed to provide one or more model outputs comprising at least one lexical anomalous transmission probability score. Further, the contextual analytical model may be executed to provide one or more model outputs comprising at least one behavioral anomalous transmission probability score.

In some embodiments, the operation of the illustrated architecture continues at Block 583a when the anomalous transmission tracking system (e.g., by way of anomalous transmission tracking server 111 or other computing device) sets one or more heuristic filters around the respective model outputs of the intra-transmission analytical and contextual analytical models (e.g., the lexical anomalous transmission probability score, the behavioral anomalous transmission probability score). As shown in the non-limiting example below, one or more heuristic rules-based filters may be set for one or more of the lexical anomalous transmission probability scores defined by the intra-transmission analytical model output:

(lexical_test_data.lex_prob>=0.7) &
  ((lexical_test_data ['jc_nkname']>=0.1)|
  (lexical_test_data ['jc_handlers']>=0.1)|
  (lexical_test_data ['jc_lname']>=0.1)|
  (lexical_test_data ['jc_fname']>=0.1))

By setting the above conditions as the classification threshold, the anomalous transmission tracking system may set the most conservative classification that is feasible without degrading the accuracy of the intra-transmission analytical model. Further, one or more heuristic rules-based filters may also be set for one or more of the behavioral anomalous transmission probability scores defined by the contextual analytical model output. As a non-limiting example, by raising the classification threshold from 0.5 to 0.9, the anomalous transmission tracking system may set the most conservative classification that is feasible without degrading the accuracy of the contextual analytical model.

In some embodiments, the operation of the illustrated architecture continues at Block 584a when the anomalous transmission tracking system (e.g., by way of anomalous transmission tracking server 111 or other computing device) combines the respective model outputs from the intra-transmission analytical model and the contextual analytical model. As described herein, the outputs from the respective models may be combined in several ways, including but not limited to operating the models in parallel and triggering further review and possible downstream effects on the sender (e.g., account locking) if either model independently identifies a likelihood of an "email home" above the predetermined thresholds or other trigger conditions associated with each model. In some instances, the analysis process may stop and downstream anti-exfiltration processes (e.g., sending for increased review, locking user accounts, etc.) may begin as soon as either model signals a likelihood of an "email home" (e.g., terminating or not performing any remaining steps. For example, in instances in which the models are run in parallel, any incomplete analysis may be halted or not performed as soon as either model signals a likelihood of an "email home". In instances in which the models are run sequentially, downstream analyses may be skipped when the first model signals a likelihood of an "email home".

In some embodiments, the operation of the illustrated architecture continues at Block 590a when the anomalous transmission tracking system (e.g., by way of anomalous transmission tracking server 111 or other computing device) generates a final prediction data table (e.g., a Greenplum final prediction data table) defined at least in part by one or more data elements associated with the email message that correspond to the combined model output from the intra-transmission analytical and contextual analytical models.

FIG. 5b illustrates an example system architecture and various associated operation flows in accordance with one or more embodiments of the present disclosure. In particular, FIG. 5b depicts example anomalous transmission tracking system architecture, including various operations of a digital transmission inspection workflow executed by an example anomalous transmission tracking server. In particular, the example anomalous transmission tracking server of FIG. 5b may utilize one or more anomalous transmission prediction models built in accordance with a second example model development process described herein. Some or all of the described process may be substituted for other components or processes/sub-processes as described in various embodiments herein. The example system architecture 500b illustrated in FIG. 5b is provided for illustrative purposes as a non-limiting example embodiment of an architecture for an anomalous transmission tracking system configured for communication with an enterprise system to detect anomalous transmissions associated with the enterprise system by executing a digital transmission inspection workflow.

In some embodiments, as illustrated by the example system architecture 500b a digital transmission inspection workflow may begin with one or more data ingestion operations. In various embodiments, the anomalous transmission tracking system may execute a digital transmission inspection workflow in relation to a digital transmission comprising an email message sent from an internal client computing device by a sender user associated with the enterprise system to an external client computing device associated with a receiver having an email address associated with an external digital transmission system. As illustrated, a digital transmission inspection workflow associated with an outbound email message sent from an internal sender to an external recipient may include retrieving digital transmission data corresponding to the email message from an enterprise system data repository of the enterprise system. As illustrated at Block 510b, the anomalous transmission tracking system may access email logs stored by the enterprise system (e.g., at an enterprise system data repository).

In some embodiments, the operation of the illustrated architecture continues at Block 520b when the anomalous transmission tracking system (e.g., by way of anomalous transmission tracking server 111 or other computing device) processes the digital transmission data retrieved from the email logs to generate, and/or otherwise access a table such as, for example, a HADOOP HIVE table. For example, in some embodiments, the table may comprise a data table defined by various data associated with the outbound email message, the email message sender, the email message recipient, which has been formatted in a specific format to facilitate the execution of one or more HADOOP data processing functions as part of the digital transmission inspection workflow.

In some embodiments, the operation of the illustrated architecture continues at Block 530b when the anomalous transmission tracking system (e.g., by way of anomalous transmission tracking server 111 or other computing device) processes the digital transmission data from one or more of the email logs and the table to generate, and/or otherwise access an email table (e.g., a GREENPLUM email table or the like). In various embodiments, the email table may comprise a data table defined by various data associated with the outbound email message, the email message sender, the email message recipient, which has been formatted in a specific format to facilitate the execution of one or more functions (e.g., GREENPLUM functions or the like) as part of the digital transmission inspection workflow.

In some embodiments, the operation of the illustrated architecture continues at Block 540b when the anomalous transmission tracking system (e.g., by way of anomalous transmission tracking server 111 or other computing device) accesses an email user hierarchy database stored by the enterprise system (e.g., within an enterprise system data repository). In various embodiments, the anomalous transmission tracking system may access the stored email user hierarchy to retrieve user profile data associated with the email sender of the email message (e.g., a stored nickname for the email user user).

In some embodiments, the operation of the illustrated architecture continues at Block 550b when the anomalous transmission tracking system (e.g., by way of anomalous transmission tracking server 111 or other computing device) processes at least a portion of the digital transmission data retrieved from one or more of the email logs, the table, the email table, and the stored email user hierarchy by flattening multiple datasets defined within the retrieved data.

In some embodiments, the operation of the illustrated architecture continues at Block 560b when the anomalous transmission tracking system (e.g., by way of anomalous transmission tracking server 111 or other computing device) builds a plurality of lexical features defined by the outbound email message for input into the intra-transmission analytical model of the anomalous transmission tracking system.

For example, in an example system architecture wherein the anomalous transmission tracking system utilizes an intra-transmission analytical model comprising a lexical model, the anomalous transmission tracking server may build the plurality of lexical features to define a model input data structure for the intra-transmission analytical model (e.g., intra-transmission analytical model data structure). For example, at Block 561b, the anomalous transmission tracking system (e.g., by way of anomalous transmission tracking server 111 or other computing device) builds a plurality of text similarity features based on data corresponding to email sender and the email recipient. As described herein, building the text similarity features may comprise executing a plurality of Jaccard similarity algorithms using at least a portion of flattened datasets to determine a plurality of lexical similarity scores (e.g., Jaccard similarity scores). The plurality of lexical similarity scores may define four distinct similarity features corresponding to the determined lexical similarities between the recipient email handler and each of the sender first name, sender last name, sender email handler, and sender nickname, respectively.

In some embodiments, the operation of the illustrated architecture continues at Block 562b, wherein the anomalous transmission tracking system (e.g., by way of anomalous transmission tracking server 111 or other computing device) builds a plurality of email metadata features based on retrieved metadata associated with the email message. As described herein, building the metadata features may comprise generating a plurality of data elements pulled from the flattened datasets(s) corresponding to the metadata associated with the email message, including a first metadata feature defined by recipient count data associated with the email message, a second metadata feature defined by forward keyword count data associated with the email message, and a third metadata feature defined by reply keyword count data associated with the email message. The anomalous transmission tracking system (e.g., by way of anomalous transmission tracking server 111 or other computing device) may generate an intra-transmission analytical model data structure comprising a plurality of data elements corresponding to the features built in Block 560b that are configured be provided to the intra-transmission analytical model in a format that facilitates operation of the intra-transmission analytical model.

In some embodiments, the operation of the illustrated architecture continues at Block 563b, wherein the anomalous transmission tracking system (e.g., by way of anomalous transmission tracking server 111 or other computing device) builds one or more phone number matching features based on internal sender phone number data and internal sender handler data (e.g., internal sender email address). In an example embodiment, the one or more phone number matching features may define one or more of four distinct matching features: area code match that describes whether the area code portion of an internal sender phone number matches any portion of internal sender handler data, prefix match that describes whether the middle three digit of the internal sender phone number matches any portion of the internal sender handler data, line match that describes whether the last four digits of the internal sender phone number matches any portion of the internal sender handler data, and length match that describes whether the number of digits in the area code portion of the internal sender phone number matches the number of numerical digits (e.g., consecutive digits) in the internal sender handler data.

In some embodiments, the operation of the illustrated architecture continues at Block 570b when the anomalous transmission tracking system (e.g., by way of anomalous transmission tracking server 111 or other computing device) builds a plurality of behavioral features defined by the outbound email message for input into the contextual analytical model of the anomalous transmission tracking system. For example, in an example system architecture wherein the anomalous transmission tracking system utilizes a contextual analytical model comprising a behavioral machine learning model, the anomalous transmission tracking system, via an anomalous transmission tracking server thereof, may build a plurality of behavioral features based on historical transmission activity data related to the email sender and/or the designated recipient to define a model input data structure for the contextual analytical model (e.g., a contextual analytical model data structure).

Based on the historical transmission activity data retrieved from the enterprise system, such as, for example, sender email history data of the sender user, recipient email history data associated with the recipient, and email history data associated with one or more email messages sent from the sender to the recipient, the anomalous transmission tracking system may build a plurality of behavioral features that each characterize a respective aspect of the digital transmission history of the sender and/or the recipient. As described herein with respect to Table 1b, provided above, the plurality of behavioral features (e.g., contextual features) built at Block 570b may comprise seventeen distinct data elements that each comprise a respective data derived from at least a portion of the datasets flattened at Block 550b. The anomalous transmission tracking system (e.g., by way of anomalous transmission tracking server 111 or other computing device) may generate a contextual analytical model data structure comprising a plurality of data elements corresponding to the features built in Block 570b that are configured be provided to the contextual analytical model in a format that facilitates operation of the contextual analytical model.

In some embodiments, the operation of the illustrated architecture continues at Block 580b when the anomalous transmission tracking system (e.g., by way of anomalous transmission tracking server 111 or other computing device) executes the one or more anomalous transmission prediction models defined by the anomalous transmission tracking system. As shown at Block 581b, the example anomalous transmission tracking system is configured to execute an intra-transmission analytical model (e.g., using a lexical rules-based classifier). The intra-transmission analytical model is provided with an intra-transmission analytical model data structure comprising the textual similarity features and the metadata features built at Block 560b (e.g., operations 561b and 562b, respectively) as a model input. The goal of this intra-transmission analytical model is to programmatically determine, based on the lexical features (e.g., the lexical similarity score features and the metadata features defined by the email message), if the outbound email message is a personal "email home" sent by the sender user from an internal client computing device associated with the enterprise system to a personal email account of the sender user that is associated with an external digital transmission system (e.g., an external email server).

Further, as shown at Block 582b, the example anomalous transmission tracking system may, in some embodiments, be further configured to execute a downstream filter following an output from the lexical model (e.g., a phone number detection filter algorithm). Further, the metadata features in the intra-transmission analytical model may include the internal sender handler data (e.g., internal sender email address). The intra-transmission analytical model may be configured to programmatically determine, based on the phone number matching features (e.g., area code match, prefix match, line match, and/or length match based on one or more portions of the email recipient handler), if the outbound email message is a personal "email home" sent by the sender user from an internal client computing device associated with the enterprise system to a personal email account of the sender user that is associated with an external digital transmission system (e.g., an external email server). In various embodiments, the downstream filter is mandatory or optional and may not be executed. In some examples, the downstream filter may be able to override the output of other portions of a system. For instance, a downstream filter may detect that there is part of an employee phone number in the recipient handler, the system may apply a personal email flag for the case regardless of output of lexical, behavior, or other models.

Figure 10:
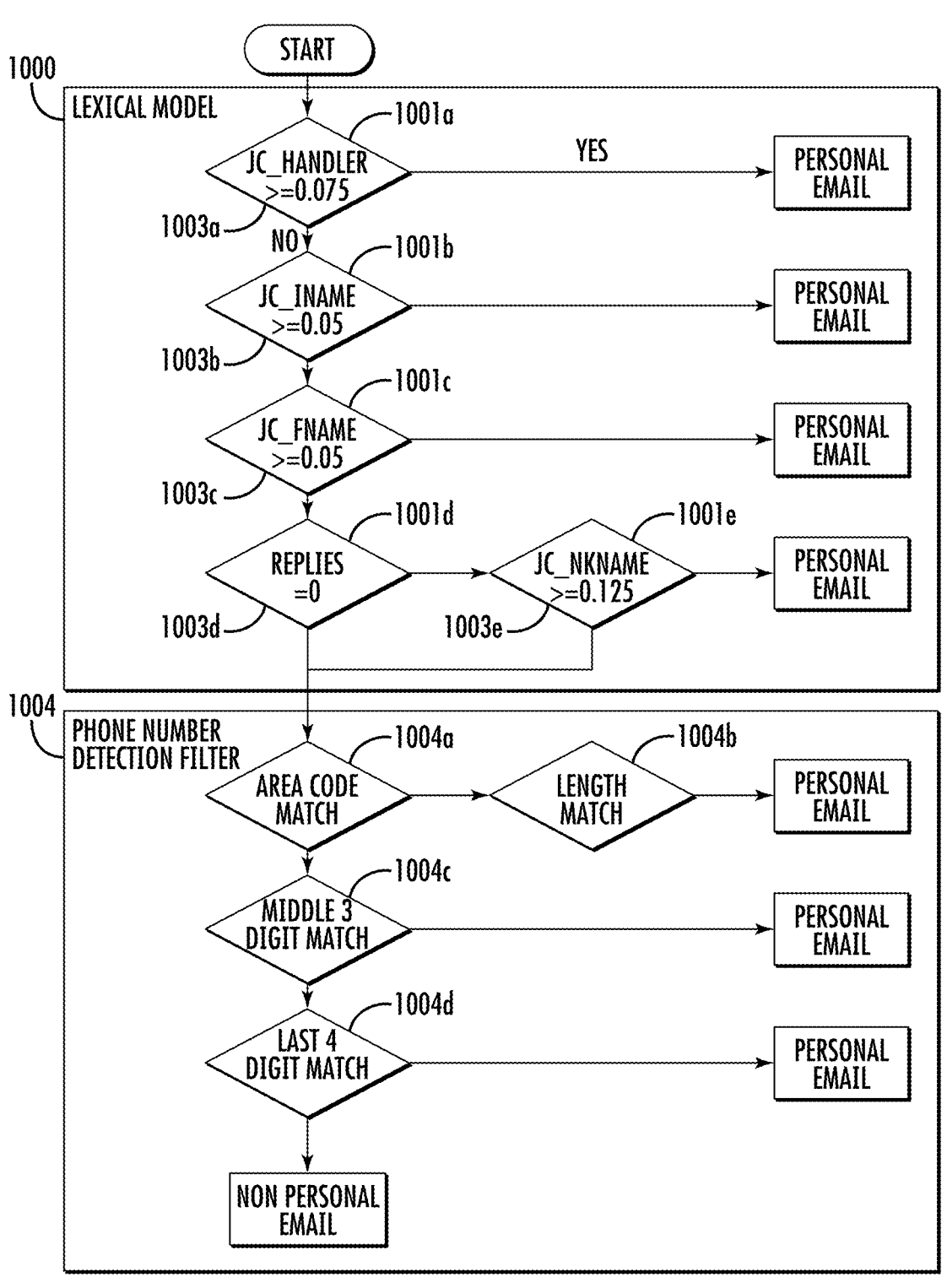
FIG. 10 illustrates an example lexical model rules-based algorithm and phone number detection filter in accordance with an example embodiment of the present disclosure.

In some example embodiments, the intra-transmission analytical model comprises one or more rules-based algorithms (e.g., lexical model 1000) as shown in FIG. 10. The anomalous transmission tracking system (e.g., by way of anomalous transmission tracking server 111 or other computing device) may utilize the intra-transmission analytical model to iteratively analyze the lexical features (e.g., one or more lexical similarity scores such as jc_handler similarity score, jc_lname similarity score 1001b, jc_fname similarity score 1001c, jc_nkname similarity score 1001e and/or one or more metadata features such as replies metadata feature 1001d) associated with a digital transmission to determine whether a condition (e.g., any one or more of 1003a-e) defined by a lexical feature (e.g., lexical similarity score or metadata feature) and a corresponding threshold is satisfied. A condition is satisfied if the lexical feature (e.g., lexical similarity score or metadata feature) satisfies the corresponding threshold. Execution of the rules-based algorithm may be configured for being terminated in response to determining that a condition (or pre-defined subset of conditions) is satisfied or each lexical feature has been analyzed (e.g., that each test procedure may independently trigger the lexical model's determination that the recipient is a personal email of the sender, after which the lexical model process stops). In some embodiments, the intra-transmission analytical model is configured to output a prediction corresponding to an anomalous transmission prediction in response to determining that a condition (or pre-defined subset of conditions) is satisfied.

For example, and as illustrated in FIG. 10, the lexical model 1000 may be configured to first analyze the jc_handler similarity score 1001a (e.g., Jaccard similarity score between the email handler of the sender and the recipient) to determine if the jc_handler similarity score is greater than or equal to the corresponding threshold (e.g., 0.075). In response to determining that the jc_handler similarity score is greater than or equal to the corresponding threshold, the intra-transmission analytical model outputs an anomalous transmission prediction and terminates the analysis. Otherwise, in response to determining that the jc_handler similarity score is less than the corresponding threshold, the intra-transmission analytical model continues with the iterative analysis by analyzing the jc_lname similarity score 1001b (e.g., Jaccard similarity score between the last name of the sender and email handler of the recipient). In response to determining that the jc_lname similarity score 1001b is greater than or equal to the corresponding threshold (e.g., 0.05), the intra-transmission analytical model outputs an anomalous transmission prediction and terminates the analysis. Otherwise, in response to determining that the jc_lname 1001b similarity score is less than the corresponding threshold, the intra-transmission analytical model continues with the iterative analysis by analyzing the jc_fname similarity score 1001c (e.g., Jaccard similarity score between nick name of the sender's first name and email handler of the recipient). The rules may be applied in other orders. In some examples, the rules are configured such that if an email triggers more than one rule, the email will be flagged as a personal email.

In response to determining that the jc_fname similarity score 1001c is greater than or equal to the corresponding threshold (e.g., 0.05), the intra-transmission analytical model outputs an anomalous transmission prediction and terminates the analysis. Otherwise, in response to determining that the jc_fname 1001c similarity score is less than the corresponding threshold, the intra-transmission analytical model continues with the iterative analysis by analyzing the replies metadata feature 1001d (e.g., e.g., count of "RE:" keyword found in in subject line of the digital transmission (e.g., an email subject)). In response to determining that the replies metadata feature 1001d is not equal to the corresponding threshold (e.g., 0), the intra-transmission analytical model terminates the analysis and outputs a standard transmission (e.g., non-anomalous transmission prediction) or an output that prompts execution of the phone number detection filter 1004 in some embodiments. In response to determining that the replies metadata feature 1001*d* is equal to the corresponding threshold, the intra-transmission analytical model continues with the iterative analysis by analyzing the jc_nkname similarity score 1001*e* (e.g., Jaccard similarity score between nick name of sender and transmission handler of recipient). In response to determining that the jc_nkname similarity score 1001*e* is greater than or equal to the corresponding threshold (e.g., 0.125), the intra-transmission analytical model outputs an anomalous transmission prediction and terminates the analysis. Otherwise, in response to determining that the jc_nkname similarity score 1001*e* is less than the corresponding threshold, the intra-transmission analytical model terminates the analysis and outputs a standard transmission (e.g., non-anomalous transmission prediction) or an output that prompts execution of the phone number detection filter 1004 in some embodiments.

While a discrete set of steps is shown in FIG. 10, it should be understood that a portion thereof may be used independently and/or one or more additional steps may be added.

The anomalous transmission tracking system (e.g., by way of anomalous transmission tracking server 111 or other computing device) may execute a phone number detection filter 1004 as shown in FIG. 10 to iteratively perform one or more phone number-based matching operations 1004*a-d* downstream of the aforementioned lexical model 1000 based on the sender phone number data and the sender handler data associated with a digital transmission to determine a match. In some embodiments, the anomalous transmission tracking system (e.g., by way of anomalous transmission tracking server 111 or other computing device) may be configured to execute the phone number detection filter (e.g., perform the one or more phone number-based matching operations 1004*a-d*) in response to determining that the lexical similarity scores and metadata features each fail to satisfy the corresponding threshold.

Executing the phone number detection filter may comprise performing one or more operations, which can be performed in any of a variety of orders. In an example, the phone number detection filter includes performing an area code match operation 1004*a* by comparing a data string corresponding to the area code portion of an internal sender phone number to a data string corresponding to the internal sender handler data to determine whether the internal sender handler data includes numerical digits (e.g., consecutive numerical digits) that match the area code portion. In response to determining indication of a match, the phone number detection filter outputs indication of an anomalous transmission. Otherwise, in response to determining indication of a non-match, a length match operation 1004*b* is performed by comparing the number of numerical digits in the internal sender handler data to the number of digits in the area code portion of the internal sender phone number to determine whether they match (in some embodiments) or by comparing the number of numerical digits in the internal sender handler data to the number of digits in the internal sender phone number to determine whether they match (in some embodiments). Otherwise, in response to determining indication of a non-match, the phone number detection filter performs a prefix match operation 1004*c* by comparing a data string corresponding to the prefix portion of the internal sender phone number (e.g., middle three digit of the phone number) to a data string corresponding to the internal sender handler data to determine whether the internal sender handler data includes numerical digits (e.g., consecutive numerical digits) that match the prefix portion.

In response to determining indication of a match, the phone number detection filter 1004 outputs indication of an anomalous transmission. Otherwise in response to determining indication of a non-match, the phone number detection filter 1004 performs a line match operation 1004*d* by comparing a data string corresponding to the line portion of the internal sender phone number (e.g., last four digits of the phone number) to a data string corresponding to the internal sender handler data to determine whether the internal sender handler data includes numerical digits (e.g., consecutive numerical digits) that match the line portion. In response to determining indication of a match, the phone number detection filter 1004 outputs indication of an anomalous transmission. Otherwise in response to determining indication of a non-match, the phone number detection filter outputs indication of a non-anomalous prediction. In the case, that the length match operation 1004*b* indicates a match, the phone number detection filter outputs indication of an anomalous prediction. Otherwise, in response to determining that the length match operation indicates a non-match, the prefix match operation 1004*c* is performed.

Execution of the one or more phone number-based matching operations may terminate in response to determining that the output of the length match operation (following the area code match operation), the prefix match operation, or the line match (e.g., last four-digit match) operation indicates a match or each of the phone number-based matching operations has been performed (e.g., the corresponding criteria meets or exceeds the threshold). The anomalous transmission tracking system may execute the lexical model and the phone number detection filter sequentially in some embodiments, with the model being configured to stop and output a signal indicating a "match" (e.g., condition satisfied) if any of the aforementioned features satisfy the threshold for indicating a "personal email". Likewise, within each of the depicted lexical model 1000 and phone number detection filter 1004 the depicted steps are shown executing sequentially, with each vertically separated step independently being capable of triggering a personal email "match". In some other embodiments, the aforementioned steps may occur in parallel to the extent possible. In some instances, the iterative analysis of the one or more lexical features 1001*a-e* may stop upon determination of a personal email match. In some examples, the lexical scores are all independently checked versus the threshold. In some examples, only a single score passing a threshold is sufficient. In some examples, the lexical scores are combined or otherwise influence each other when comparing against one or more thresholds.

In an example application of a phone number filter, John Doe sends an email from his work email address, "JohnDoe@example.com", to a recipient having an email address of "d456789@example.com". John Doe's telephone number is 456-555-0123, which has a three-digit area code of 456. The recipient handler has six digits, so even though the area code and recipient handler have three digits in common, the email is not flagged as a personal email because the lengths do not match. However, in other implementations, different rules may cause different results. For instance, there might not be a rule requiring length matches or there may be a rule that matching an entire area code is sufficient even if there are additional numbers in the recipient handler.

In some embodiments, the intra-transmission analytical model is configured to output a prediction corresponding to an anomalous transmission prediction in response to determining that any of the conditions 1003*a-e* or a pre-defined subset of the conditions 1003*a-e* is satisfied. In some embodiments, the intra-transmission analytical model is configured to output a prediction corresponding to a non-anomalous transmission prediction in response to determining that none of the lexical features satisfy the corresponding threshold. In some embodiments, the phone number detection filter is configured to output a prediction corresponding to an anomalous transmission prediction in response to determining that at least the output of a portion of the one or more phone number-based matching operations (e.g., 1004*a-d*) or a pre-defined subset thereof indicates a match. In some embodiments, the phone number detection filter is configured to output a prediction corresponding to a non-anomalous transmission prediction in response to determining that at least none the one or more phone number-based matching operations indicates a match.

Further, as shown at Block 583*b*, the example anomalous transmission tracking system is configured to execute a contextual analytical model (e.g., using a random forest classifier). The contextual analytical model is provided with a contextual analytical model data structure comprising the behavioral features built at Block 570*b* as a model input. The goal of this contextual analytical model is to programmatically determine, based on the plurality of behavioral features derived from the historical email activity data associated with the sender user and the recipient of the outbound email message, if the outbound email message is a personal "email home" sent by the sender user from an internal client computing device associated with the enterprise system to a personal email account of the sender user that is associated with an external digital transmission system (e.g., an external email server).

Figure 11:
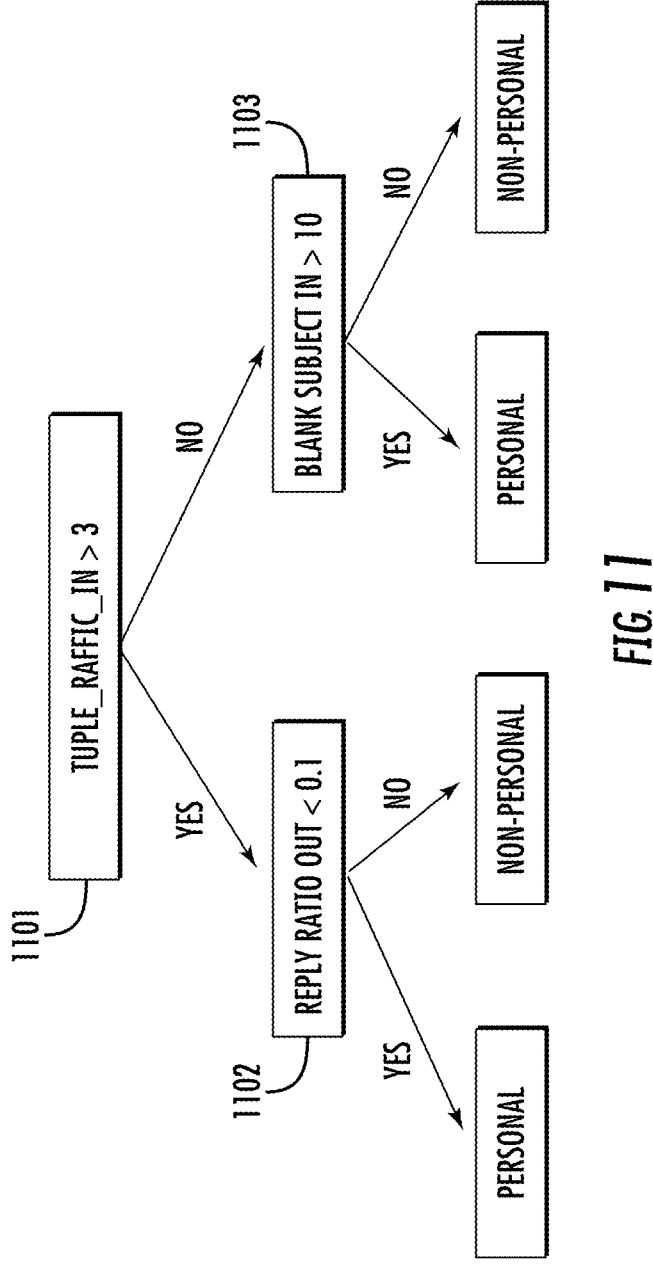
FIG. 11 illustrates an example random forest decision tree algorithm in accordance with an example embodiment of the present disclosure.

In some example embodiments, the contextual analytical model (e.g., a behavioral model) may execute a random forest machine learning algorithm comprising one or more decision tree algorithms. A decision tree algorithm, for example, may define a branching structure. For example, the anomalous transmission tracking system (e.g., by way of anomalous transmission tracking server 111 or other computing device) may execute the contextual analytical model (e.g., execute one or decision tree algorithms). An example of one such decision tree algorithm of some embodiments of the contextual analytical model is shown in FIG. 11. As illustrated, the decision tree algorithm, at a first Block 1101, determines whether tuple_traffic_in count associated with a data transmission, as defined by a contextual analytical model data structure, is greater than 3. Upon determining that the answer is yes, the decision tree algorithm proceeds to determine whether, at Block 1102, the reply ratio out count associated with digital transmission is less than 0.1. If the answer is determined to be yes, the machine learning model (e.g., the contextual analytical model) may output a prediction that that the digital transmission is an anomalous transmission.

A tuple_traffic_in describes total number of digital transmissions going from the external recipient digital transmission address to the sender digital transmission address. The reply ratio out describes a ratio of digital transmissions having a "reply" subject line sent from the sender digital transmission address to the external recipient digital transmission address. In this regard, a tuple_traffic_in that satisfies a corresponding threshold parameter of the model combined with a reply ratio out count that satisfies a threshold parameter of the model may indicate a pattern, relationship, and/or correlation (e.g., as determined during training of the model) that indicates an anomalous digital transmission. If the inquiry at Block 1102 results in a negative response, the contextual analytical model may output a prediction that the digital transmission is a standard transmission (e.g., non-anomalous transmission). Returning back to the inquiry of Block 1101, upon determining that the inquiry results in a negative response (e.g., the tuple_traffic_in feature is greater than 3), the decision tree algorithm may proceed to determine whether, at Block 1103, the blank subject in count associated with digital transmission is greater than 10. If the inquiry at Block 1103 produces a positive response, the contextual analytical model may output a prediction that that the digital transmission is an anomalous transmission. Further, if the inquiry at Block 1103 produces a negative response, the intra-transmission analytical model may output a prediction that the digital transmission is a standard transmission. As described above, the random forest model may comprise one or more decision trees. The example decision tree algorithm shown in FIG. 11, for example, may comprise one of a plurality of decision trees of an example random forest model.

In the example architecture 500*b* illustrated in FIG. 5*b*, the intra-transmission analytical model may be executed to provide one or more model outputs comprising at least one lexical anomalous transmission probability score. Further, the contextual analytical model may be executed to provide one or more model outputs comprising at least one behavioral anomalous transmission probability score.

In some embodiments, the operation of the illustrated architecture continues at Block 584*b* when the anomalous transmission tracking system (e.g., by way of anomalous transmission tracking server 111 or other computing device) combines the respective model outputs from the intra-transmission analytical model and the contextual analytical model. In some embodiments, combining the model outputs may comprise independently using each model output (e.g., if either model signals a personal email exfiltration, by exceeding a probability threshold or by otherwise signaling a prediction or match, the system may be configured to output the resulting signal. In an example implementation, either model can operate and trigger further scrutiny independently. In many examples, a single prediction per case may be desired, so the system may be configured such that an email is classified as a personal email as long as one of the models flag it as personal email. For instance, if a lexical model classifies the email as a personal email but the behavior model does not, then the system may nonetheless conclude that the email is personal email because one of the models indicated that it's a personal email. In some other implementations (e.g., to meet various design criteria, such as acceptable false positive and false negative rates) there must be agreement by both models before an email is classified as a personal email.

In some embodiments, the operation of the illustrated architecture continues at Block 585*b* when the anomalous transmission tracking system (e.g., by way of anomalous transmission tracking server 111 or other computing device) executes a known true positive filter. In an example, a true positive filter involves comparing recipient email addresses to known personal email addresses of employees (e.g., an employee may provide their personal email address to their employer for a variety of reasons). If there is a match, then the email can be flagged as a personal email. Thus, even if the model would otherwise incorrectly classify the email as non-personal, the email could be flagged as a personal email based on the true positive filter.

In some embodiments, the operation of the illustrated architecture continues at Block 590*b* when the anomalous transmission tracking system (e.g., by way of anomalous transmission tracking server 111 or other computing device) generates a final prediction data table (e.g., final prediction data table or the like) defined at least in part by one or more data elements associated with the email message that correspond to the combined model output from the intra-transmission analytical and contextual analytical models.

Intra-transmission Analytical Model Development

Figure 6A:
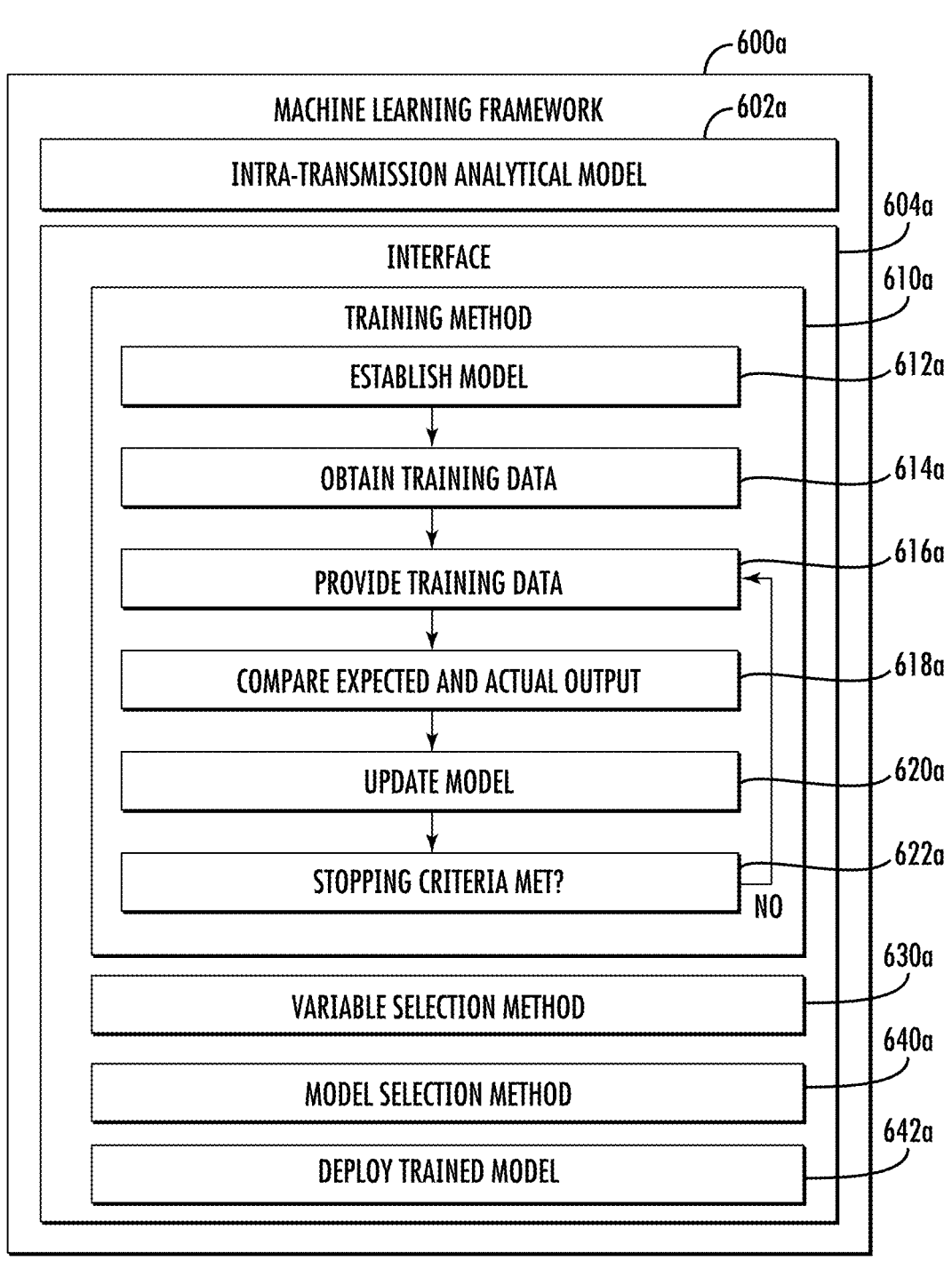
FIG. 6a illustrates an example machine learning framework that techniques described herein may benefit from or improve on in accordance with one or more embodiments of the present disclosure.

FIG. 6*a* illustrates an example model framework 600*a* that techniques described herein may benefit from or improve on. In particular, FIG. 6*a* illustrates an example intra-transmission analytical model development workflow defined by a first example model development process. The example model development framework 600*a* may include a machine learning framework which is a collection of software and data that implements artificial intelligence trained to provide output, such as predictive data, based on input. Examples of artificial intelligence that may be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks or components thereof may be built or refined from existing frameworks, such as TENSORFLOW by GOOGLE, INC. or PYTORCH by the PYTORCH community.

The model framework 600*a* may include one or more machine learning models that are the structured representation of learning. For example, as illustrated in FIG. 6*a*, the model framework 600*a* may comprise an intra-transmission analytical model 602*a* and an interface 604*a* that supports use of the intra-transmission analytical model 602*a*.

The intra-transmission analytical model 602*a* may take any of a variety of forms. In many examples, the intra-transmission analytical model 602*a* includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the intra-transmission analytical model 602*a* may include a representation of memory (e.g., providing long short-term memory functionality). Where the set includes more than one machine learning model, such as, for example, an intra-transmission analytical model and a contextual analytical model, as described herein, the one or more machine learning models may be linked or combined, cooperate, or compete to provide output.

The interface 604*a* may include software procedures (e.g., defined in a library) that facilitate the use of the intra-transmission analytical model 602*a*, such as by providing a way to establish and interact with the intra-transmission analytical model 602*a*. For instance, the software procedures may include software for receiving input, preparing input for use (e.g., by performing vector embedding, such as using Word2Vec, BERT, or another technique), processing the input with the intra-transmission analytical model 602*a*, providing output, training the intra-transmission analytical model 602*a*, performing inference with the intra-transmission analytical model 602*a*, fine tuning the intra-transmission analytical model 602*a*, other procedures, or combinations thereof.

In an example implementation, interface 604*a* may be used to facilitate a training method 610*a* that may include Block 612*a*. Block 612*a* includes establishing an intra-transmission analytical model 602*a*, such as initializing an intra-transmission analytical model 602*a*. The establishing may include setting up the intra-transmission analytical model 602*a* for further use (e.g., by training or fine tuning). The intra-transmission analytical model 602*a* may be initialized with values. In examples, the intra-transmission analytical model 602*a* may be pretrained.

In various embodiments, the intra-transmission analytical model 602*a* may be established by tagging user profile data associated and/or digital transmission data (e.g., an active directory profile) to a user identifier associated with a sender of the digital transmission and deriving other data elements (e.g., name components, such as first name and last name) to perform a substring match on each of the data elements. In various embodiments, the intra-transmission analytical model 602*a* may utilize one or more natural language processing techniques to perform the substring match. The intra-transmission analytical model 602*a* may be configured to use one or more lexical similarity features derived from the derived data elements (e.g., name components, sender email address, and/or the like), which may then be compared with recipient handler data associated with the recipient user identifier (e.g., a recipient's email handler) to programmatically determine a similarity score.

The intra-transmission analytical model 602*a* may also be configured to utilize a plurality of metadata features in its determination of whether an outbound digital transmission is an anomalous transmission. For example, in various embodiments, the intra-transmission analytical model 602*a* may be configured to utilize various metadata associated with a digital transmission, such as, for example, an attachment count defined by a value corresponding to the number of attachments in a digital transmission, a digital transmission size defined by a value corresponding to the total number of bytes of the digital transmission, one or more keyword counts defined by a value corresponding to the number of instances a particular keyword(s) (e.g., "external", "re:", "fwd:", and/or the like) are found in the digital transmission, and a recipient count defined by a value corresponding to the number of recipients associated with a digital transmission.

Block 614*a* may follow Block 612*a*. Block 614*a* includes obtaining training data. In many examples, the training data includes pairs of input and desired output given the input. The training data may be obtained from one or more data sources associated with the enterprise system and/or third-party system(s). According to various embodiments, the training data (e.g., model training data set) comprises a plurality of past digital transmissions. Each past digital transmission may comprise a sender-recipient data set and/or other digital transmission data, including digital transmission metadata. For example, each digital transmission may be associated with and/or comprise a sender email address and a recipient email address (e.g., a tuple).

The one or more data sources may comprise email metadata logs (e.g., digital transmission metadata), nickname list table, and email user profile table. The email metadata logs may include various data associated with past digital transmissions including, but not limited to sender data, recipient data, subject data, and/or other metadata associated with past digital transmissions, including but not limited to the various digital transmission metadata discussed in connection with any of the various modeling environments herein. In various embodiments, the email metadata logs is stored or otherwise maintained by one or more third-party systems. In some embodiments, the email metadata logs may be obtained from the one or more third-party systems and stored or otherwise maintained in one or more databases associated with the enterprise system. The email metadata logs may be a data log that is updated periodically (e.g., daily, weekly, monthly, or the like). According to various embodiments, the sender data, recipient data, subject data, and/or other metadata associated with past digital transmissions are stored in a structured data format.

The email user profile table may include various data about email users associated with the enterprise system including, but not limited to, the email user names (e.g., first name, last name) and email user internal email addresses. In various embodiments, the email user profile table is stored or otherwise maintained in one or more databases associated with the enterprise system.

The nickname list table may include various data including, but not limited to nicknames for first names (e.g., nicknames commonly associated with first names). The nickname list may comprise a list of one or more alternative or related names for one or more users of the enterprise system, which may permit improved training of the intra-transmission analytical model and better ultimate model performance. In various embodiments, the nickname list table is stored or otherwise maintained in one or more databases associated with the enterprise system. The nickname list table may be a table that is updated periodically (e.g., daily, weekly, monthly, or the like). In various embodiments, the nicknames are stored in a structured flat data format. In many examples, the models are static, which means that the models are not changed after the training process is complete (and the models then enter inference phase/production). Nonetheless, tables may be updated while a model is being used in inference phase/production (e.g., a table of nicknames might be updated annually and a table of phone numbers may be updated daily). Although new models may be trained responsive to a table being updated, they are often not. Instead, through monitoring, system administrators may confirm whether the models are performing as intended. If there is a performance drop, the existing model may be updated (e.g., fine-tuned) or a new model may be trained on the updated data to replace the existing model. In some implementations, the updates to the tables might not be expected to have a substantial effect on a model's performance because models often do not remember the exact training data. Instead, they may learn patterns or other general features from the data. As a result, even though tables are updated, such updates may not be used until models would be next trained. In other examples, models may be updated more frequently, including during use in inference phase/production.

In this regard, a data set comprising sender data, recipient data, subject line data, and/or other metadata associated with past digital transmissions, the email user names, email user internal email addresses, and/or nicknames may be generated and utilized in the model development process. At least a portion of the data set may be used to generate training data, test data, and/or validation data for training, testing, and/or validating at least a portion of the intra-transmission analytical model 602a or otherwise used during one or more of the model development stages of the intra-transmission analytical model 602a configured to predict the aforementioned outputs indicative of a likelihood that a recipient email address is a personal email of the sender. The data set may include training data used to train the intra-transmission analytical model 602a. Alternatively or additionally, the data set may include validation data used to validate the trained intra-transmission analytical model 602a. Alternatively or additionally, the training data may include test data used to test the trained intra-transmission analytical model 602a. In various embodiments, the first names, last names, and nicknames are utilized during at least the pre-processing stage associated with the process of generating and training the intra-transmission analytical model 602a. The intra-transmission analytical model 602a may be trained via structured learning using labeled training data in some embodiments.

In supervised or semi-supervised training, the data may be prelabeled, such as by human or automated labelers. In unsupervised learning the training data may be unlabeled. In some embodiments, the training data is labeled using a trained lexical model. For example, existing data may be labeled using a lexical model before training the intra-transmission analytical model 602a. The training data or a portion thereof may additionally or alternatively be labeled manually.

As an illustrative non-limiting example, training data for an intra-transmission analytical model 602a may be obtained by first deriving a plurality of lexical features for each of the stored outbound digital transmissions sent over a predefined period of time (e.g., five days). For example, the derived plurality of lexical features may include four lexical similarity scores based on similarities between sender user identifiers (e.g., first name, last name, nickname, email address) and recipient identifiers (e.g., external email address), as described above, and 6 metadata features corresponding to various elements defined by the metadata associated with the respective digital transmissions.

A number of digital transmission samples (e.g., approximately 600 digital transmissions) may be randomly selected from within the predefined period of time. One or more filters may be applied to identify various data patterns (e.g., lexical patterns). This may define a first model data set. In various embodiments, a first portion of the first model data set, such as, for example 80% thereof, may define a first model training set used for training the intra-transmission analytical model 602a, and a second portion of the first model data set, such as, for example 20% thereof, may define a first model testing set used for testing the intra-transmission analytical model 602a. In various embodiments, at least a portion of the digital transmissions may be excluded from a model training data set based on one or more predetermined characteristics thereof, including, for example, digital transmissions identified as shared transmissions, transmissions sent to internal recipients (e.g., internal client computing devices associated with the enterprise system), transmissions identified as spam mail (e.g., 'GRAYMAIL marketing_mail', 'GRAYMAIL social_mail', 'GRAYMAIL bulk_mail', 'GRAYMAIL positive'), transmissions with no valid sender and/or recipient, and/or the like.

In various embodiments, the first model data set may be updated by adding additional randomly selected digital transmissions, incorporating increased filtering operations, and/or removing duplicate data. For example, an updated first model data set may comprise an increased number of digital transmissions samples (e.g., approximately 750 digital transmissions) without any duplicate samples, with the hand-labeled samples defining a ratio of standard transmissions to anomalous transmissions of at least approximately 54:46. In various embodiments, a first portion of the updated first model data set, such as, for example 80% thereof, may define a first model training set used for training an updated version of the intra-transmission analytical model 602a, and a second portion of the updated first model data set, such as, for example 20% thereof, may define a first model testing set used for testing the updated version of the intra-transmission analytical model 602a.

In various embodiments, Block 614a of obtaining training data for the intra-transmission analytical model 602a may further comprise one or more training data adjustment operations executed in order to fine tune one or more parameters of the model. For example, model training Block 614a may include the process of finding optimal hyperparameters through one or more grid search techniques and training a final model with optimized hyperparameters. Continuing the illustrative, non-limiting example described above, the portion of the first model data set corresponding to the first model training set may be further split into a first portion of the first model training set, such as, for example 80% thereof, may define a first final model training data set used for training the intra-transmission analytical model 602a, and a second portion of the first model training set, such as, for example 20% thereof, may define a first final model selection data set used for selecting the final model defined by the intra-transmission analytical model 602a. In various embodiments, a 5-fold cross validation operation may be applied to the first final model training data set to tune the parameters, as shown below in Table 2:

TABLE 2

| Lexical original data (755 labels) | | | | | |
|---|---|---|---|---|---|
| | Lexical training data (604 labels, 80%) | | | | Lexical model selection data (151 labels, 20%) |
| Split 1 | Fold 1 (Val) | Fold 2 (Train) | Fold 3 (Train) | Fold 4 (Train) | Fold 5 (Train) |
| Split 2 | Fold 1 (Train) | Fold 2 (Val) | Fold 3 (Train) | Fold 4 (Train) | Fold 5 (Train) |
| Split 3 | Fold 1 (Train) | Fold 2 (Train) | Fold 3 (Val) | Fold 4 (Train) | Fold 5 (Train) |
| Split 4 | Fold 1 (Train) | Fold 2 (Train) | Fold 3 (Train) | Fold 4 (Val) | Fold 5 (Train) |
| Split 5 | Fold 1 (Train) | Fold 2 (Train) | Fold 3 (Train) | Fold 4 (Train) | Fold 5 (Val) |
| → Tuning hyperparameters with 5-fold cross validation | | | | | → Model selection |

In various embodiments, all data in the model data set other than the model test data, including the first final model training data and the final model selection data, may be scaled through a scaling processing operation such as, for example, "standardscaler". For example, this may be done because the Support Vector Machine algorithm and K-Nearest Neighbors algorithm each require scaling, while scaling does not affect the tree-based algorithms. Using standardscaler, all variables may be scaled to a mean of 0 and standard deviation of 1. In various embodiments, a scaler may be fit with the first final model training data set and all data in the model data set other than the model test data may be scaled with the scaler. The selected XGBoost algorithm does not require scaling. Therefore, the intra-transmission analytical model 602a may be trained again with the updated first model data set without scaling, and the performance of the model may be verified with the final model test data set.

Block 616a may follow Block 614a. Block 616a includes providing a portion of the training data to the intra-transmission analytical model 602a. This may include providing the training data in a format usable by the intra-transmission analytical model 602a, such as, for example, in an intra-transmission analytical model data structure. The framework 600a (e.g., via the interface 604a) may cause the intra-transmission analytical model 602a to produce an output based on the input.

Block 618a may follow Block 616a. Block 618a includes comparing the expected output with the actual output. In an example, this may include applying a loss function to determine the difference between expected and actual. This value may be used to determine how training is progressing. For example, executing an example intra-transmission analytical model 602a by providing the model with a first model training set of data may produce outputs that perform with 96% accuracy, 96% recall, and 71% precision, which may fall below a desirable precision threshold for the model output.

Block 620a may follow Block 618a. Block 620a includes updating the intra-transmission analytical model 602a based on the result of the comparison. This may take any of a variety of forms depending on the nature of the intra-transmission analytical model 602a. Where the intra-transmission analytical model 602a includes weights, the weights may be modified to increase the likelihood that the intra-transmission analytical model 602a will produce correct output given an input. Depending on the intra-transmission analytical model 602a, backpropagation or other techniques may be used to update the intra-transmission analytical model 602a.

Continuing the non-limiting example described above with respect to Block 618a, the first version of the intra-transmission analytical model 602a may be updated to adjust the variable inputs used by the model. For example, where the first version of the intra-transmission analytical model 602a used model input comprising four lexical similarity scores and six metadata features, the model may be updated to use the same four lexical similarity scores, but only three metadata features, so as to mitigate the effects of overfitting that may have manifested in the performance of the first version of the model. The updated model may also use the updated first model training set described above, which is a balanced dataset. Executing the updated version of the example intra-transmission analytical model 602a configured to use the updated model inputs (e.g., three metadata features) and an updated first model training set may produce an improved output such that the updated model performs with 99.4% accuracy, 95.9% recall, and 97.9% precision, which be sufficient to satisfy a desirable precision threshold for the model output.

Block 622*a* may follow Block 620*a*. Block 622*a* includes determining whether a stopping criterion has been reached, such as based on the output of the loss function (e.g., actual value or change in value over time). In addition or alternatively, whether the stopping criterion has been reached may be determined based on a number of training epochs that have occurred or an amount of training data that has been used. In some examples, satisfaction of the stopping criterion may include determining that the intra-transmission analytical model 602*a* has performed with sufficiently high accuracy, retention, and precision. If the stopping criterion has not been satisfied, the flow of the method may return to Block 614*a*. If the stopping criterion has been satisfied, then the training may be complete.

In various embodiments, interface 604*a* defined by the example model framework 600*a* may be used to facilitate a variable selection method 630*a*. In an example embodiment described herein, the first final model training data set may be defined by four lexical similarity score variables and six metadata variables. In various embodiments, the variable selection method 630*a* may include conducting a two-sample t-test to determine the relationship between the independent variable and the dependent variable. For example, one or more of the variables may be determined to have shown no statistically significant difference between the two groups. Accordingly, variables such as attachment count, transmission byte size, and external keyword count may be excluded from the intra-transmission analytical modeling.

Further, in addition to the variable selection, the variable selection method 630*a* may include determining an optimal n-gram. When comparing n-grams using the t-test, one or more n-grams, such as, for example, 3-gram, 4-gram, and 5-gram, may be statistically significant. Each of the four lexical similarity score variables, which are continuous variables, may be split into two types: a first type when each of the four lexical similarity scores are 0, and a second type when at least one of the four lexical similarity scores exceeds 0. For example, if all of the lexical similarity scores are 0 and the actual label is 1 (e.g., a value corresponding to a positive result and/or an anomalous transmission), then the four lexical similarity score variables provide a false negative effect. Conversely, one of the four lexical similarity scores exceeds 0 and the actual label is 0 (e.g., a value corresponding to a positive result and/or an anomalous transmission), then the four lexical similarity score variables provide a false positive effect. The optimal the n-gram may be determined by comparing the false positive and false negative effects. In various embodiments, when using 5-gram, the false effects may be smallest, as indicated by the sum of the sum of the false positive and false negative effects. Accordingly, the variable selection method 630*a* may include determining the model variables for the intra-transmission analytical model 602*a* to be the four lexical similarity scores described herein (e.g., "jc_fname, jc_l-name, jc_handler, jc_nkname") and three metadata variables, including recipient count variable, a reply keyword count variable, and a forward keyword count variable.

In various embodiments, interface 604*a* defined by the example model framework 600*a* may be used to facilitate a model selection method 640*a*. In an example embodiment described herein, the model selection method 640*a* may include a comparison of a plurality of algorithms, including, as non-limiting examples, Decision Tree, Random Forest, XGBoost, Support Vector Machine, and K-Nearest Neighbors algorithms. In an instance in which the intra-transmission analytical model 602*a* is a static model, it always returns same output as long as it is provided with the same input data.

In various embodiments, the model selection method 640*a* may include using the first final model selection data set defined by 20% of the first model training set, as described above with respect to Table 2, for selecting the final model defined by the intra-transmission analytical model 602*a*. In various embodiments, hyperparameter tuning may be performed with a grid-search for each classification algorithm to bring their best performance.

In various embodiments, with respect to the hyperparameter tuning process for the XGBoost algorithm associated with the intra-transmission analytical model 602*a*, the random state may be fixed at 42 in all processes. Non-limiting examples of the parameters with a range of values that may be used in a grid search to obtain optimal values for best performance are provided below:

A fraction of observations to be randomly sampled for each tree may be defined as subsample=[0.6, 0.8, 1.0].

A subsample ratio of columns when constructing each tree may be defined as colsubsample_bytree=[0.6, 0.8, 1.0]. For example, subsampling may occur once for every tree constructed.

A maximum depth of the tree may be defined by max_depth=[5, 6, 7, 8, 9, 10, 11, 12, None].

A minimum sum of instance weight needed in a child may be defined by min_child_weight=[1, 3, 5].

In various embodiments, other hyperparameters me be defined as ={"objective": 'binary: logistic', "tree_method": 'gpu_hist'}. The objective function used may be "binary: logistic". Because the probability values are sought instead of crisp prediction class labels, the binary logistic function may be chosen to facilitate one or more threshold moving operations.

Each hyperparameter combination may be evaluated with a validation fold generated through 5-fold cross-validation. In various embodiments, the criteria of hyperparameter tuning may be the sum of "mean_test_accuracy", "mean_test_recall", "mean_test_precision", and "mean_test_roc_auc". Further, the performances of each of the algorithms may be compared after hyperparameter tuning. To identify the optimal model for the intra-transmission analytical model 602*a*, classification accuracy may be used as prime criteria, with recall and precision also being considered. The performance metrics for each algorithm are shown in Table 3 below:

TABLE 3

| Matrix | Decision Tree | Random Forest | KNN | SVC | XGB |
|---|---|---|---|---|---|
| Accuracy | 0.965 | 0.969 | 0.965 | 0.904 | 0.977 |
| Recall | 0.953 | 0.953 | 0.944 | 0.962 | 0.972 |
| Precision | 0.981 | 0.987 | 0.99 | 0.871 | 0.984 |
| ROC AUC | 0.972 | 0.991 | 0.975 | 0.978 | 0.991 |

For validation accuracy tracked through 5-fold cross validation during hyperparameter tuning, the classification accuracy is around 97% with all four algorithms except the Support Vector Classifier algorithm. In the case of Support Vector Classifier algorithm, the precision may become low based on an increased weight being placed on recall. In the case of the K-Nearest Neighbors algorithm, the reverse may be true, wherein the model put an increased weight on the precision, which was followed by low recall metric. In various embodiments, the Support Vector Classifier and K-Nearest Neighbors algorithms may be biased to one or more of precision and recall.

While the remaining Decision Tree, Random Forest, and XGBoost algorithms may show similar performance metrics, the XGBoost algorithm may perform better in the hyperparameter tuning. Further, while the Decision Tree algorithm may provide the availability of transparent decision process visualization, the XGBoost algorithm may provide better recall than Decision Tree algorithm. Further, the Decision Tree model may rely too much on a lexical similarity score of sender last name, which may show a performance drop when a new dataset does not have reliable lexical similarity scores for the last name. In light of the fact that the cost of a false negative is significantly higher than that of a false positive, the XGBoost algorithm may be preferable over the decision tree algorithm. Accordingly, the XGBoost algorithm may be selected as the most suitable model for the intra-transmission analytical model 602a. In various embodiments, the results of the top nine alternative iterations for the XGBoost algorithm may be at least substantially the same, so a hyperparameter combination that uses "5" as "max_depth" may be chosen to create the general model. The selected XGBoost model does not require graphical processing unit support and provides a sufficiently fast inferencing speed with the central processing unit (e.g., a processor 202 of the anomalous transmission tracking server 111).

In various embodiments, upon selecting the final intra-transmission analytical model 602a, the model may be subjected to a final model testing method. In various embodiments, the final model testing method may include using a model test data set defined by 20% of the first model data set, as described above with respect to Block 614a, which may include test data that has not been exposed to any of the operations defined by the model training method 610a and/or the model selection method 640a. Although the model test data set may be defined by an imbalanced label ratio, it may be randomly sampled without any filters. Various performance metrics for the final model test method of the intra-transmission analytical model 602a may be defined by data similar to the results included below in Table 4:

TABLE 4

| Accuracy | Recall | Precision | ROC_AUC |
|----------|--------|-----------|---------|
| 99.4% | 95.9% | 97.9% | 97.8% |

Further, in various embodiments, one or more of feature importance or partial dependence plots may be tested to define the importance of each of the model variables used in the intra-transmission analytical model 602a.

Following the model selection method 640a, the flow of the method may move to block 642a, which includes deploying the selected intra-transmission analytical model 602a for use in production, such as providing the trained intra-transmission analytical model 602a with real-world input data and produce output data used in a real-world process. The intra-transmission analytical model 602a may be stored in a memory 204 of at least one computing device 200 defined by the anomalous transmission tracking system 110, as illustrated in FIG. 2, or distributed across memories of two or more such computing devices for production of output data (e.g., predictive data).

Figure 6B:
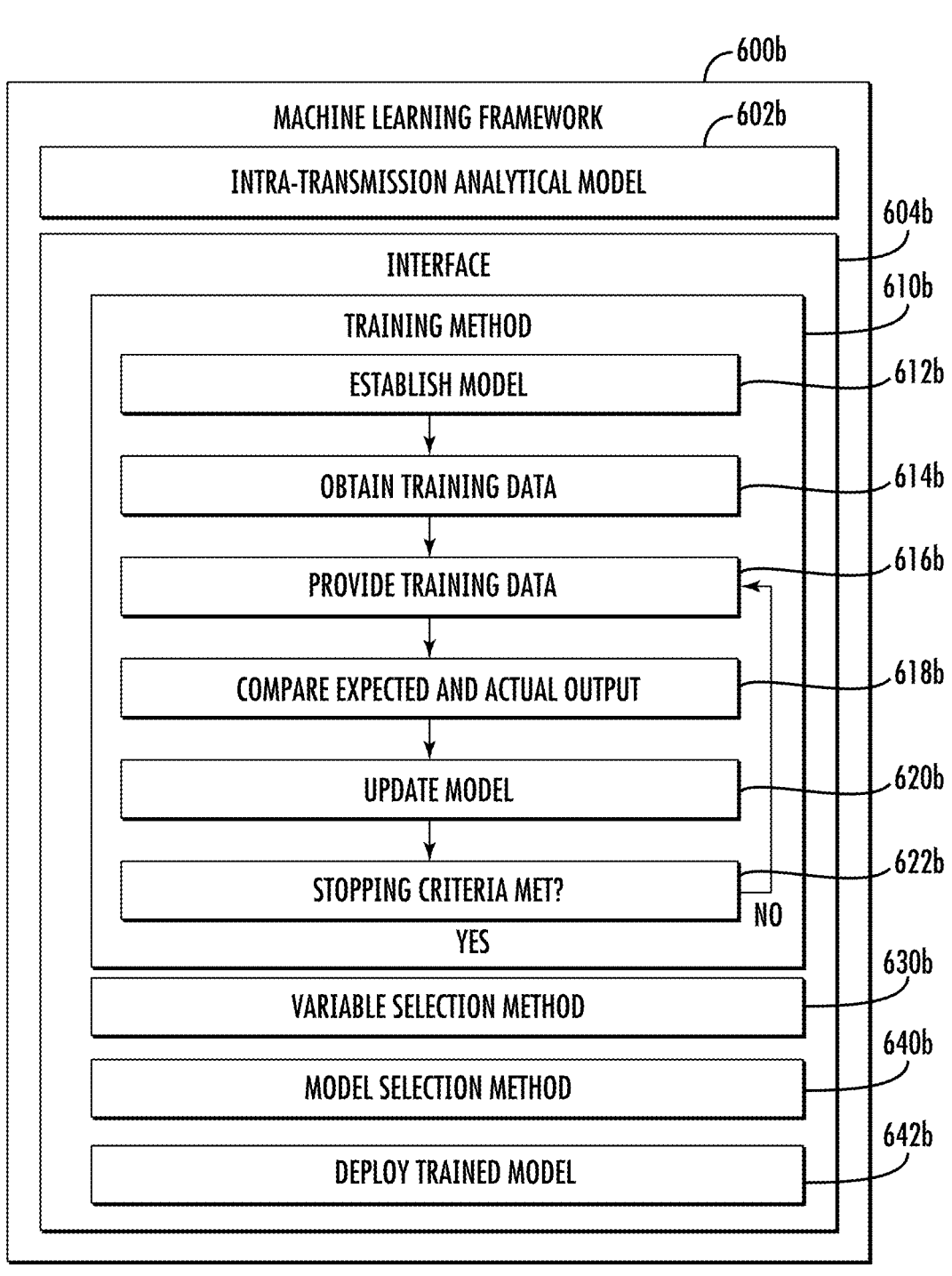
FIG. 6b illustrates another example machine learning framework that techniques described herein may benefit from or improve on in accordance with one or more embodiments of the present disclosure.

FIG. 6b illustrates an example model framework 600b that techniques described herein may benefit from or improve on. In particular, FIG. 6b illustrates another example intra-transmission analytical model development workflow defined by a second example model development process. As noted above, each of these example model development processes are examples of the principles and processes capable of multi-factor digital transmission screening and/or generating an anomalous transmission prediction model in accordance with various embodiments herein and are not limiting. As illustrated in FIG. 6b, the model framework 600b may comprise an intra-transmission analytical model 602b and an interface 604b that supports use of the intra-transmission analytical model 602b.

The intra-transmission analytical model 602b may take any of a variety of forms. In some examples, the intra-transmission analytical model 602b may include representations of nodes such, for example, rule nodes. The interface 604b may include software procedures (e.g., defined in a library) that facilitate the use of the intra-transmission analytical model 602b, such as by providing a way to establish and interact with the intra-transmission analytical model 602b. For instance, the software procedures may include software for receiving input, preparing input for use (e.g., by performing vector embedding, such as using Word2Vec, BERT, or another technique), processing the input with the intra-transmission analytical model 602b, providing output, training the intra-transmission analytical model 602b, performing inference with the intra-transmission analytical model 602b, fine tuning the intra-transmission analytical model 602b, other procedures, or combinations thereof.

In an example implementation, interface 604b may be used to facilitate a training method 610b that may include Block 612b. Block 612b includes establishing an intra-transmission analytical model 602b. The establishing may include initializing an intra-transmission analytical model 602b and/or setting up the intra-transmission analytical model 602b for further use (e.g., by training or fine tuning).

In various embodiments, the intra-transmission analytical model 602b may be established by tagging user profile data associated and/or digital transmission data (e.g., an active directory profile) to a user identifier associated with a sender of the digital transmission and deriving other data elements (e.g., name components, such as first name and last name) to perform a substring match on each of the data elements. In various embodiments, the intra-transmission analytical model 602b may utilize one or more natural language processing techniques to perform the substring match. The intra-transmission analytical model 602b may be configured to use one or more lexical similarity features derived from the derived data elements (e.g., name components, sender email address, and/or the like), which may then be compared with recipient handler data associated with the recipient user identifier (e.g., a recipient's email handler) to programmatically determine a similarity score.

The intra-transmission analytical model 602b may also be configured to utilize a plurality of metadata features in its determination of whether an outbound digital transmission is an anomalous transmission. For example, in various embodiments, the intra-transmission analytical model 602b may be configured to utilize various metadata (e.g., digital transmission metadata) associated with a digital transmission, such as, for example, one or more keyword counts defined by a value corresponding to the number of instances a particular keyword(s) (e.g., "external", "re:", "fwd:", and/ or the like) are found in the digital transmission, and a recipient count defined by a value corresponding to the number of recipients associated with a digital transmission.

Block 614b may follow Block 612b. Block 614b includes obtaining at least training data. In many examples, the training data includes pairs of input and desired output given the input. According to various embodiments, the training data (e.g., model training data set) comprises a plurality of past digital transmissions. Each past digital transmission may comprise a sender-recipient data set and/or other digital transmission data, including digital transmission metadata. For example, each digital transmission may be associated with and/or comprise a sender email address and a recipient email address (e.g., a tuple).

As an illustrative non-limiting example, generating the training data and/or other model data (e.g., validation data, testing data) for the intra-transmission analytical model 602b may include first deriving a plurality of lexical features for each of the stored outbound digital transmissions sent over a predefined period of time (e.g., five days, 1.5 years, or any suitable period). For example, the derived plurality of lexical features may include four lexical similarity scores based on similarities between sender user identifiers (e.g., first name, last name, nickname, email address) and recipient identifiers (e.g., external email address), as described above, and three metadata features corresponding to various elements defined by the metadata associated with the respective digital transmissions. It would be appreciated that in some embodiments, the derived plurality of lexical features may include more or less than four lexical similarity scores and/or more or less than three metadata features.

In various embodiments, the second example model development process of FIG. 6b included obtaining a model data set based on one or more data sources associated with the enterprise system and/or third-party system(s). The one or more data sources may comprise email metadata logs, email user profile table, nickname list table, and personal email table. The email metadata logs, email user profile, and the nickname list table are, respectfully, the same as the email user profile table, nickname list table, and personal email table described above with respect to FIG. 6a. In addition to the email user names and email user internal email addresses, the email user profile table may include email user phone numbers (e.g., phone numbers of at least some of the email users associated with the enterprise system). The second model development leverages the phone number data to generate features for a phone number detection filter configured to improve detection of anomalous digital transmissions.

The personal email table may include various data about email users associated with the enterprise system, including, but not limited to personal email data such as personal email address(es). In various embodiments, the personal email table is stored or otherwise maintained in one or more databases associated with the enterprise system (e.g., enterprise system data repository). In some embodiments, the personal email table may comprise personal email addresses of email users associated with the enterprise system whose digital transmissions are monitored for anomalous transmission, such that the labeled data is directly indicative of the potentially exfiltrating communications, and the anomalous transmission prediction model(s) (e.g., the intra-transmission analytical model 602b and/or contextual analytical model 702b described further below) may be trained using data associated with at least a portion of the users whose outbound digital transmissions will be screened by the trained model. In some embodiments, the personal email table may include email addresses for a different population of users other than those whose outbound digital transmissions will be screened by the trained model.

In this regard, a model data set comprising sender data, recipient data, subject line data, and/or other metadata associated with past digital transmissions, email user names, email user internal email addresses, nicknames, phone numbers of email users, and/or personal email addresses of email users associated with the enterprise system may be generated and utilized in the model development process. At least a portion of the model data set may be used to generate training data, test data, and/or validation data for training, testing, and/or validating at least a portion of the intra-transmission analytical model 602b or otherwise used during one or more of the model development stages of the intra-transmission analytical model 602b configured to predict the aforementioned outputs indicative of a likelihood that a recipient email address is a personal email of the sender. The intra-transmission analytical model 602b may be trained via structured learning using labeled training data in some embodiments.

In various embodiments, the second example model development process of FIG. 6b includes pre-processing (e.g., filtering, or the like), sampling, data partitioning (e.g., data partitioning), and/or labeling at least a portion of the model data set to obtain an optimal final model data set for building (e.g., generating, training, testing, and/or validating) the intra-transmission analytical model 602b. For example, one or more pre-processing operations, one or more sampling operations, one or more data partitioning operations, and/or one or more labeling operations may be performed to obtain optimal training data for building the intra-transmission analytical model. In an example embodiment during testing, one or more pre-processing operations, one or more sampling operations, one or more data partitioning operations, and/or one or more labeling operations were performed on at least a portion of 14.5 million unique digital transmissions to generate the final model data for building the intra-transmission analytical model 602b (e.g., for generating and training the intra-transmission analytical model 602b), which generally resulted in an accurate intra-transmission analytical model 602b. It would be appreciated that more or less than 14.5 million past unique digital transmissions may be utilized in other embodiments.

As an illustrative non-limiting example, generating the final model data set for the intra-transmission analytical model 602b may include first deriving a plurality of lexical features for each of the stored outbound digital transmissions sent over a predefined period of time (e.g., five days, 1.5 years, or any suitable period). For example, the derived plurality of lexical features may include four lexical similarity scores based on similarities between sender user identifiers (e.g., first name, last name, nickname, email address) and recipient identifiers (e.g., external email address), as described above, and three metadata features corresponding to various elements defined by the metadata associated with the respective digital transmissions. It would be appreciated that in some embodiments, the derived plurality of lexical features may include more or less than four lexical similarity scores and/or more or less than three metadata features.

In various embodiments, the one or more pre-processing operations include one or more filtering operations configured to exclude at least a portion of the past digital transmissions from the training data. In various embodiments, a filtering operation is performed with respect to the email user personal email data obtained from the personal email table to remove past digital transmission associated with inaccurate internal sender personal email address (e.g., such as where the email address in the personal email table is an internal email address associated with an email user of the enterprise system). In various embodiments, a filtering operation is performed with respect to the email user personal email data to remove past digital transmissions that are not associated with a personal email address (e.g., where the personal email table does not include an internal sender personal email address for the internal sender associated with the past digital transmission). In various embodiments, a filtering operation may be performed with the respect to the email user personal email data to identify, remove, and/or reconcile duplicate data (e.g., (e.g., such as where the personal email table indicates two or more email users as being associated with the same personal email address). In various embodiments, a filtering operation may be performed with respect to the email user personal email data to identify and remove inactive email user personal email addresses (e.g., email user personal email addresses included in the email table but no indication of use of the email user personal email address).

In various embodiments, one or more filtering operations are performed to exclude at least a portion of the past digital transmissions from the training data based on one or more predetermined characteristics thereof, including, for example, past digital transmissions identified as shared transmissions, transmissions sent to internal recipients (e.g., internal client computing devices associated with the enterprise system), transmissions identified as spam mail (e.g., 'GRAYMAIL marketing_mail', 'GRAYMAIL social_mail', 'GRAYMAIL bulk_mail', 'GRAYMAIL positive'), transmissions with no valid sender and/or recipient, and/or the like.

In various embodiments, past digital transmissions associated with an email user personal email data (e.g., where the recipient is the personal email address of the internal email user) represent positive cases (e.g., ground truth positive training data). Such past digital transmissions may be excluded from the labeling stage of the intra-transmission analytical model 602b development. In various embodiments, past digital transmissions associated with a known non-personal email address (e.g., where the recipient is a known or popular non-personal recipient such as an official vendor or HR software provider of the enterprise with known external communications) represent negative cases (e.g., ground truth negative training data). Such past digital transmissions, or a portion thereof, may be excluded from the labeling stage of the intra-transmission analytical model 602b development. In various embodiments, the remaining past digital transmissions (e.g., excluding the positive past digital transmissions and negative past digital transmissions) are sampled and/or labeled. For example, one or more sampling operations and/or one or more labeling operations are performed with respect to the remaining past digital transmissions. In an example embodiment, digital transmissions in the training data are assigned a "1" label if associated with a personal email (e.g., the digital transmission is from an internal email address to an external email address that is a personal email address). In such example embodiment, digital transmissions in the training data are assigned a "0" label if associated with a non-personal email (e.g., the digital transmission is from an internal email address to an email address that is not a personal email address). It would be appreciated that different labels and/or labeling configurations may be utilized. For example, in some embodiments the labels may be "true" for digital transmissions associated with personal emails and "false" for digital transmissions associated with non-personal emails. As another example, in some embodiments, a "0" label or "false" label may be assigned to digital transmissions associated with personal emails and "1" or "true" label may be assigned to digital transmissions associated with non-personal emails.

Because the frequency of email traffic may be different for each email user associated with the enterprise system and because it may be beneficial or desirable to include past digital transmission associated with all or a substantial number of the email users, in an example embodiment, a filtering operation is performed to keep only the most recent past digital transmissions associated with an email user for sampling and labeling to prevent certain unique digital transmissions (e.g., certain email sender and recipient tuples) from being overly influential in the model development. In such example embodiments, even though an email user may be associated with multiple past digital transmissions (e.g., transmissions to various recipients), only the most recent past digital transmissions are sampled for each email user. By way of example, in the example where during testing about 14.5 million unique past digital transmissions were obtained from the data sources (e.g., initial model data set), the remaining past digital transmission after performing the various filtering operations described above included about 100,661 non-positive true unique past digital transmissions (e.g., labeling data) and 30,281 ground-truth positive unique past digital transmissions.

In some embodiments, the one or more sampling operations comprise sampling at least a portion of remaining data after the one or more filtering operations to generate the final model data. The one or more sampling operations may be performed separately for the ground-truth positive data and the non-true positive data as further described below. In an example, during testing, for efficiency and without affecting the accuracy of the intra-transmission analytical model 602b, only a subset of the remaining data after performing the filtration operation(s) was sampled to generate the final model data. Particularly, a balanced training data may be achieved given that a significant number of negative cases (e.g., negative digital transmissions) and some positive cases (e.g., positive digital transmissions) may be obtained during the labeling process and that the differences may be extracted from the digital transmissions associated with personal email data (e.g., ground truth positive data) as described above. Continuing with the example above, 2000 digital transmission from the 100,661 non-true positive unique past digital transmissions (e.g., labeling data) and 2000 digital transmission from the 30,281 ground-truth positive unique past digital transmissions were sampled to generate the final model data, without affecting the accuracy of the intra-transmissions analytical model 602b generated based on the final model data.

The one or more data partitioning operations may include dividing the sampled model data into groups (e.g., three groups) by performing a data partitioning operation. The three groups include the sampled modeled data may include, for example: a model training set used for training the intra-transmission analytical model 602b, a model validation set used for validating the intra-transmission analytical model 602b, and a model testing set used for testing the intra-transmission analytical model 602b. For example, a first portion of the sampled model data, such as, for example, 60% thereof, may define a model training set used for training the intra-transmission analytical model 602b. A second portion of the sampled model data, such as, for example 20% thereof, may define a model validation set used for validating the intra-transmission analytical model 602b. A third portion of the sampled model data, such as, for example 20% thereof, may define a model testing set used for testing the intra-transmission analytical model 602b. Table 5 below shows the output of a data partitioning operation performed on a model data set in one example. As shown in Table 5, each group includes ground-truth positive data and labeling data. In the example embodiments, to create balanced data, 1,000 past digital samples were sampled from the 2,000 ground-truth positive data. As a result, 3,000 balanced digital transmissions were prepared. These 3,000 digital transmissions were then divided into the three groups (model training set, validation set, and testing set) with ratios of 60:20:20. Statistical data for each model feature may be compared for each partition (e.g., model training set, model validation set, and testing validation set). In the illustrated example, stratified sampling was performed using mixed group information.

TABLE 5

| | Ground Truth Positive | Non True Positive (require labeling) | | |
|---|---|---|---|---|
| Population | 30281 | 100661 | | |
| Group info | 16 groups considering feature distribution | 8 groups considering feature distribution | | |
| Sample for model development | 2000 | 2000 | | |
| Labeling | NA | Positive labeled 538 | Negative labeled 1462 | |
| Sample for balanced data | 1000 | NA | | |
| Mixed group info for stratified sampling | 1~16 (same with group info) | Positive labeled 17~24 (group info + 8) | Negative labeled 25~32 (group info + 16) | |
| Data partition | Ground Truth Positive | Positive labeled | Negative labeled | Size |
| Train | 600 | 322 | 878 | 1800 |
| Val | 200 | 107 | 293 | 600 |
| Test | 200 | 109 | 291 | 600 |

The one or more labeling includes labeling non-true positive data as a positive or negative. For example, each past digital transmission in the non-true positive data is assigned a positive label or a negative label. In some embodiments, the non-true positive data may be labeled after data partitioning. In some embodiments, the non-true positive data may be labeled before data partitioning. In some embodiments, the non-true positive data is labeled using a trained lexical model. For example, existing data may be labeled using a lexical model before training the intra-transmission analytical model. The non-true positive data may additionally or alternatively be labeled manually.

In various embodiments, Block 614b of obtaining training data for the intra-transmission analytical model 602b may further comprise one or more training data adjustment operations executed in order to fine tune one or more parameters of the model. For example, model training Block 614b may include the process of finding optimal hyperparameters through one or more grid search techniques and training a final model with optimized hyperparameters. In some embodiments, finding the optimal hyperparameters comprises finding thresholds for rules of a rules-based model. Continuing the illustrative, non-limiting example described above, the portion of the first model data set corresponding to the first model training set may be further split into a first portion of the first model training set, such as, for example 80% thereof, may define a first final model training data set used for training the intra-transmission analytical model 602b, and a second portion of the first model training set, such as, for example 20% thereof, may define a first final model selection data set used for selecting the final model defined by the intra-transmission analytical model 602b.

Block 616b may follow Block 614b. Block 616b includes providing a portion of the training data to the intra-transmission analytical model 602b. This may include providing the final model training data set in a format usable by the intra-transmission analytical model 602b, such as, for example, in an intra-transmission analytical model data structure. The framework 600b (e.g., via the interface 604b) may cause the intra-transmission analytical model 602b to produce an output based on the input.

Block 618b may follow Block 616b. Block 618b includes comparing the expected output with the actual output. In an example, this may include applying a loss function to determine the difference between expected and actual. This value may be used to determine how training is progressing. For example, executing an example intra-transmission analytical model 602b by providing the model with a first model training set may produce outputs that perform with accuracy, recall, and/or precision that may fall below a desirable precision threshold for the model output.

Block 620b may follow Block 618b. Block 620b includes updating the intra-transmission analytical model 602b based on the result of the comparison. This may take any of a variety of forms depending on the nature of the intra-transmission analytical model 602b. Where the intra-transmission analytical model 602b includes weights, the weights may be modified to increase the likelihood that the intra-transmission analytical model 602b will produce correct output given an input.

Block 622b may follow Block 620b. Block 622b includes determining whether a stopping criterion has been reached, such as based on the output of the loss function (e.g., actual value or change in value over time). In addition or alternatively, whether the stopping criterion has been reached may be determined based on a number of training epochs that have occurred or an amount of training data that has been used. In some examples, satisfaction of the stopping criterion may include determining that the intra-transmission analytical model 602b has performed with sufficiently high accuracy, retention, and precision. If the stopping criterion has not been satisfied, the flow of the method may return to Block 614b. If the stopping criterion has been satisfied, then the training may be complete.

In various embodiments, interface 604b defined by the example model framework 600b may be used to facilitate a variable selection method 630b. In an example embodiment described herein, the final model training data set may be defined by lexical similarity score variables and/or metadata variables (e.g., four lexical similarity score variables and three metadata variables). In some embodiments, the variable selection method 630b includes inputting the lexical features into the machine learning algorithms and allowing the machine learning algorithms to select useful variables in the classification process. In example embodiment, during testing, forward and "recipients" features were determined not to contribute to classification and were excluded. In some embodiments, the variable selection method 630b may include conducting a two-sample t-test to determine the relationship between the independent variable and the dependent variable. For example, one or more of the variables may be determined to have shown no statistically significant difference between the two groups.

In various embodiments, interface 604*b* defined by the example model framework 600*b* may be used to facilitate a model selection method 640*b*. In an example embodiment described herein, the model selection method 640*b* may include a comparison of a plurality of algorithms, including, as non-limiting examples, Decision Tree, Random Forest, XGBoost, Support Vector Machine, K-Nearest Neighbors algorithms and rules-based algorithms. In an example, the model selection method 640*b* includes comparing machine learning models such as Decision Tree, Random Forest, XGBoost, Support Vector Machine, and K-Nearest Neighbors and then comparing the machine learning model with the best performance to the rules-based model. In an example embodiment, the final intra-transmission analytical model is a rules-based model, such as in an instance in which the rules-based model performs better or equivalent to the aforementioned machine learning model(s). In some embodiments, the rules-based model performance may vary relative to the machine learning model performance depending upon factors such as the quality and quantity of available training data, the uniformity of the user base, etc.

In various embodiments, the model selection method 640*b* may include using the first final model selection data set (defined by 20% of the first model training set) for selecting the final model defined by the intra-transmission analytical model 602*b*. In various embodiments, hyperparameter tuning may be performed with a grid-search for at least a portion of the classification algorithms being compared to bring their best performance. The performance metrics for the machine algorithms are shown in Table 6a below:

TABLE 6a

| Matrix | Decision Tree | Random Forest | SVM | KNN | XGB |
|---|---|---|---|---|---|
| Accuracy | 0.908 | 0.912 | 0.905 | 0.913 | 0.91 |
| Recall | 0.847 | 0.853 | 0.84 | 0.85 | 0.85 |
| Precision | 0.97 | 0.97 | 0.97 | 0.978 | 0.97 |
| ROC AUC | 0.91 | 0.913 | 0.907 | 0.915 | 0.911 |

As shown in Table 6a among the machine learning algorithms (e.g., trained by tunning hyper-parameters with 1800 training data), the random forest algorithm showed the best performance on 600 validation data in the instant example. The random forest algorithm was compared to the rules-based algorithm. The comparison of the performance of the random forest model with the rules-based model is shown in Table 6b below:

TABLE 6b

| | Random Forest model | Rules-based model |
|---|---|---|
| Accuracy | 0.95 | 0.945 |
| Recall | 0.909 | 0.909 |
| Precision | 0.993 | 0.983 |
| ROC AUC | 0.951 | 0.946 |
| False Negative | 28 | 28 |
| False Positive | 2 | 5 |

As shown in Table 6b, the rules-based model and random forest model showed similar performance in the instant example. Notably, both rules-based model and random forest model demonstrated that in the absence of Jacccard similarity (or other similarity measure), it may be challenging to accurately identify personal emails using only metadata such as recipient count, reply count, and forward count. According to various embodiments, contextual analytical model, as described herein, is leveraged to overcome this challenge.

As shown in Table 6b, the difference between the random forest model and the rules-based model occurs in false positives. This difference may be derived from the rule that classifies an email as a positive case with first name based Jaccard similarity regardless with reply keyword in the subject. The decision tree model showed logic that classifies all cases with the reply keyword as negative cases, even if there is Jaccard similarity based on the first name. Thus, in the data evaluated, it is presumed that it is more efficient to identify negative cases with reply keyword than identify positive cases with first name based Jaccard similarity. However, it may not be desired to classify all cases as negative just because the subject contains the reply keyword ignoring first name based Jaccard similarity. Accordingly, in some embodiments, the rules-based model is selected as the final lexical model, as described above.

In various embodiments, upon selecting the final intra-transmission analytical model 602*b*, the model may be subjected to a final model testing method. In various embodiments, the final model testing method may include using a model test data set defined by 20% of the first model data set, as described above with respect to Block 614*b*, which may include test data that has not been exposed to any of the operations defined by the model training method 610*b* and/or the model selection method 640*b*. Although the model test data set may be defined by an imbalanced label ratio, it may be randomly sampled without any filters. Further, in various embodiments, one or more of feature importance and partial dependence plots may be tested to define the importance of each of the model variables used in the intra-transmission analytical model 602*b*.

Following the model selection in 640*b*, the flow of the method may move to block 642*b*, which includes deploying the selected intra-transmission analytical model 602*b* for use in production, such as providing the trained intra-transmission analytical model 602*b* with real-world input data and produce output data used in a real-world process. The intra-transmission analytical model 602*b* may be stored in a memory 204 of at least one computing device 200 defined by the anomalous transmission tracking system 110, as illustrated in FIG. 2, or distributed across memories of two or more such computing devices for production of output data (e.g., predictive data).

Contextual Analytical Model Development

Figure 7A:
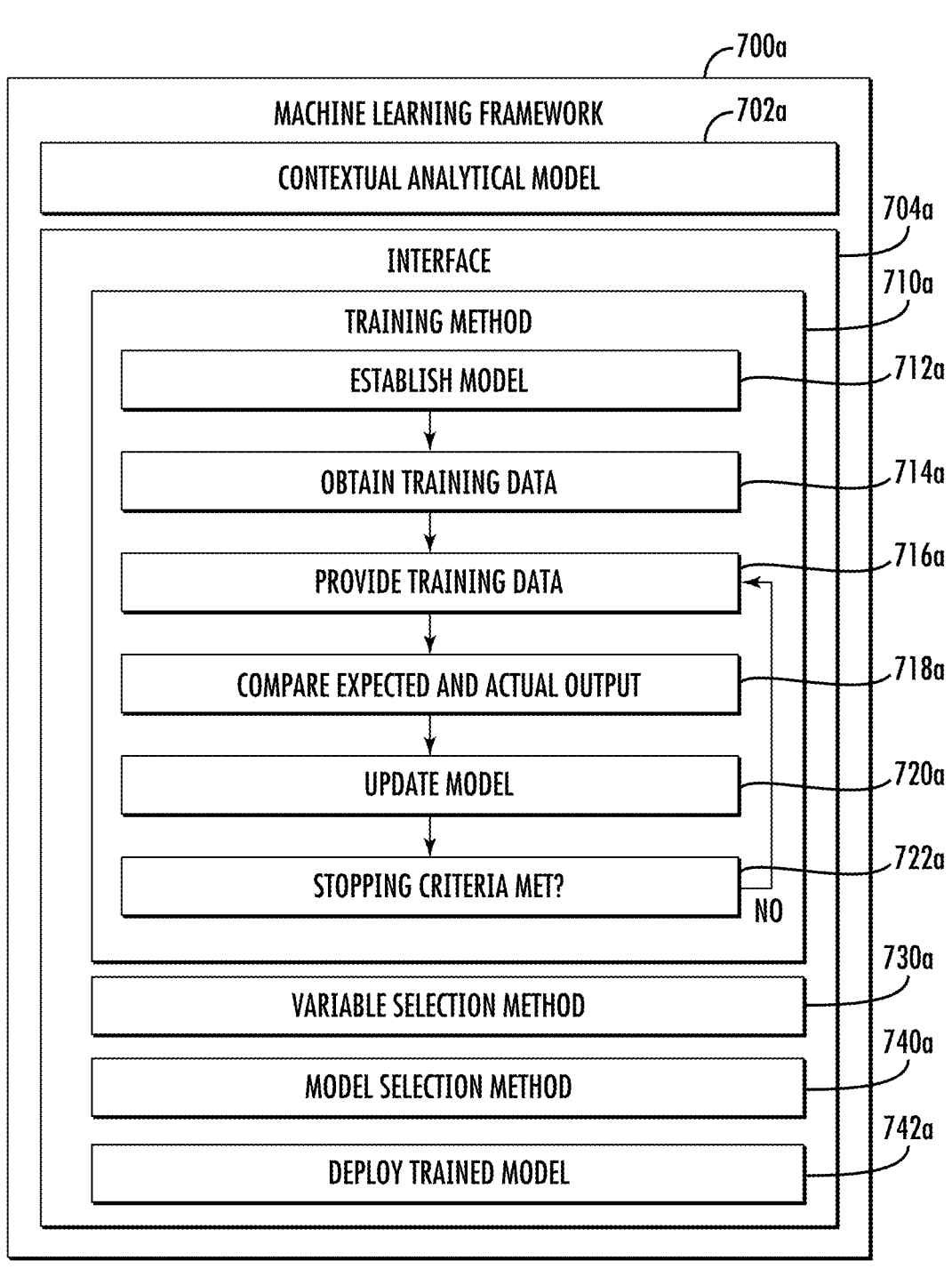
FIG. 7a illustrates another example machine learning framework that techniques described herein may benefit from or improve on in accordance with one or more embodiments of the present disclosure.

FIG. 7*a* illustrates an example model framework 700*a* that techniques described herein may benefit from or improve on. In particular FIG. 7*a* illustrates a contextual analytical model development workflow defined by the first example model development process described above with respect to FIG. 6*a*. The example model development framework 700*a* may include a machine learning framework which is a collection of software and data that implements artificial intelligence trained to provide output, such as predictive data, based on input). Examples of artificial intelligence that may be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. In some embodiments, the model framework 700a or components thereof may be built or refined from existing frameworks, such as TENSORFLOW by GOOGLE, INC. or PYTORCH by the PYTORCH community.

The model framework 700a may include one or more machine learning models that are the structured representation of learning. For example, as illustrated in FIG. 7a, the model framework 700a may comprise a contextual analytical model 702a and an interface 704a that supports use of the contextual analytical model 702a.

The contextual analytical model 702a may take any of a variety of forms. In many examples, the contextual analytical model 702a includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the contextual analytical model 702a may include a representation of memory (e.g., providing long short-term memory functionality). Where the set includes more than one machine learning model, such as, for example, an intra-transmission analytical model and a contextual analytical model, as described herein, the one or more machine learning models may be linked or combined, cooperate, or compete to provide output.

The interface 704a may include software procedures (e.g., defined in a library) that facilitate the use of the contextual analytical model 702a, such as by providing a way to establish and interact with the contextual analytical model 702a. For instance, the software procedures may include software for receiving input, preparing input for use (e.g., by performing vector embedding, such as using Word2Vec, BERT, or another technique), processing the input with the contextual analytical model 702a, providing output, training the contextual analytical model 702a, performing inference with the contextual analytical model 702a, fine tuning the contextual analytical model 702a, other procedures, or combinations thereof.

In an example implementation, interface 704a may be used to facilitate a training method 710a that may include Block 710a. Block 712a includes establishing a contextual analytical model 702a, such as initializing a contextual analytical model 702a. The establishing may include setting up the contextual analytical model 702a for further use (e.g., by training or fine tuning). The contextual analytical model 702a may be initialized with values. In examples, the contextual analytical model 702a may be pretrained.

In various embodiments, the contextual analytical model 702a may be established with behavioral features derived from historical data corresponding to previous digital transmission activity (e.g., email communications) between internal senders associated with an enterprise system and external recipients. In various embodiments, the behavioral features defining the contextual analytical model 702a may be harvested and engineered ahead of the model training method. In various embodiments, the contextual analytical model 702a processes the same input dataset that was prepared for the intra-transmission analytical model 602a. However, instead of the various lexical features, corresponding behavior features may be derived from retrieved system. For example, the contextual analytical model 702a may be configured to utilize a plurality of behavioral features that are derived based on the relationship history between the sender and recipient, as defined by digital transmission data associated with a predetermined period of time (e.g., the previous 548 days from the last record of the sender and recipient). In various embodiments, the contextual analytical model 702a may utilize a plurality of behavioral features comprising the 16 distinct features set forth in Table 1a, provided herein.

Block 714a may follow Block 712a. Block 714a includes obtaining training data. In many examples, the training data includes pairs of input and desired output given the input. The training data may be obtained from one or more data sources as described above with respect to FIG. 6a. In supervised or semi-supervised training, the data may be prelabeled, such as by human or automated labelers. In unsupervised learning the training data may be unlabeled. The training data may include validation data used to validate the trained contextual analytical model 702a.

In various embodiments, a plurality of behavior features may be derived for outbound email logs over a time period, such as, for example, for the same sample of outbound digital transmissions that was used with respect to the training method 610a associated with the intra-transmission analytical model 602a, as described herein. In various embodiments, the labels of anomalous transmissions (e.g., personal emails) that are used in the training method 710a may be obtained by the model output of intra-transmission analytical model 602a. For example, a contextual analytical model training data set may include approximately 86,298 unique digital transmissions labeled as anomalous transmissions.

Further, the labels of standard transmissions (e.g., non-personal emails) that are used in the training method 710a may also be obtained by the model output of intra-transmission analytical model 602a. For example, a second model training data set during an example testing was approximately 3,400,000 unique digital transmissions labeled as standard transmissions. In various embodiments, to at least substantially reduce the noise in the data set resulting from the inherent imperfections in the intra-transmission analytical model 602a output data, one or more filter conditions based on the strength of a Jaccard similarity score may be applied. For example, for each data point, the four lexical similarity scores may be added to create a measured lexical strength which may range from 0 to a maximum possible value. The total sum lexical strength score may then be scaled to get the results on a scale that is between 0 and 1. The second model training data set may be filtered to include only those data points that represent particularly positive cases in which the predicted probability is greater than or equal to 0.9 and the strength is greater than or equal to 0.2 ("gold positive cases"), or particularly negative cases in which the predicted probability is less than or equal to 0.01 and the strength is at least approximately 0 ("gold negative cases").

Further, in various embodiments, a subset of cases (e.g., 1,625 cases) defining ground truth positive cases, which come from an Inside Threat Analyst review by a reviewer associated with the enterprise system upon the intra-transmission analytical model of the anomalous transmission tracking system determining that the digital transmission is an anomalous transmission. A portion of the negative cases from the predicted negative cases (e.g., predicted by the intra-transmission analytical model to be standard transmissions) may be sampled and concatenated with the ground truth positive cases to create robust second model test data for the contextual analytical model 702a.

In various embodiments, upon creating the second model test data, the positive cases may be concatenated to define a contextual analytical model training data set. In various embodiments, a first portion of the contextual analytical model training data set, such as, for example 80% thereof, may define a second final model training data set and a second portion of the contextual analytical model training data set, such as, for example 20% thereof, may define a second model selection data set used in the model selection method 740a associated with the contextual analytical model 702a.

In various embodiments, Block 714a of obtaining training data for the contextual analytical model 702a may further comprise one or more training data adjustment operations executed in order to fine tune one or more parameters of the model. In various embodiments, a five-fold cross validation operation may be applied to the second training data set to tune the parameters, as shown below in Table 7a:

TABLE 7a

| Behavior data (1,492,193 labels) | | | | | |
|---|---|---|---|---|---|
| Behavior training data (1,193,754 labels, 80%) | | | | | Behavior test data (298,439 labels, 20%) |
| Split 1 | Fold 1 (Val) | Fold 2 (Train) | Fold 3 (Train) | Fold 4 (Train) | Fold 5 (Train) |
| Split 2 | Fold 1 (Train) | Fold 2 (Val) | Fold 3 (Train) | Fold 4 (Train) | Fold 5 (Train) |
| Split 3 | Fold 1 (Train) | Fold 2 (Train) | Fold 3 (Val) | Fold 4 (Train) | Fold 5 (Train) |
| Split 4 | Fold 1 (Train) | Fold 2 (Train) | Fold 3 (Train) | Fold 4 (Val) | Fold 5 (Train) |
| Split 5 | Fold 1 (Train) | Fold 2 (Train) | Fold 3 (Train) | Fold 4 (Train) | Fold 5 (Val) |
| → Tuning hyperparameters with 5-fold cross validation and model selection | | | | → test the final model | |

In various embodiments, Block 714a may include a scaling process similar to that of Block 614a described with respect to the intra-transmission analytical model 602a. For example, a scaler may be fit with the second final model training data set, and the entire contextual analytical model training data set was scaled with the scaler. Further, the selected XGBoost algorithm of the contextual analytical model 702a, as described herein, does not require scaling. Therefore, the contextual analytical model 702a may be retrained with the contextual analytical model training data set that has not been scaled, and the model performance may be verified with the second model test data. In various embodiments, the second model test data may not be subjected to any data division or scaling processes. Further, in various embodiments, each of the plurality of behavioral features defined by the contextual analytical model 702a may be numeric, and any missing values may be replaced with a value of −1 to distinguish clearly between non-missing values and missing values.

Block 716a may follow Block 714a. Block 716a includes providing a portion of the training data to the contextual analytical model 702a. This may include providing the training data in a format usable by the contextual analytical model 702a, such as, for example, in a contextual analytical model data structure. The framework 700a (e.g., via the interface 704a) may cause the contextual analytical model 702a to produce an output based on the input.

Block 718a may follow Block 716a. Block 718a includes comparing the expected output with the actual output. In an example, this may include applying a loss function to determine the difference between expected and actual. This value may be used to determine how training is progressing.

Block 720a may follow Block 718a. Block 720a includes updating the contextual analytical model 702a based on the result of the comparison. This may take any of a variety of forms depending on the nature of the contextual analytical model 702a. Where the contextual analytical model 702a includes weights, the weights may be modified to increase the likelihood that the contextual analytical model 702a will produce correct output given an input. Depending on the contextual analytical model 702a, backpropagation or other techniques may be used to update the contextual analytical model 702a.

Block 722a may follow Block 720a. Block 722a includes determining whether a stopping criterion has been reached, such as based on the output of the loss function (e.g., actual value or change in value over time). In addition or alternatively, whether the stopping criterion has been reached may be determined based on a number of training epochs that have occurred or an amount of training data that has been used. In some examples, satisfaction of the stopping criterion may include determining that the contextual analytical model 702a has performed with sufficiently high accuracy, retention, and precision. If the stopping criterion has not been satisfied, the flow of the method may return to Block 714a. If the stopping criterion has been satisfied, then the training may be considered complete.

In various embodiments, interface 704a defined by the example model framework 700a may be used to facilitate a variable selection method 730a. In an example embodiment described herein, the second final model training data set associated with the contextual analytical model 702a may be defined by 16 behavior-related variables corresponding to the 16 derived features described herein in Table 1a, above. In various embodiments, the variable selection method 730a may include conducting a two-sample t-test to determine the relationship between the independent variable and the dependent variable. For example, each of the 16 behavioral-related variables show statistically significant differences in the two groups. Accordingly, each of the 16 behavior-related variables may be used in the contextual analytical model 702a training and variables may be freely selected in the training process by the algorithms.

In various embodiments, interface 704a defined by the example model framework 700a may be used to facilitate a model selection method 740a. In an example embodiment described herein, the model selection method 740a may include a comparison of several classification algorithms, including, as non-limiting examples, Decision Tree, Support Vector Machines, KNN, XGBoost, and Random Forest algorithms.

In various embodiments, the model selection method 740a may include using a final model selection data set defined by 20% of the contextual analytical model training data set, as described above with respect to Table 7a, for selecting the final model defined by the contextual analytical model 702a. In various embodiments, hyperparameter tuning may be performed with a grid-search for each classification algorithm to bring their best performance. In various embodiments, after a first grid search, if the hyperparameter that produces the best performance is the minimum or maximum value of search range, the grid search will be performed again by adjusting the search range. However, the grid search may still be performed only for those hyperparameters that help prevent overfitting, and default values may be used for all other hyperparameters.

In various embodiments, each of the algorithms other than the decision tree algorithm may perform grid search using GPU with CuML library. After obtaining the best hyperparameter combination, the CPU may be used again to create the final model for each classification algorithm. However, in the case of the Support Vector Machine, the final model may be obtained through training using GPU.

In various embodiments, with respect to the hyperparameter tuning process for the XGBoost algorithm associated with the contextual analytical model 702a, the random state may be fixed at 42 in all processes. Non-limiting examples of the parameters with a range of values that may be used in a grid search to obtain optimal values for best performance are provided below:

A maximum number of levels in the tree may be defined by max_depth=[5, 7, 9, 11].

A subsample ratio of the training instances may be defined as subsample=[0.6, 0.8, 1.0]. For example, setting the subsample ratio to 0.5 would result in the XGBoost randomly sampling half of the second final model training data set prior to growing trees.

A subsample ratio of columns when constructing each tree may be defined as colsubsample_bytree=[0.6, 0.8, 1.0].

A control of the balance of positive and negative weights, which may be useful for unbalanced classes, may be defined as scale_pos_weight=[1, 33]. For example, a typical value to consider may be sum (negative instances)/sum (positive instances).

A minimum sum of instance weight needed in a child may be defined by min_child_weight=[1,2].

In various embodiments, other hyperparameters me be defined as ={"objective": 'binary: logistic', "tree_method": 'gpu_hist'}. The objective function used may be "binary: logistic". Because the probability values are sought instead of crisp prediction class labels, the binary logistic function may be chosen to facilitate one or more threshold moving operations.

In various embodiments, grid search results may be sorted based on the final_subset parameter, which is the sum of mean_test_accuracy, mean_test_precision, mean_test_recall, mean_test_roc_auc and mean_test_mcc derived from 5-fold cross-validation. A second grid-search may be performed with max_depth=[6, 7, 8] because the top four quantitative results each had a max depth of 7. In various embodiments, the optimal max_depth parameter may be determined to be 8.

Further, in various embodiments, the min child weight parameter may be fixed with value 1. In various embodiments, Although the default value for the subsample parameter is 1, the search range is reset with [0.8, 1.0] because potential overfitting prevention effect may be shown with a new combination in the second grid search. In various embodiments, the optimal subsample parameter may be determined to be 1.

With respect to the colsample_bytree parameter, considering that most frequent value was 0.6 for the top 10 results, which is the minimum value of the given range, the search range is reset with [0.6, 0.8] for the second grid search. For example, if the value of colsample_bytree is less than 0.6, too much randomness may be given to the model, which may lead to underfitting. In various embodiments, the optimal colsample_bytree parameter may be determined to be 0.8.

Further, with respect to the scale_pos_weight parameter, a value 1 may be identified as the optimal value for all combinations. If this adjustment is made, precision may be sacrificed for recall.

Each hyperparameter combination may be evaluated with a validation fold generated through 5-fold cross-validation. In various embodiments, the criteria of hyperparameter tuning may be the sum of "mean_test_accuracy", "mean_test_recall", "mean_test_precision", and "mean_test_mcc", and "mean_test_mcc" since the training data may be highly imbalanced. Further, the performances of each of the algorithms may be compared after hyperparameter tuning. To identify the optimal model for the contextual analytical model 702a, classification accuracy, recall, and precision may each be used as prime criteria. The performance metrics for each algorithm using the second final model training data set are shown in Table 7b below:

TABLE 7b

| Matrix | Decision Tree | Random Forest | SVC | XGB |
|---|---|---|---|---|
| Accuracy | 0.98 | 0.985 | 0.935 | 0.986 |
| Recall | 0.658 | 0.711 | 0.899 | 0.754 |
| Precision | 0.798 | 0.899 | 0.372 | 0.89 |
| ROC AUC | 0.895 | 0.971 | 0.957 | 0.976 |
| MCC | 0.715 | 0.792 | 0.554 | 0.812 |

For validation accuracy tracked through five-fold cross validation during hyperparameter tuning, the classification accuracy is around 98% with all three algorithms except the Support Vector Classifier algorithm. In the case of Support Vector Classifier algorithm, the precision may become low based on an increased weight being placed on recall.

The performance metrics for each algorithm using the second final model selection data set are shown in Table 7c below:

TABLE 7c

| Matrix | Decision Tree | Random Forest | SVC | XGB |
|---|---|---|---|---|
| Accuracy | 0.982 | 0.986 | 0.983 | 0.986 |
| Recall | 0.648 | 0.735 | 0.674 | 0.752 |
| Precision | 0.88 | 0.896 | 0.877 | 0.884 |
| ROC AUC | 0.822 | 0.866 | 0.835 | 0.874 |
| MCC | 0.747 | 0.804 | 0.761 | 0.808 |

While, in the first example model development process with respect to the contextual analytical model, the remaining Decision Tree, Random Forest, and XGBoost algorithms showed similar accuracy and precision performance metrics, the XGBoost algorithm performed better with respect to recall. Accordingly, the XGBoost algorithm was selected as the most suitable model for the contextual analytical model 702a. In various embodiments, the results of the top three alternative iterations for the XGBoost algorithm may be at least substantially the same. While a top 1 parameter set may use more complicated trees with bigger max_depth and a 0.8 colsample_bytree, it provides better performances in the cross-validation step than other parameter sets. Accordingly, a top1 parameter set as hyperparameters of the XGBoost algorithm may be selected. The selected XGBoost model does not require graphical processing unit support and provides a sufficiently fast inferencing speed with the central processing unit (e.g., a processor 202 of the anomalous transmission tracking server 111).

In various embodiments, upon selecting the final contextual analytical model 702a, the model may be subjected to a final model testing method. In various embodiments, the final model testing method may include using the second model test data set, as described above. In one example, the contextual analytical model test data may comprise 1,625 ground truth positive labels and 53,625 negative labels. The second model test data set may include behavioral test data that has not been exposed to any of the operations defined by the model training method 710a and/or the model selection method 740a. Various performance metrics for the final model test method of the contextual analytical model 702a may be defined by data similar to the results included below in Table 7d:

TABLE 7d

| Accuracy | Recall | Precision | ROC_AUC | MCC |
|---|---|---|---|---|
| 99.4% | 93.5% | 86.4% | 96.5% | 89.5% |

Further, in various embodiments, both feature importance and partial dependence plots may be tested to define the importance of each of the model variables used in the contextual analytical model 702a.

Following the model selection method 740a, the flow of the method may move to block 742a, which includes deploying the selected contextual analytical model 702a for use in production, such as providing the trained contextual analytical model 702a with real-world input data and produce output data used in a real-world process. The contextual analytical model 702a may be stored in a memory 204 of at least one computing device 200 defined by the anomalous transmission tracking system 110, as illustrated in FIG. 2, or distributed across memories of two or more such computing devices for production of output data (e.g., predictive data).

Figure 7B:
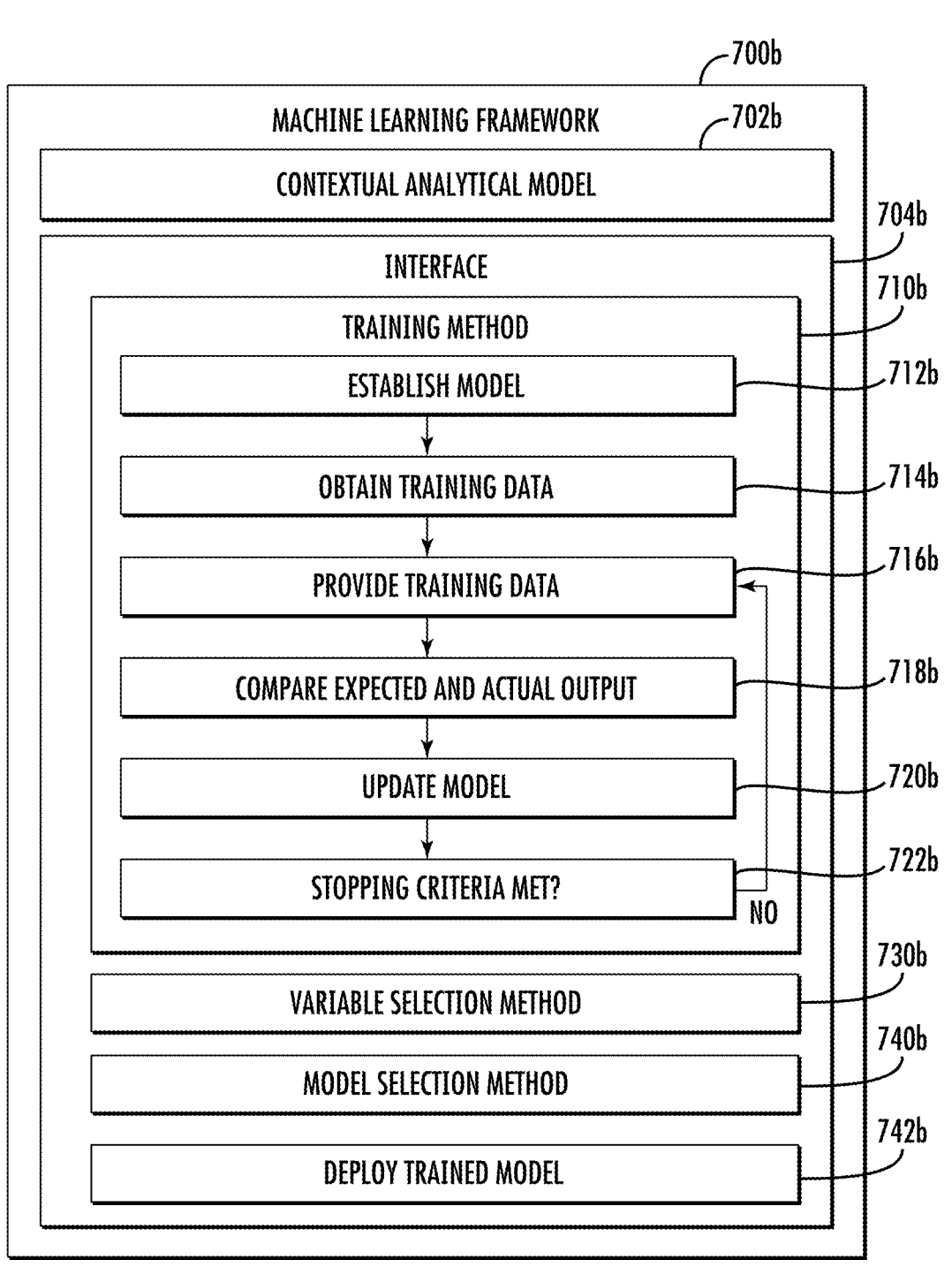
FIG. 7b illustrates another example machine learning framework that techniques described herein may benefit from or improve on in accordance with one or more embodiments of the present disclosure.

FIG. 7b illustrates an example model framework 700b that techniques described herein may benefit from or improve on. In particular, FIG. 7b illustrates a contextual analytical model development workflow defined by the second example model development process described above with respect to FIG. 6b. The model framework 700b may be a machine learning model framework. As described above, a machine learning model framework is a collection of software and data that implements artificial intelligence trained to provide output, such as predictive data, based on input. Examples of artificial intelligence that may be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Model framework 700b or components thereof may be built or refined from existing frameworks, such as TENSORFLOW by GOOGLE, INC. or PYTORCH by the PYTORCH community.

The model framework 700b may include one or more machine learning models that are the structured representation of learning. For example, as illustrated in FIG. 7b, the model framework 700b may comprise a contextual analytical model 702b and an interface 704b that supports use of the contextual analytical model 702b.

The contextual analytical model 702b may take any of a variety of forms. In many examples, the contextual analytical model 702b includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the contextual analytical model 702b may include a representation of memory (e.g., providing long short-term memory functionality). Where the set includes more than one machine learning model, such as, for example, an intra-transmission analytical model and a contextual analytical model, as described herein, the one or more machine learning models may be linked or combined, cooperate, or compete to provide output.

The interface 704b may include software procedures (e.g., defined in a library) that facilitate the use of the contextual analytical model 702b, such as by providing a way to establish and interact with the contextual analytical model 702b. For instance, the software procedures may include software for receiving input, preparing input for use (e.g., by performing vector embedding, such as using Word2Vec, BERT, or another technique), processing the input with the contextual analytical model 702b, providing output, training the contextual analytical model 702b, performing inference with the contextual analytical model 702b, fine tuning the contextual analytical model 702b, other procedures, or combinations thereof.

In an example implementation, interface 704b may be used to facilitate a training method 710b that may include Block 710b. Block 712b includes establishing a contextual analytical model 702b, such as initializing a contextual analytical model 702b. The establishing may include setting up the contextual analytical model 702b for further use (e.g., by training or fine tuning). The contextual analytical model 702b may be initialized with values. In examples, the contextual analytical model 702b may be pretrained.

In various embodiments, the contextual analytical model 702b may be established with behavioral features derived from historical data corresponding to previous digital transmission activity (e.g., email communications) between internal senders associated with an enterprise system and external recipients. In various embodiments, the behavioral features defining the contextual analytical model 702b may be harvested and engineered ahead of the model training method. In various embodiments, the contextual analytical model 702b processes the same input dataset that was prepared for the intra-transmission analytical model 602b. However, instead of the various lexical features, corresponding behavior features may be derived from retrieved system. For example, the contextual analytical model 702b may be configured to utilize a plurality of behavioral features that are derived based on the relationship history between the sender and recipient, as defined by digital transmission data associated with a predetermined period of time (e.g., the previous 548 days from the last record of the sender and recipient). In various embodiments, the contextual analytical model 702b may utilize a plurality of behavioral features comprising the seventeen distinct features set forth in Table 1b, provided herein.

Block 714b may follow Block 712b. Block 714b includes obtaining training data. In many examples, the training data includes pairs of input and desired output given the input. The training data may be obtained from one or more model training data sources as described above with respect to FIG. 6b. In supervised or semi-supervised training, the data may be prelabeled, such as by human or automated labelers. In unsupervised learning the training data may be unlabeled. The training data may include validation data used to validate the trained contextual analytical model 702b.

In various embodiments, a plurality of behavior features may be derived for outbound email logs over a time period, such as, for example, for the same sample of past digital transmissions that was used with respect to the training method 610b associated with the intra-transmission analytical model 602b, as described herein. The model data set used to build the intra-transmission analytical model 602b may be leveraged to build the contextual analytical model 702b. Further, one or more pre-processing operations, one or more sampling operations, one or more data partitioning operations, and/or one or more sampling operations may be performed with respect to the model data set to generate a final model data set for building the contextual analytical model similar to FIG. 6b.

In various embodiments, Block 714b of obtaining training data for the contextual analytical model 702b may further comprise one or more training data adjustment operations executed in order to fine tune one or more parameters of the model. In various embodiments, Block 714b may include a scaling process similar to that of Block 614b described with respect to the intra-transmission analytical model 602b. For example, a scaler may be fit with the second final model training data set, and the entire contextual analytical model training data set was scaled with the scaler. Further, the selected algorithm (e.g., random forest algorithm) of the contextual analytical model 702b, as described herein, may not require scaling. Therefore, the contextual analytical model 702b may be retrained with the contextual analytical model training data set that has not been scaled, and the model performance may be verified with the second model test data. In various embodiments, the second model test data may not be subjected to any data division or scaling processes. Further, in various embodiments, each of the plurality of behavioral features defined by the contextual analytical model 702b may be numeric, and any missing values may be replaced with a value of −1 to distinguish clearly between non-missing values and missing values.

Block 716b may follow Block 714b. Block 716b includes providing a portion of the training data to the contextual analytical model 702b. This may include providing the training data in a format usable by the contextual analytical model 702b, such as, for example, in a contextual analytical model data structure. The framework 700b (e.g., via the interface 704b) may cause the contextual analytical model 702b to produce an output based on the input.

Block 718b may follow Block 716b. Block 718b includes comparing the expected output with the actual output. In an example, this may include applying a loss function to determine the difference between expected and actual. This value may be used to determine how training is progressing.

Block 720b may follow Block 718b. Block 720b includes updating the contextual analytical model 702b based on the result of the comparison. This may take any of a variety of forms depending on the nature of the contextual analytical model 702b. Where the contextual analytical model 702b includes weights, the weights may be modified to increase the likelihood that the contextual analytical model 702b will produce correct output given an input. Depending on the contextual analytical model 702b, backpropagation or other techniques may be used to update the contextual analytical model 702b.

Block 722b may follow Block 720b. Block 722b includes determining whether a stopping criterion has been reached, such as based on the output of the loss function (e.g., actual value or change in value over time). In addition or alternatively, whether the stopping criterion has been reached may be determined based on a number of training epochs that have occurred or an amount of training data that has been used. In some examples, satisfaction of the stopping criterion may include determining that the contextual analytical model 702b has performed with sufficiently high accuracy, retention, and precision. If the stopping criterion has not been satisfied, the flow of the method may return to Block 714b. If the stopping criterion has been satisfied, then the training can be considered complete.

In various embodiments, interface 704b defined by the example model framework 700b may be used to facilitate a variable selection method 730b. In an example embodiment described herein, the second final model training data set associated with the contextual analytical model 702b may be defined by 17 behavior-related variables corresponding to the seventeen derived features described herein in Table 1b, above. In various embodiments, the variable selection method 730b may include conducting a two-sample t-test to determine the relationship between the independent variable and the dependent variable. For example, each of the 17 behavioral-related variables show statistically significant differences in the two groups. Accordingly, each of the 17 behavior-related variables may be used in the contextual analytical model 702b training and variables may be freely selected in the training process by the algorithms.

In various embodiments, interface 704b defined by the example model framework 700b may be used to facilitate a model selection method 740b. In an example embodiment described herein, the model selection method 740b may include a comparison of several classification algorithms, including, as non-limiting examples, Decision Tree, Support Vector Machines, KNN, XGBoost, and Random Forest algorithms.

In various embodiments, the model selection method 740b may include using a final model selection data set defined by a percentage (e.g., 20%, or the like) of the model data set for selecting the final model defined by the contextual analytical model 702b. In various embodiments, hyperparameter tuning may be performed with a grid-search for each of the several classification algorithm to bring their best performance. In various embodiments, after a first grid search, if the hyperparameter that produces the best performance is the minimum or maximum value of search range, the grid search will be performed again by adjusting the search range. However, the grid search may still be performed only for those hyperparameters that help prevent overfitting, and default values may be used for all other hyperparameters. The performance of the machine learning algorithms in one example is shown below in Table 8a:

TABLE 8a

| Matrix | Decision Tree | Random Forest | SVM | KNN | XGB |
|---|---|---|---|---|---|
| Accuracy | 0.838 | 0.865 | 0.815 | 0.807 | 0.847 |
| Recall | 0.782 | 0.821 | 0.733 | 0.808 | 0.853 |
| Precision | 0.889 | 0.906 | 0.886 | 0.813 | 0.848 |
| ROC AUC | 0.84 | 0.866 | 0.817 | 0.807 | 0.847 |

As may be seen in Table 8a, among the algorithms (which were trained by tunning hyperparameters with 1,800 train data), the random forest algorithm showed the best performance on 600 validation data in the instant example. XGBoost showed very good recall performance, but XGBoost algorithm showed significant performance drop compared to the train accuracy. Considering explainability, Decision Tree may be alternative model, but there is significant gap for recall compared to random forest algorithm.

Accordingly, in the illustrated example, random forest model was selected as the final contextual analytical model.

In various embodiments, upon selecting the final contextual analytical model 702*b*, the model may be subjected to a final model testing method. In various embodiments, the final model testing method may include using model test data partitioned from sampled model data as described above with respect to FIG. 6*b*. The second model test data set may include model test data (e.g., behavioral test data) that has not been exposed to any of the operations defined by the model training method 710*b* and/or the model selection method 740*b*. Various performance metrics for the final model test method of the contextual analytical model 702*b* may be defined. Further, in various embodiments, one or more of feature importance or partial dependence plots may be tested to define the importance of each of the model variables used in the contextual analytical model 702*b*.

Following the model selection method 740*b*, the flow of the method can move to block 742*b*, which includes deploying the selected contextual analytical model 702*b* for use in production, such as providing the trained contextual analytical model 702*b* with real-world input data and produce output data used in a real-world process. The contextual analytical model 702*b* may be stored in a memory 204 of at least one computing device 200 defined by the anomalous transmission tracking system 110, as illustrated in FIG. 2, or distributed across memories of two or more such computing devices for production of output data (e.g., predictive data).

Data Sampling for Second Model Development Process

In the sampling stage of the example model development process (e.g., second example model development process) for the intra-transmission analytical model 602*b* and the contextual analytical model 702*b*, the ground-truth positive data portion of the training data and the labeling data portion are sampled separated. The ground truth positive data comprise past digital transmissions where the recipient is internal user personal email address determined based on the personal email table data source (as described above). Such portion of the training data are unlabeled given their ground-truth positive characteristic. The portion of the training data designated for labeling comprise the labeling data portion.

The labeling data are sampled using a two-stage sampling technique described herein. The two stages include a feature categorization stage (e.g., first stage) and a sampling stage (e.g., second stage). The feature categorization stage comprise categorizing the model features (e.g., lexical features and contextual features) utilizing quantitative and/or qualitative methods. A first step/operation of the feature categorization stage includes scaling the model features for categorization using min-max scaler or other scaling methods. A second step/operation of the feature categorization stage includes grouping (e.g., in a quantitative manner) model features with a correlation equal to or greater than a predetermined correlation threshold (e.g., 0.2 in the illustrated example shown in Table 8b) into one category. A third step/operation of the feature categorization stage includes grouping (e.g., in a qualitative manner) the model features having no correlation with any other feature that is equal to or greater than the predetermined correlation threshold into categories that measure the same characteristics. A fourth step/operation of the feature categorization stage includes removing (e.g., in a qualitative manner) the categories that do not have an intuitive connection to anomalous transmission identification (e.g., personal email identification) and merging similar category types. Table 8b below shows the feature categories after applying feature categorization to the labeling data in one example illustrated herein.

TABLE 8b

| Features | Category by correlation | Category type | Intuitive importance | Assigned category |
|---|---|---|---|---|
| dstnct_senders total_senders | 1 | relational features | Important to consider | |
| dstnct_receivers total_receivers | 0 | relational features | Important to consider | 1 |
| forwards fwds_ratio_out | 5 | formal communication | Important to consider | |
| jc_handlers jc_lname jc_fname | | text similarity | Important to consider | |
| blank_sub_ratio_out | | formal communication | | |
| replies replies_ratio_out | 4 | talking to someone | Important to consider | |
| avg_days_between stddev_days_between | 6 | my communication intervals | not too critical | |
| dstnct_recipients total_recipients | 3 | my traffic to other non-enterprise domains | not too critical | |
| tuple_traffic_out tuple_traffic_in | 7 | my traffic | | |
| recipients | N/A | CC | Important to consider | 4 (cuz corr 0.11) |
| fwds_ratio_in | | formal communication | Important to consider | 5 |
| replies_ratio_in | | talking to someone | Important to consider | 4 |
| jc_nkname | | text similarity | Important to consider | 5 |
| blank_sub_ratio_in | | formal communication | Important to consider | 5 |

As shown in Table 8, in the illustrated example, there are eight categories (1, 0, 5, 4, 6, 3, 7, NA) and eight category types (e.g., relation features, formal communication, text similarity, my communication intervals, my traffic to other non-enterprise domains, my traffic, and CC). To avoid data sparsity, a limited number of categories may be considered for feature distribution. For example, in the illustrated example, the sample size is 2000 and to avoid data sparsity, only about 3-4 categories may be considered for feature distribution. In this regard, in some examples, the categories may be reorganized/recategorized using a qualitative method such as in the third and fourth steps/operations of the feature categorization stage (described above) or not considered for feature distribution so as to reduce the number of categories. Continuing with the example categorizing shown in Table 8b, the features (e.g., 5 features) identified in step/operation three are included in other assigned categories, the features in category index 0 are included in category index 1 and the category index, 3, 6, and 7 are not considered for feature distribution. The output of the reorganization/recategorization process for the illustrated example is shown in Table 9 below.

TABLE 9

| | Category | | |
|---|---|---|---|
| | Talking to someone | Relational features | Text similarity & formal communication |
| Category index | 4 | 1 | 5 |
| Features | Replies Replies_ratio_in Replies_ratio_out recipients | total_senders total_receivers dstnct_receivers dstnct_senders | fwds_ratio_in fwds_ratio_out forwards jc_handlers jc_fname jc_lname jc_nkname blank_sub_ratio_out blank_sub_ratio_in |

As shown in Table 9, in the illustrated example, there are three final categories: talking to someone (category index 4); relational features (category index 1); and text similarity and formal communication (category index 5). The text similarity and formal communication category may be split into separated categories, such that there are four categories.

The sampling stage of the two-stage sampling operation includes creating category average features (e.g., to understand feature distribution) and then sampling. The category averages are created by calculating averages using the features in the final categories from the feature categorization stage. In the illustrated example, because the category average features are continuous variables, they are converted into binary variable considering percentile and category type. The four category averages for the illustrated example, are shown in Table 10 below:

TABLE 10

| | Category | | |
|---|---|---|---|
| | Talking to someone | Relational features | Text similarity & formal communication |
| Threshold Reason | Average > 0.001 Considering percentile chart, it is better to set threshold with around 40 percentiles | Average > 0 Considering percentile chart, it is better to set threshold with 0 | Average > 0 Considering percentile chart, it is better to set threshold with median |

After creating/calculating the category average features, the labeling data is then sampled. The sampling is performed while considering feature distribution to prevent minority groups from being ignored. In this regard, the sample size for each group may be focused on complementing the difference while considering the size of the frequency between groups. Table 11 below shows the sampling result for the illustrated example. In the illustrated example, there are a total of 8 groups and 2000 samples were taken from the 8 groups considering the frequencies. As may be derived from Table 11, in the illustrated example, the frequencies of the groups vary greatly. Group 7 account for almost 40% of the total labeling data and is the majority group, Groups 3, 4, and 8 are slightly above the average. Group 1 is below the average but still shows a certain frequency. The frequencies of Groups 2, 5, and 6 are low and are the minority.

TABLE 11

| | Talking to someone | Relational features | Text similarity + formal communication | frequency | Sample size |
|---|---|---|---|---|---|
| group 1 | 0 | 0 | 0 | 5429 | 200 |
| group 2 | 0 | 0 | 1 | 1594 | 150 |
| group 3 | 0 | 1 | 0 | 13817 | 300 |
| group 4 | 0 | 1 | 1 | 17343 | 300 |
| group 5 | 1 | 0 | 0 | 1987 | 150 |
| group 6 | 1 | 0 | 1 | 196 | 150 |
| group 7 | 1 | 1 | 0 | 38785 | 450 |
| group 8 | 1 | 1 | 1 | 21510 | 300 |

As may be seen in the Table 11, in the illustrated example, 450 labeling data were sampled from the majority group, 300 labeling data were sampled from the groups close to the average, 200 labeling data were sampled from the group below the average, and 150 labeling data were sampled from the minority group.

Further, the ground-truth positive data is sampled using the two-stage sampling technique described above with respect to the labeling data sampling. In the illustrated example, the labeling data included 30,281 past digital transmissions (e.g., tuples) obtained after performing quality control process. From the 30,281 labeling data 2000 cases were sampled and leveraged to compensate any gap from the labeling output. For the sake of brevity, the two-stage sampling technique will not be repeated in detail with respect to sampling the ground-truth positive data. The feature categorization stage comprise categorizing the model features (e.g., lexical features, contextual features) utilizing quantitative and/or qualitative methods and includes the steps/operations as described above with respect to the labeling data sampling.

Table 12 below shows the feature categories after applying feature categorization to the ground-truth positive data in the illustrated example.

TABLE 12

| Features | Category by correlation | Category type | Intuitive importance | Assigned category |
|---|---|---|---|---|
| dstnct_receivers total_receivers tuple_traffic_in tuple_traffic_out Total_senders | 0 | relational features + my traffic | Important to consider | |
| dstnct_recipients total_recipients | 1 | my traffic to other non-enterprise domains | not too critical Important to consider | |
| recipients | | CC count | Important to consider | 4 |
| forwards fwds_ratio_out | 2 | formal communication | Important to consider | |

TABLE 12-continued

| Features | Category by correlation | Category type | Intuitive importance | Assigned category |
|---|---|---|---|---|
| avg_days_between stddev_days_between | 3 | my communication intervals | not too critical | |
| replies replies_ratio_out | 4 | talking to someone | Important to consider | |
| jc_handlers jc_fname jc_lname | 5 | text similarity | Important to consider | |
| replies_ratio_in | | talking to someone | Important to consider | 4 |
| jc_nkname | | text similarity | Important to consider | 5 |
| blank_sub_ratio_in | | formal communication | Important to consider | 2 |
| dstnct_senders | | relational features | Important to consider | 0 |
| blank_sub_ratio_out | | formal communication | Important to consider | 2 |
| fwds_ratio_in | | formal communication | Important to consider | 2 |

As discussed above with respect to the labeling data sampling, to avoid data sparsity, a limited number of categories may be considered for feature distribution, which may include reorganizing/recategorizing the categories using a qualitative method) and/or not considering some of the categories for feature distribution so as to reduce the number of categories.

Table 13 below shows example final categories after applying feature categorization to the ground-truth positive data. In the illustrated example, there are four final categories: talking to someone; relational features; text similarity; and formal communication.

TABLE 13

| Category | Talking to someone | Relational features | Text similarity | Formal communication |
|---|---|---|---|---|
| Category index | 4 | 0 | 5 | 2 |
| Features | Replies Replies_ratio_in Replies_ratio_out recipients | total_senders total_receivers dstnct_receivers dstnct_senders tuple_traffic_in tuple_traffic_out | jc_handlers jc_fname jc_lname jc_nkname | fwds_ratio_in fwds_ratio_out forwards blank_sub_ratio_out blank_sub_ratio_in |

The sampling stage of the two-stage sampling operation includes creating category average features (e.g., to understand feature distribution) and then sampling. The category averages are created by calculating averages using the features in the final categories from the feature categorization stage. In the illustrated example, because the category average features are continuous variables, they are converted into binary variable considering percentile and category type. The four category averages for the illustrated example with respect to the ground-truth positive data are shown in Table 14 below:

TABLE 14

| Category | Talking to someone | Relational features | Text similarity | formal communication |
|---|---|---|---|---|
| Threshold Reason | Average > 0 Considering percentile chart, it is better to set threshold with median | Average > 0.0031 Considering percentile chart, it is better to set threshold with median | Average > 0.2 Considering percentile chart, it is better to set threshold with median | Average > 0.04 Considering percentile chart, it is better to set threshold with around 30 percentiles |

After creating/calculating the category average features, the ground-truth positive data is then sampled. The sampling is performed while considering feature distribution to prevent minority groups from being ignored. Table 15 below shows the sampling result for the ground-truth data in the illustrated example. In the illustrated example, a total of 16 groups were identified for the ground-truth positive data and 2000 samples were taken from the 16 groups considering the frequencies. As may be derived from Table 15, in the illustrated example, the frequencies of the groups vary greatly. Groups 5 and 6 account for almost 26% of the total ground-truth positive data and is the majority group, Groups 1 and 2 are around but still shows a certain frequency. The frequencies of the remaining groups are low and are the minority.

Table 15 below shows an example output of the averaging and conversion stage of the sampling operation with respect to the unlabeled past digital transmissions.

TABLE 15

|  | Relational features | Formal communication | Talking to someone | Text similarity | frequency | Sample size |
|---|---|---|---|---|---|---|
| group 1 | 0 | 0 | 0 | 0 | 2176 | 125 |
| group 2 | 0 | 0 | 0 | 1 | 2203 | 125 |
| group 3 | 0 | 0 | 1 | 0 | 559 | 100 |
| group 4 | 0 | 0 | 1 | 1 | 591 | 100 |
| group 5 | 0 | 1 | 0 | 0 | 3980 | 175 |
| group 6 | 0 | 1 | 0 | 1 | 3909 | 175 |
| group 7 | 0 | 1 | 1 | 0 | 851 | 100 |
| group 8 | 0 | 1 | 1 | 1 | 873 | 100 |
| group 9 | 1 | 0 | 0 | 0 | 1085 | 100 |
| group 10 | 1 | 0 | 0 | 1 | 1083 | 100 |
| group 11 | 1 | 0 | 1 | 0 | 945 | 100 |
| group 12 | 1 | 0 | 1 | 1 | 966 | 100 |
| group 13 | 1 | 1 | 0 | 0 | 2930 | 150 |
| group 14 | 1 | 1 | 0 | 1 | 2958 | 150 |
| group 15 | 1 | 1 | 1 | 0 | 2620 | 150 |
| group 16 | 1 | 1 | 1 | 1 | 2552 | 150 |

Although example processing systems have been described in the figures herein, implementations of the subject matter and the functional operations described herein may be implemented in other types of digital electronic circuitry, or in computer software, firmware, or hardware, including the structures disclosed in this specification and their structural equivalents, or in combinations of one or more of them.

Embodiments of the subject matter and the operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer programs, e.g., one or more modules of computer program instructions, encoded on computer-readable storage medium for execution by, or to control the operation of, information/data processing apparatus. Alternatively, or in addition, the program instructions may be encoded on an artificially generated propagated signal, e.g., a machine-generated electrical, optical, or electromagnetic signal, which is generated to encode information/data for transmission to suitable receiver apparatus for execution by an information/data processing apparatus. A computer-readable storage medium may be, or be included in, a computer-readable storage device, a computer-readable storage substrate, a random or serial access memory array or device, or a combination of one or more of them. Moreover, while a computer-readable storage medium is not a propagated signal, a computer-readable storage medium may be a source or destination of computer program instructions encoded in an artificially generated propagated signal. The computer-readable storage medium may also be, or be included in, one or more separate physical components or media (e.g., multiple CDs, disks, or other storage devices).

The operations described herein may be implemented as operations performed by an information/data processing apparatus on information/data stored on one or more computer-readable storage devices or received from other sources.

The term "apparatus" encompasses all kinds of apparatus, devices, and machines for processing data, including by way of example a programmable processor, a computer, a system on a chip, or multiple ones, or combinations, of the foregoing. The apparatus may include special purpose logic circuitry, e.g., an FPGA (field programmable gate array) or an ASIC (Application Specific Integrated Circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web components, web services, web microservices, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described herein may be implemented on a computer having a display device, e.g., a CRT (cathode ray tube) or LCD (liquid crystal display) monitor, for displaying information/data to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's query-initiating computing device in response to requests received from the web browser.

Embodiments of the subject matter described herein may be implemented in a computing system that includes a back-end component, e.g., as an information/data server, or that includes a middleware component, e.g., an application server, or that includes a front-end component, e.g., a query-initiating computing device having a graphical user interface or a web browser through which a user may interact with an implementation of the subject matter described herein, or any combination of one or more such back-end, middleware, or front-end components. The components of the system may be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) may be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems may generally be integrated together in a product or packaged into multiple products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Non-limiting examples of testing results, example model features, example model architectures related to non-limiting example embodiments. Specifically, two example anomalous transmission prediction model frameworks are discussed below. These examples are non-limiting prototypes and iterations of the various embodiments of the present disclosure and should not be construed as limiting the scope or spirit of the foregoing application.

Example Anomalous Transmission Prediction Model Framework ("Prediction Framework")

The following includes non-limiting examples of two frameworks built as examples for outbound digital transmission screening. While two such examples are described, it is to be understood that combinations and permutations of such examples and alternatives to some or all of such examples are also contemplated, including but not limited to selecting one or more different models for use with the intra-transmission analytical model and/or contextual analytical model. As described herein, two example anomalous transmission prediction model frameworks (a first example anomalous transmission prediction model framework ("first prediction framework") and a second anomalous transmission prediction model framework ("second prediction framework")) were built, each comprising an intra-transmission analytical model and a contextual analytical model. The intra-transmission analytical model and a contextual analytical model for each anomalous transmission prediction model framework were built, trained, tested, and validated as described further below.

Example Intra-Transmission Analytical Model

For each prediction framework, a test intra-transmission analytical model (e.g., prototype intra-transmission analytical model) was built with lexical similarity features and metadata features. Lexical features were derived from email addresses of sender and recipient found in the email logs. Metadata features were derived from email subject line, size, attachment, and recipients count. The email address of senders who are enterprise email users were enriched with active directory data to obtain different components of names like first name and last name. In addition, popular nickname table was put together to map nicknames to the senders as an additional name component. The name components were then processed with the recipient email handlers using Jaccard Similarity algorithm to generate features. For the second prediction framework, the email address (where available) of senders who are enterprise email users were enriched with the personal email address of the enterprise email users.

For training and testing, a hand annotated labeled data set was used. Heuristic-based rules were applied on the prediction output of the intra-transmission analytical model for the first prediction framework to provide additional conservative prediction to reduce false positives. As an example, the data set for the intra-transmission analytical model for the first prediction framework is shown in Tables 16a-c below. As shown in Table 16a below, the data set included 86,298 positive labels and 3,432,223 negative labels. As shown in Table 16b below, after applying heuristic filters, the remaining data set included 60,034 positive labels and 1,485,784 negative labels. Further, 53,625 negative cases were excluded. As shown in Table 16c below, the data set after excluding 53,625 negative cases, 60,034 positive labels and 1,432,159 negative labels.

TABLE 16a

| Positive labels (personal emails) | Negative labels (non-personal emails) |
| --- | --- |
| 86,298 | 3,432,223 |

TABLE 16b

| Positive labels (personal emails) | Negative labels (non-personal emails) |
| --- | --- |
| 60,034 | 1,485,784 |

TABLE 16c

| Positive labels (personal emails) | Negative labels (non-personal emails) |
| --- | --- |
| 60,034 | 1,432,159 |

XGBoost (as described above) was selected as the classification algorithm for the intra-transmission analytical model for the first prediction framework. The created XGBoost-based intra-transmission analytical model prevents overfitting at least in part because the algorithm is configured to detect small patterns and the prototype lexical training data set for the intra-transmission analytical model comprise small data. The prototype intra-transmission analytical model showed good precision (98%) and recall (96%) on the labeled data set. A rules-based classifier (as described above) was selected for the intra-transmission analytical model for the second prediction framework.

Example Contextual Analytical Model

For each prediction framework, a test contextual analytical model (e.g., prototype contextual analytical model) was built with behavioral features derived from history of email communication between internal senders and external recipients. The contextual analytical model did not use any text data like email subject or body for features. Only the email transmission histories of senders and recipients were used as features.

Behavior features were harvested and engineered ahead of model training, and the test contextual analytical models were trained and evaluated on emails. The contextual analytical models were trained on a large, labeled data set. The labels of the contextual analytical model data (e.g., behavior data) were generated by the intra-transmission analytical model with heuristics rules. In a first example embodiment, the selected classification algorithm was XGBoost, which was able to detect small patterns from the data as is proper for the big behavior data set. The performance of the contextual analytical model was further evaluated using test data set. The contextual analytical model showed good performances at least 93% recall and 86% precision. In a second example embodiment, the selected classification algorithm was random forest.

The contextual analytical model may process the same input data set prepared for the intra-transmission analytical model. As described above, for the contextual analytical models, instead of lexical features, corresponding contextual features are retrieved from historical digital transmission activity data (e.g., email history).

Data Reduction

There were no specific columns to drop in the intra-transmission analytical model for the second prediction framework because all columns are numerical calculations based on assumptions against email logs. Since 7 features of the intra-transmission analytical model for the first prediction framework have valid assumptions, all of those features were maintained before the modeling process for the intra-transmission analytical model for the second prediction framework.

There were 16 features in the contextual analytical model for the first prediction framework. In the contextual analytical model for the second prediction framework, 6 new features were added. Those 6 new features include blank_sub_out, fwd_sub_out, reply_sub_out, blank_sub_in, fwd_sub_in, and reply_sub_in. Based on the correlation and qualitative judgement, columns that have highly correlated to another column were dropped to prevent multicollinearity as shown in Table 17 below:

TABLE 17

| Dropped column | Correlated column | Correlation | Qualitative judgement |
| --- | --- | --- | --- |
| total senders | distinct senders | 0.9 | distinct user count |
| total recipients | distinct recipients | 0.74 | is more powerful |
| total receivers | distinct receivers | 0.98 | than total user count |
| reply sub out | tuple traffic out | 0.77 | can't drop tuple traffic out |
| fwd ratio in | fwds sub in | 0.81 | Counting is better than ratio |

Model Development Data and Sources (I) Intra-Transmission Analytical Model Data (First Example Anomalous Transmission Model Prediction Framework)

Data from a week was used. 3 weekdays and 2 weekends were included, so even data could be secured. Lexical features based on metadata and similarities between sender data (e.g., sender email address) and recipient data (e.g., recipient email address) were determined not to be time sensitive. Given that the data included over 1.7 million entries, there was sufficient data for sampling. The intra-transmission analytical model features (e.g., lexical features) are shown in Table 18a below and intra-transmission analytical model entities are shown in Table 18b below.

TABLE 18a

| SI No. | Feature Name | Description |
|---|---|---|
| 1. | jc_fname | Jaccard similarity score between first name of sender and transmission handler of recipient |
| 2. | jc_handlers | Jaccard similarity score between transmission handlers of sender and recipient |
| 3. | jc_lname | Jaccard similarity score between last name of sender and transmission handler of recipient |
| 4. | jc_nkname | Jaccard similarity score between nick name of sender and transmission handler of recipient |
| 5. | attachments | Number of attachments in the digital transmission of sender and recipient as a tuple |
| 6. | bytes | Total bytes of the digital transmission |
| 7. | external | Count of "EXTERNAL:", "[EXTERNAL]", and "[PARTNER EXTERNAL]" keywords found in subject line of the digital transmission (e.g., an email subject) |
| 8. | forwards | Count of "FWD:" and "FW:" keywords found in subject line of the digital transmission (e.g., an email subject) |
| 9. | replies | Count of "RE:" keyword found in in subject line of the digital transmission (e.g., an email subject) |
| 10. | recipients | Total number of recipients copied to the digital transmission |

TABLE 18b

| SI No. | Entity Name | Entity Type | Description | Timeline |
|---|---|---|---|---|
| 1. | transmission.metadata_v3 | Table | Source table - daily transmission logs | Daily load |
| 2. | transmission.metadata_v3_senders | Table | Source table - sender's information of daily transmission logs | Daily load |
| 3. | transmission.metadata_v3_recipients | Table | Source table - recipient's information of daily transmission logs | Daily load |
| 5. | transmission.nick_names | Table | Source table - nick names list | One time load, not updated regularly |

(II) Intra-Transmission Analytical Model Data (Second Example Anomalous Transmission Model Prediction Framework)

The intra-transmission analytical model features (e.g., lexical features) includes a total of 7 features as shown in Table 18c below.

TABLE 18c

| SI No. | Feature Name | Description |
|---|---|---|
| 1. | jc_fname | Jaccard similarity score between first name of sender and email handler of recipient |
| 2. | jc_handlers | Jaccard similarity score between email handlers of sender and recipient |
| 3. | jc_lname | Jaccard similarity score between last name of sender and email handler of recipient |
| 4. | jc_nkname | Jaccard similarity score between nick name of sender's first name and email handler of recipient |
| 5. | forwards | Count of "FWD:" and "FW:" keywords found in email subject |
| 6. | replies | Count of "RE:" keyword found in email subject |
| 7. | recipients | Total number of recipients copied to the mail |

All the 7 features may be directly input into the machine learning algorithms in the test framework, allowing the machine learning algorithm to select useful variables in the classification process. In the process of creating the rules-based intra-transmission analytical model, the inventors observed and confirmed that the forwards and "recipients" features did not contribute to classification. In this regard, the inventors determined that the forwards and "recipients" features may be dropped/excluded. With respect to the rules-based algorithm used by the model, if jc_handler exceeds 0.075, jc_lname or jc_fname exceeds 0.05, the digital transmission is classified as personal email. For jc_nkname, because it is a somewhat weak signal, if the reply keyword is not in the email subject and jc_nkname exceeds 0.125, it is classified as a personal email. All other digital transmissions are classified as non-anomalous transmissions.

(III) Contextual Analytical Model Data (First Example Anomalous Transmission Model Prediction Framework)

Contextual analytical model features (e.g., behavioral features) based on the relationship history between the sender and recipient track the history of previous 548 days from the last record of the sender and recipient. Therefore, this data is not time sensitive. The contextual analytical model features (e.g., contextual features) for the first prediction framework are the same as those shown in table 1a above. The contextual analytical model entities are shown in table 18d below:

recall was maintained, and precision increased slightly for validation data. Without these 2 features, another experiment was conducted. This experiment was an experiment on features that showed some differences in the histogram or group average, but significantly low feature importance after the model was trained. These 3 features were fwds_sub_in, blank_sub_ratio_in, and blank_sub_in. From the qualitative judgement, it was expected that the blank subject is more critical in identifying personal email than the presence of the forwards keyword, so, those 3 features were sequentially removed and tested. When dropping blank_sub_ratio_in feature, precision slightly increased while maintaining recall, but when the other 2 features are dropped/excluded, there was performance drop.

As a result of this backwards elimination experiment, a contextual analytical model with 14 features was created. Based on validation data, the contextual analytical model with 14 features showed superior performance than the contextual analytical model which utilized all 17 features. However, contextual analytical model with 14 features showed performance drop on test data compared to the training and validation data. In particular, the performance drop was noticeable in the recall. It is presumed that overfitting occurred on the remaining 14 features to increase accuracy in a situation where 3 features were lost. Therefore, all 17 features of the final contextual analytical model were maintained.

TABLE 18d

| SI No. | Entity Name | Entity Type | Description | Timeline |
|---|---|---|---|---|
| 1. | transmission.metadata_v3 | Table | Source table - daily transmission logs | Daily load |
| 2. | transmission.metadata_v3_senders | Table | Source table - sender's information of daily transmission logs | Daily load |
| 3. | transmission.metadata_v3_recipients | Table | Source table - recipient's information of daily transmission logs | Daily load |
| 4. | transmission.metadata_v3_behavior_features | Table | Derived contextual analytical model features | Daily load |
| 5. | transmission.insert_metadata_v3_behavior_features | Postgres function | Inserts behavior features to 'transmission.metadata_v3_be-havior_features' table | |

(IV) Contextual Analytical Model Data (Second Example Anomalous Transmission Model Prediction Framework The contextual analytical model features for the second prediction framework includes a total of 17 features and are the same as those shown in table 1b above. Prior to modeling, the differences between the positive and negative groups for all 17 features were analyzed using a histogram and group average. Among 17 features, 5 features did not show significant differences between the two groups. These 5 features could not be dropped/excluded before model development. Indicators such as histograms and averages were based on independent analysis of each feature against whole training data. In other words, aspects such as harmony between features were not measured. Therefore, after the contextual analytical model (e.g., behavioral model) was developed, the existence of these 5 features was determined by removing them one by one in a backwards manner.

Figure 12:
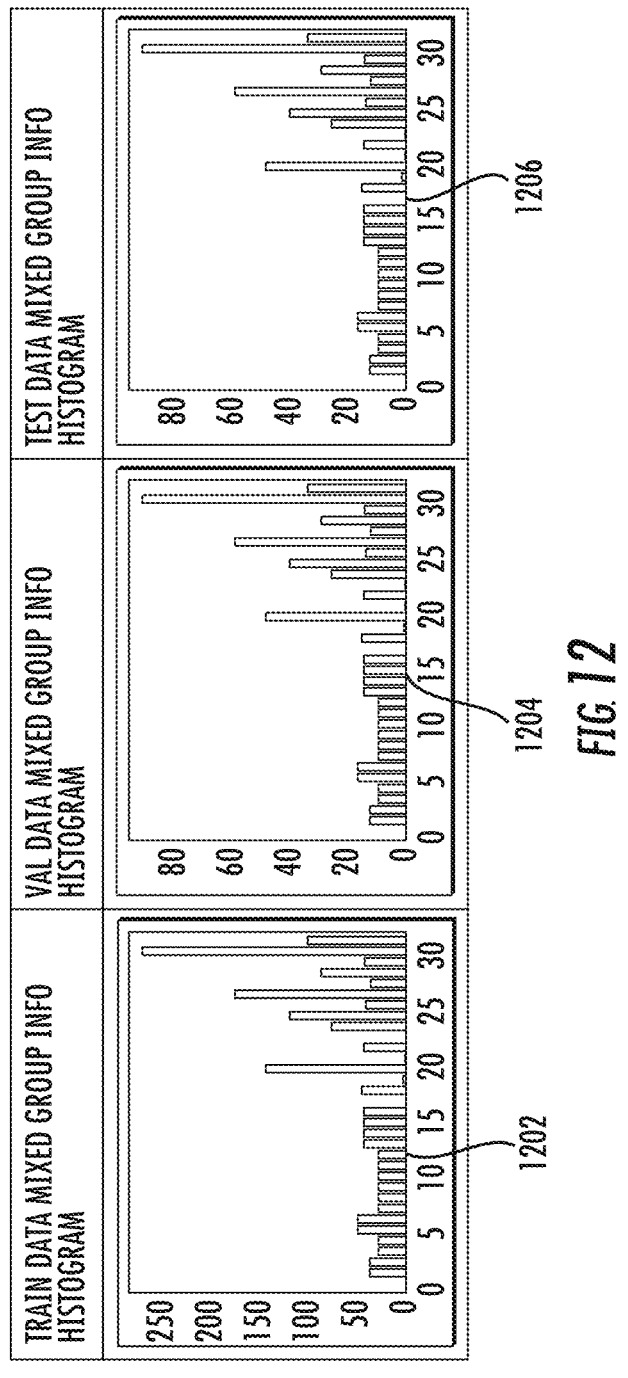
FIG. 12 illustrates an example data partitioning quality test results using an example test method in accordance with an example embodiment of the present disclosure.

The final contextual analytical model algorithm (e.g., selected algorithm) was a random forest algorithm, as described above. Among the 5 features mentioned above, 2 features, replies_sub_in and replies_ratio_in, showed low feature importance. As a result of training excluding replies_sub_in and replies_ratio_in features, it was confirmed that Data Partitioning All intra-transmission analytical model features (e.g., lexical features) showed similar statistics for training (train) data, validation (val) data, and test data and all contextual analytical model features show similar statistics for training data, validation data, and test data. Even though sometimes there are different max values for inch partition, that was because of the outliers. FIG. 12 illustrates example data partitioning quality test results in accordance with an example text method. Specifically, FIG. 12 shows partitioned data sets comparisons including training data mixed group histogram 1202, validation data mixed group histogram 1204, and test data mixed group histogram 1206 for the second prediction framework. As shown, in FIG. 12, another way to measure the quality of the partitioning is comparing mixed group information which potentially indicate the source of the data.

Figures 13A, 13B:
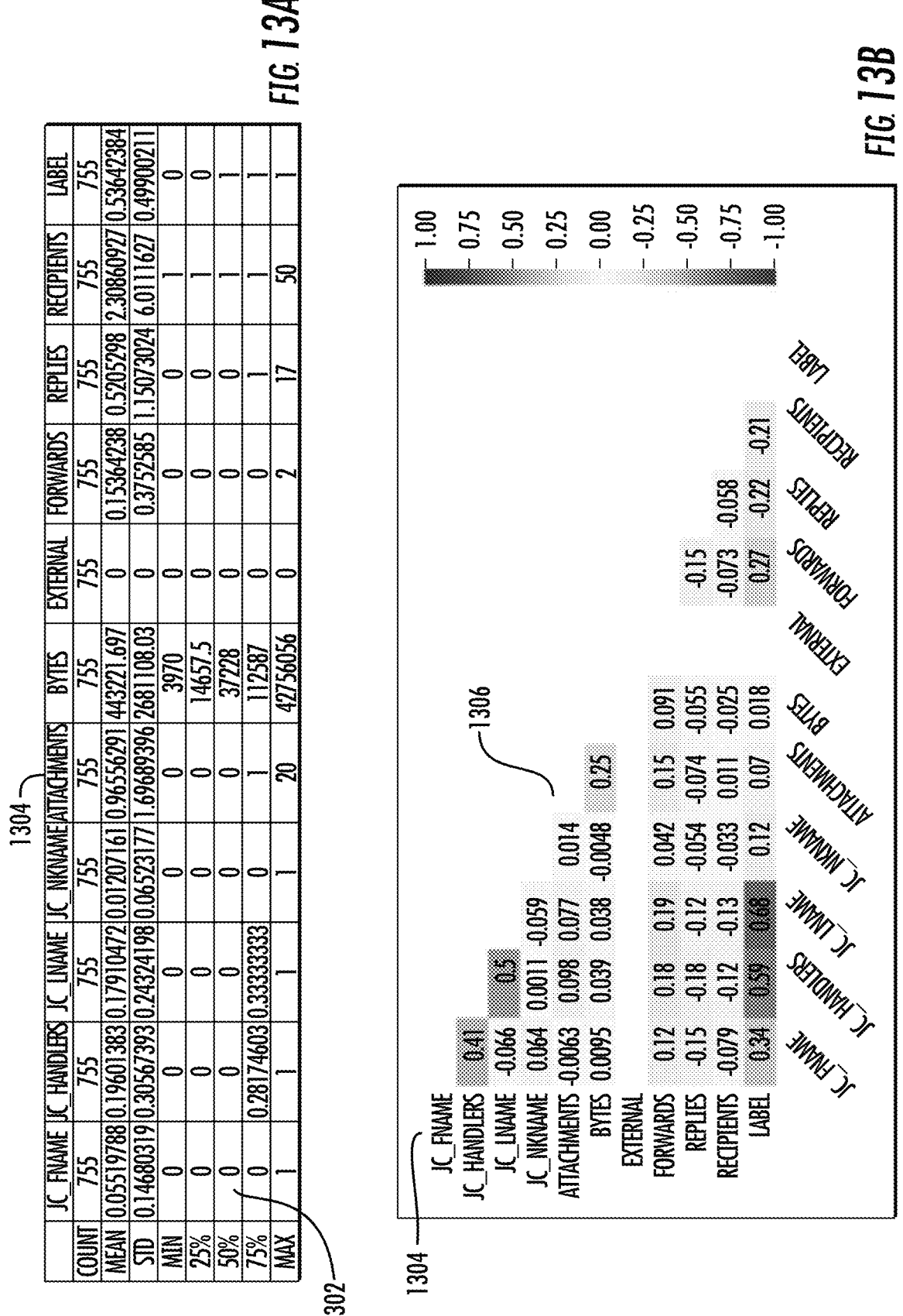
FIG. 13a illustrates an intra-transmission analytical model training data features statistics in accordance with an example embodiment of the present disclosure.
FIG. 13b illustrates an intra-transmission analytical model training data correlation matrix in accordance with an example embodiment of the present disclosure.

Data Quality and Reconciliation (I) Intra-Transmission Analytical Model Training Data Set & Final Model Selection Data for First Prediction Framework FIG. 13*a* illustrates features statistics for the training data for the intra-transmission analytical model for the first prediction framework and FIG. 13*b* illustrates correlation matrix for the training data. Specifically, FIG. 13*a* depicts statistics 1302 (e.g., count, mean, standard deviation, and/or the like) for the features 1304 of the model and FIG. 13*b* depicts correlation data 1306 for the features 1304. 755 labels were sampled. Missing values for all the model features were imputed with 0. The class distribution in the intra-transmission analytical model training data set with respect to the first example embodiment is shown in Table 19a below:

TABLE 19a

| Overall class distribution in the training data set | | |
| --- | --- | --- |
| Class = 1 | Count = 405 | Percentage = 54% |
| Class = 0 | Count = 350 | Percentage = 46% |
| Class distribution in the training data set | | |
| Class = 1 | Count = 320 | Percentage = 53% |
| Class = 0 | Count = 284 | Percentage = 47% |
| Class distribution in the model selection data | | |
| Class = 1 | Count = 85 | Percentage = 56% |
| Class = 0 | Count = 66 | Percentage = 44% |

80% of the model training data set become a final model training data set which was used for model training. Model training included the process of finding optimal hyperparameters through grid search and training the final model with optimized hyperparameters. The remaining 20% of the model training data set became final model selection data which is used for model selection.

Figures 14A, 14B:
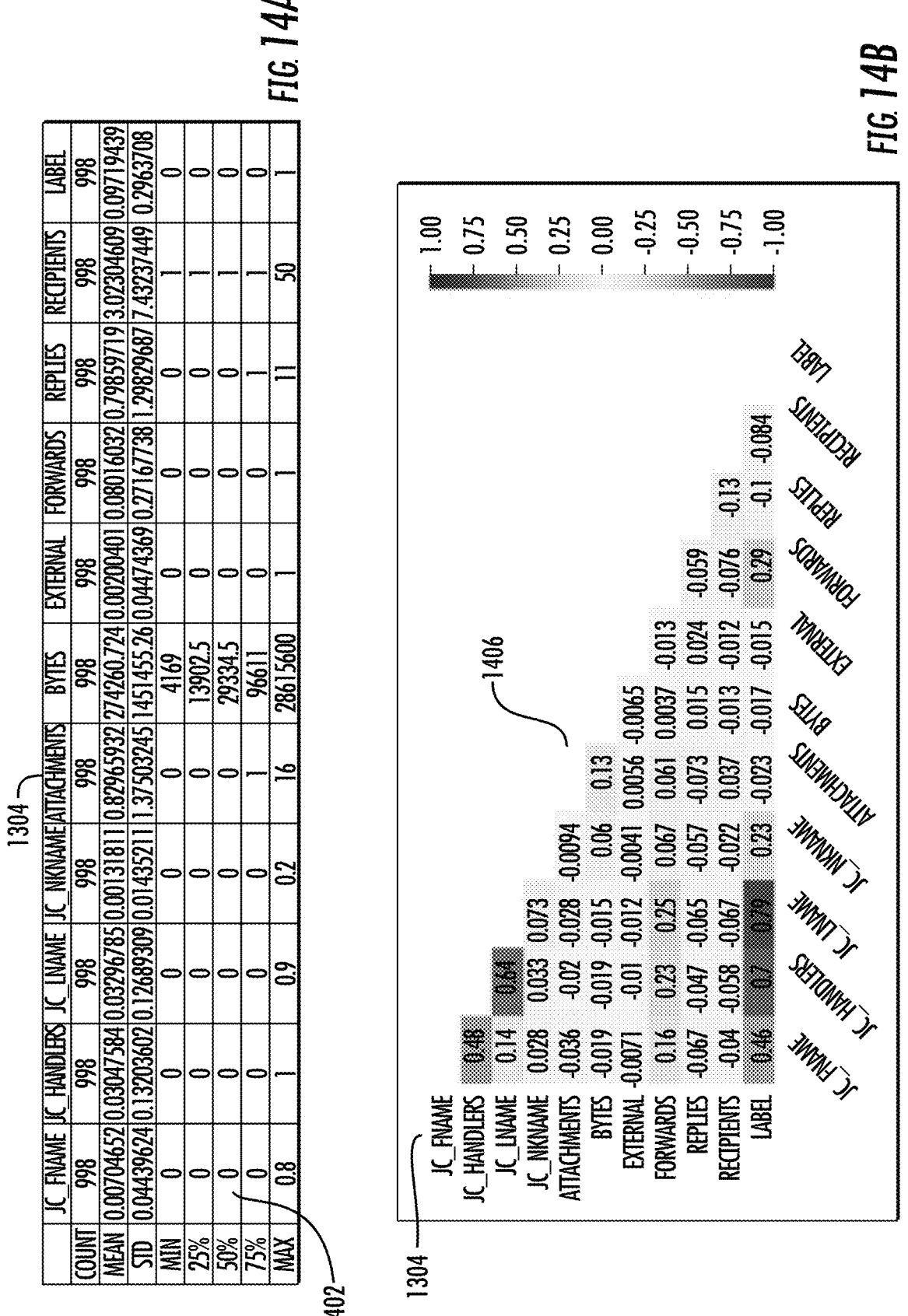
FIG. 14a illustrates an intra-transmission analytical model test data features statistics in accordance with an example embodiment of the present disclosure.
FIG. 14b illustrates an intra-transmission analytical model test data features correlation matrix in accordance with an example embodiment of the present disclosure.

(II) Intra-Transmission Analytical Model Test Data for First Prediction Framework FIG. 14*a* illustrates feature statistics for the test data for the intra-transmission analytical model of the first prediction framework and FIG. 14*b* illustrates correlation matrix for the test data. Specifically, FIG. 14*a* depicts statistics 1402 (e.g., count, mean, standard deviation, and/or the like) for the features 1304 of the model and FIG. 14*b* depicts correlation data 1406 for the features 1304. 988 labels were sampled. Missing values for all the model features were imputed with 0. The class distribution in the intra-transmission analytical model test data is shown in Table 19b below:

TABLE 19b

| Class distribution in the intra-transmission analytical model real world test data | | |
| --- | --- | --- |
| Class = 1 | Count = 97 | Percentage = 10% |
| Class = 0 | Count = 901 | Percentage = 90% |

The intra-transmission analytical model test data is used for the final model test and is representative of the entire population since it was randomly sampled without any heuristic filters.

Figure 15B:
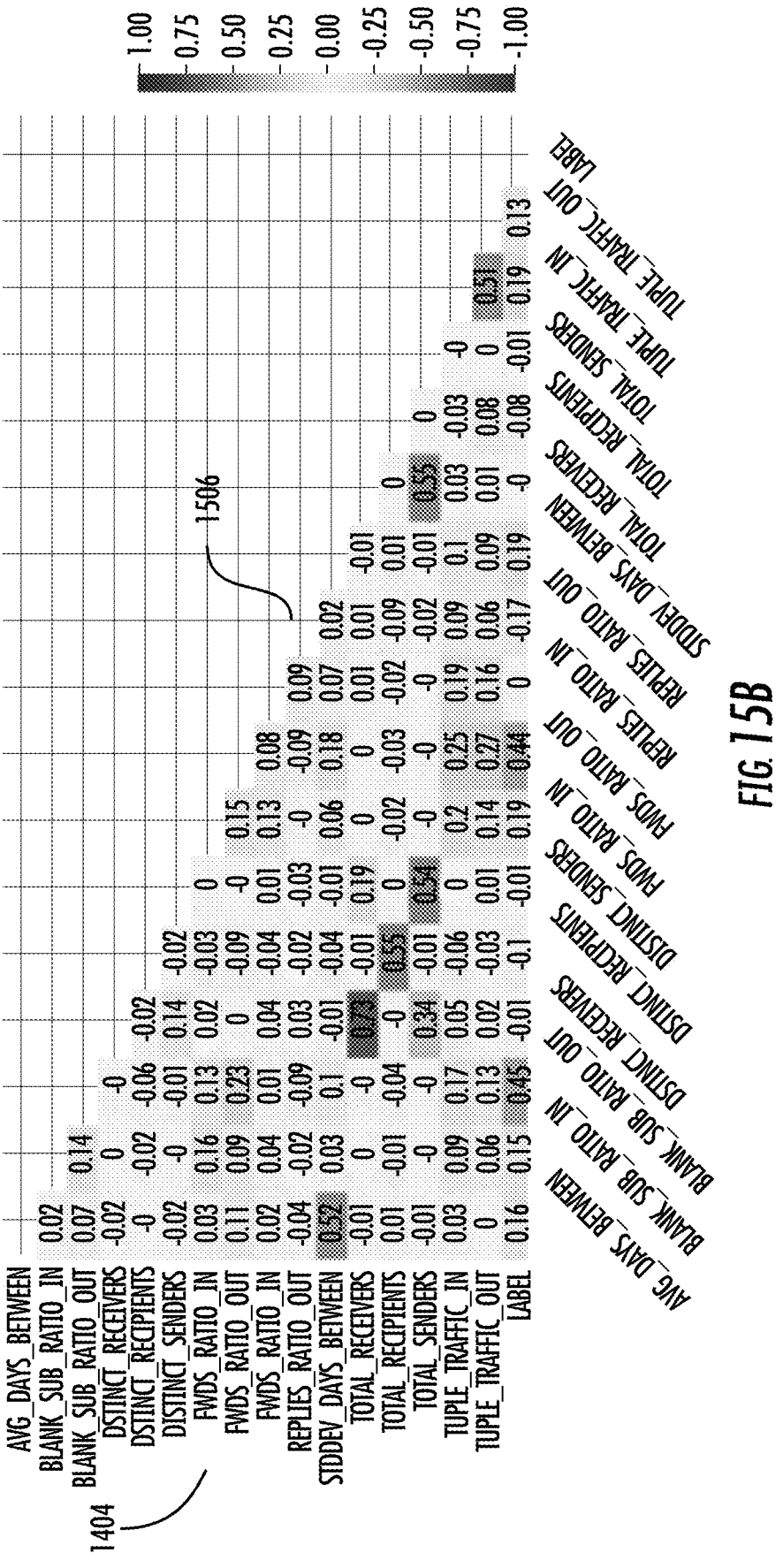
FIG. 15b illustrates a contextual analytical model training data correlation matrix in accordance with an example embodiment of the present disclosure.

(III) Contextual Analytical Model Data Training Data & Final Model Selection Data Set for First Prediction Framework FIG. 15*a* illustrates features statistics for the training data for the contextual analytical model for the first prediction framework and FIG. 15*b* illustrates correlation matrix for the training data. Specifically, FIG. 15*a* depicts statistics 1502 (e.g., count, mean, standard deviation, and/or the like) for the features 1404 of the model and FIG. 15*b* depicts correlation data 1506 for the features 1404. 1,492,193 labels were sampled. Missing values for the model features were imputed with −1 when NULL. The class distribution in the intra-transmission analytical model training data set is shown in Table 20a below:

Two features, total_receiver and dstnct_receivers had high correlation. Intuitively, the pattern may be seen because if there are more distinct receivers, there are more total receivers. The class distribution in the contextual analytical model training data set is shown in Table 20a below:

TABLE 20a

| Overall class distribution in the contextual analytical model data set | | |
| --- | --- | --- |
| Class = 1 | Count = 60,034 | Percentage = 4% |
| Class = 0 | Count = 1,432,159 | Percentage = 96% |
| Class distribution in the final model training data set | | |
| Class = 1 | Count = 48,027 | Percentage = 4% |
| Class = 0 | Count = 1,145,727 | Percentage = 96% |
| Class distribution in the final model selection data | | |
| Class = 1 | Count = 12,007 | Percentage = 4% |
| Class = 0 | Count = 286,432 | Percentage = 96% |

(IV) Contextual Analytical Model Test Data for the First Prediction Framework

Figure 16B:
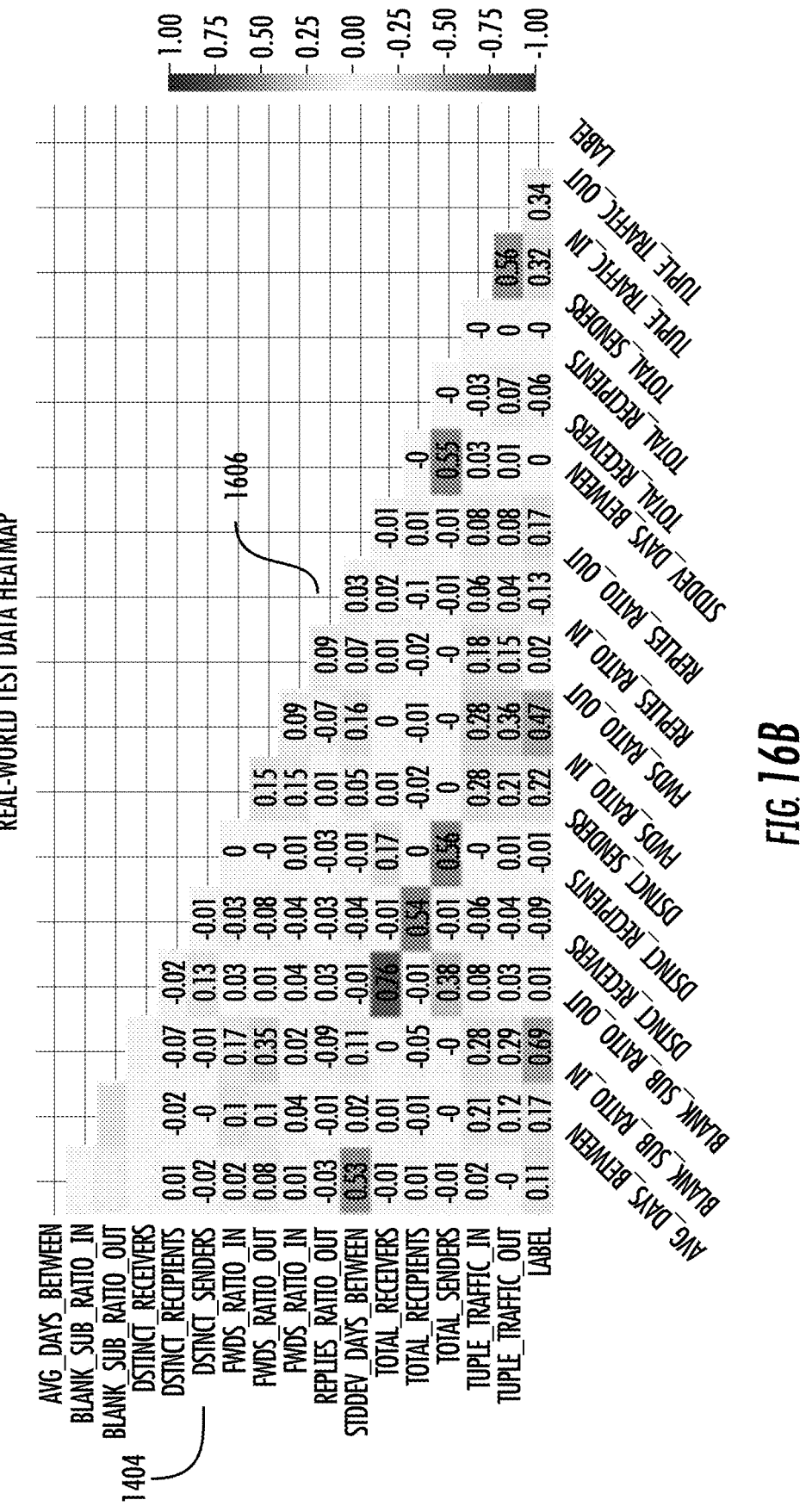
FIG. 16b illustrates contextual analytical model test data feature correlation matrix in accordance with an example embodiment of the present disclosure.

FIG. 16*a* illustrates feature statistics for the test data for the contextual analytical model for the first contextual analytical model for the first prediction framework and FIG. 16*b* illustrates correlation matrix for the test data features. Specifically, FIG. 16*a* depicts statistics 1602 (e.g., count, mean, standard deviation, and/or the like) for the features 1404 of the model and FIG. 16*b* depicts correlation data 1606 for the features 1404. 55,250 labels were sampled. Missing values for all the model features were imputed with −1 when NULL. The class distribution in the contextual analytical model test data set is shown in Table 20b below:

TABLE 20b

| Overall class distribution in the contextual analytical model test data | | |
| --- | --- | --- |
| Class = 1 | Count = 1,625 | Percentage = 3% |
| Class = 0 | Count = 53,625 | Percentage = 97% |

Figures 17B, 17C:
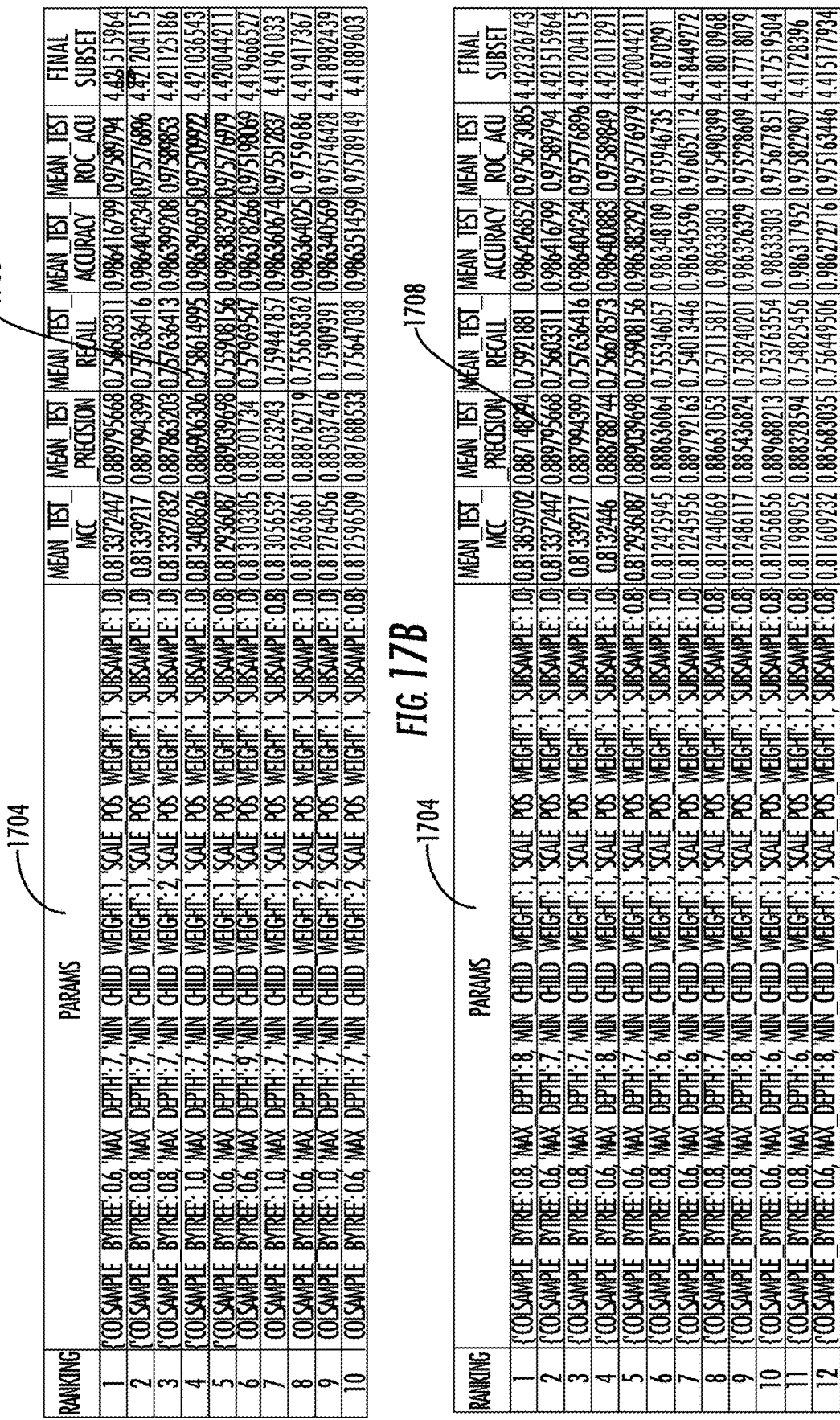
FIG. 17b illustrates a portion of first quantitative results of parameters obtained with grid search for a contextual analytical model training data set in accordance with an example embodiment of the present disclosure.
FIG. 17c illustrates a portion of second quantitative results of parameters obtained with a second grid search for a contextual analytical model training data set in accordance with an example embodiment of the present disclosure.

FIG. 17*a* illustrates a portion of first quantitative results 1702 of parameters 1704 obtained with grid search for the intra-transmission analytical model training data set for the first prediction framework. FIG. 17*b* illustrates a portion of first quantitative results 1706 of parameters 1704 obtained with grid search for the contextual analytical model training data set for the first prediction framework. FIG. 17*c* illustrates a portion of second quantitative results 1708 of parameters 1704 obtained with a second grid search for the contextual analytical model training data set for the first prediction framework.

(V) Intra-Transmission Analytical Model Variable Selection for the First Prediction Framework The model features (e.g., lexical features) for the intra-transmission analytical model for the first prediction framework included 4 lexical similarity score variables and 6 metadata variables, as described above. A two-sample t-test was conducted for the model features (e.g., lexical features) to determine the relationship between the independent variable and the dependent variable. FIG. 18*a* illustrates the two-sample t-test result/data 1802 for the two-sample t-test conducted for the intra-transmission analytical model features 1304.

(VI) Contextual Analytical Model Variable Selection

The contextual analytical model variable selection may be very concise compared to intra-transmission analytical model variable selection. For example, because the training data size was 1.4 million in the first prediction framework, it may be difficult to conclude that the pattern learned in the training is noise. A two-sample t-test was conducted for the model features (e.g., behavior features) for the contextual analytical model for the first prediction framework. FIG. 18B illustrates a two-sample t-test result 1804 conducted for the contextual analytical model features 1404. As may be seen in FIG. 18B, all 16 variables show statistically significant differences in the two groups.

Figures 19A, 19B, 19C:
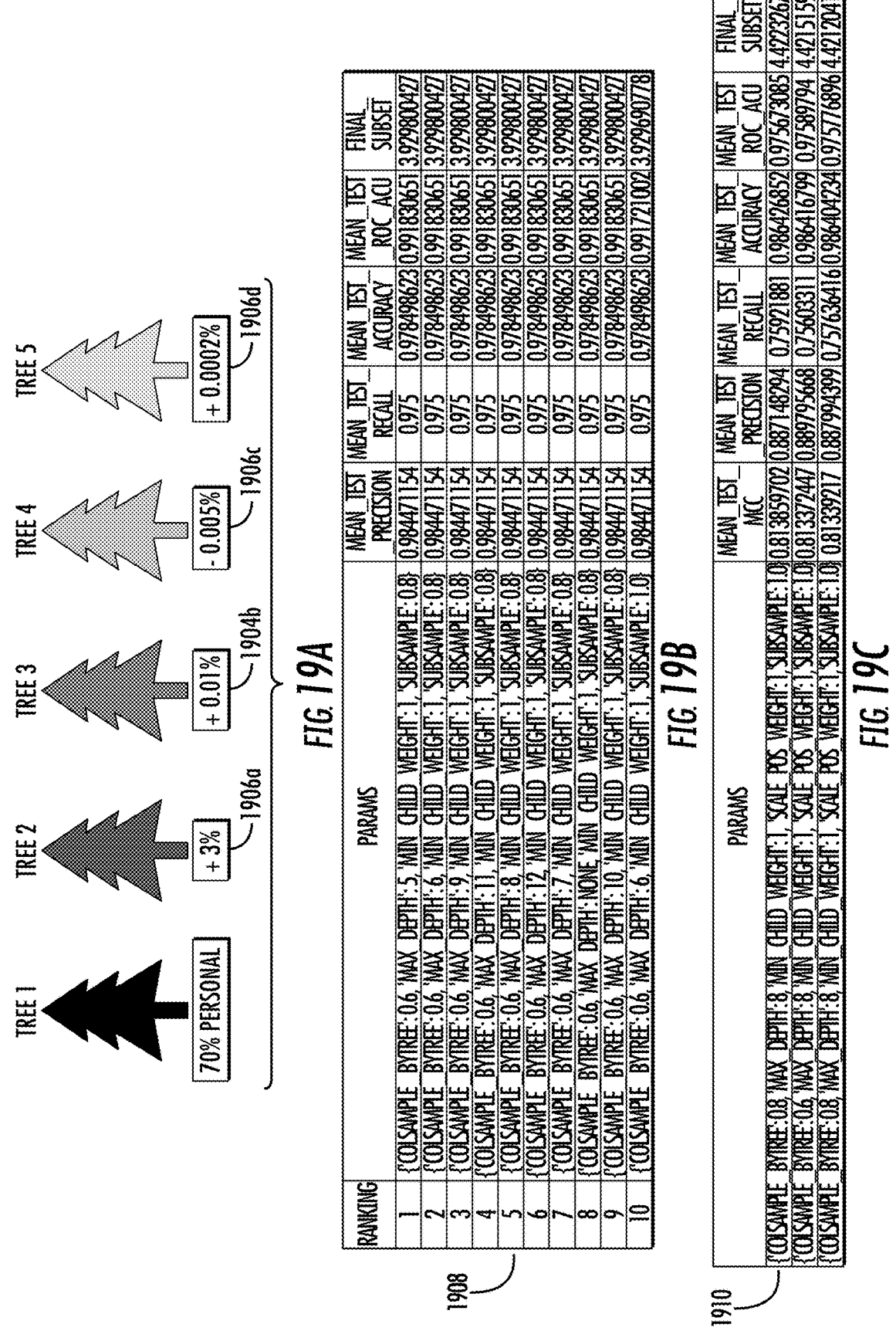
FIG. 19a illustrates an example XGBoost in accordance with an example embodiment of the present disclosure.
FIG. 19b illustrates results of top 10 alternative iterations for an XGBoost algorithm in accordance with an example embodiment of the present disclosure.
FIG. 19c illustrates results of top 3 alternative iterations for an XGBoost algorithm in accordance with an example embodiment of the present disclosure.

As described above, XGBoost algorithm was selected for the contextual analytical model for the first prediction framework. FIG. 19a illustrates an example dramatized representation of XGBoost. The XGBoost may be based on Decision Tree algorithm. A decision tree algorithm may comprise an algorithm that checks various checklists for given data and classifies them according to the destination of the checklist. These checklists may sometimes over-optimize for the given training data, resulting in overfitting. The XGBoost algorithm may be configured to create these decision trees sequentially. For example, the XGBoost may create a first decision tree, and find the difference between the prediction of the first tree and the actual observation. The XGboost may then create a second decision tree to predict the difference. Since there may still be errors, a third decision tree that can make up for the prediction error of the second tree may be created. The XGBoost may be configured to continue generating trees until a predefined number of decision trees are created or the error gaps satisfies a predefined threshold. In this regard, XGBoost may continuously make up for the errors of the previous decision tree and derive near-perfect performance. As shown in FIG. 19a, the XGBoost algorithm may include one or more decision trees 1904. In one example, the XGboost algorithm comprise 100 decision trees, where the decision trees predict the error (e.g., 1906a-d) of the previous tree as shown in FIG. 19a. The prediction errors may be summed to make a final decision. The XGboost algorithm, for example, may be configured for avoiding overfitting through grid-search. FIG. 19b illustrates results of the top 10 alternative iterations 1908 for the XGBoost algorithm (e.g., hyperparameter tuning top 10 for XGboost algorithm). The performances were the same for all top 9 combinations. In this regard, hyperparameter combination which use 5 as max_depth to create general model was selected in some examples. FIG. 19c illustrates results of the top three alternative iterations 1910 for the XGBoost algorithm (e.g., hyperparameter tuning top three for XGboost algorithm). Top one parameter set used more complicated trees with bigger max_depth and 0.8 colsample_bytree. However, it provided better performances in the cross-validation step than other parameter set. In this regard, top one parameter set as hyperparameters of XGBoost algorithm was selected in some examples.

Figures 25A, 25B:
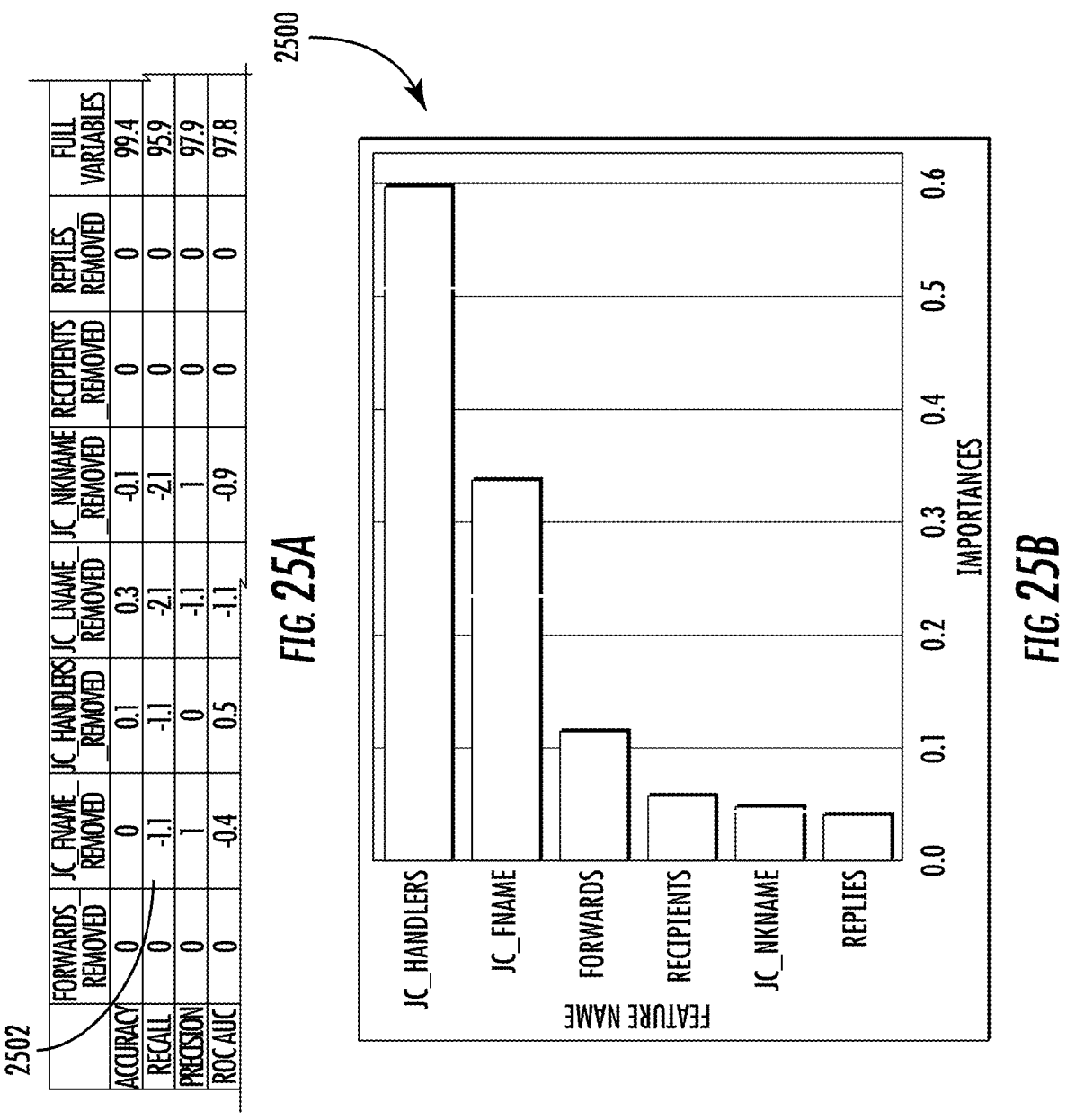
FIG. 25a illustrates sensitivity test data for an example intra-transmission analytical model in accordance with an example embodiment of the present disclosure.
FIG. 25b illustrates an intra-transmission analytical model feature importance chart in accordance with an example embodiment of the present disclosure.

Sensitivity Testing (I) Sensitivity Test for Intra-Transmission Analytical Model for First Prediction Framework Seven features were used for the intra-transmission analytical model for the first prediction framework, as described above. To prove the model's sensitivity, by eliminating each input variable and re-training the model, it may be seen how much the performance drops. The data includes 998 record with 97 positive cases and 901 negative cases. FIG. 25A illustrates the sensitivity test data 2502 for the intra-transmission analytical model for the first prediction framework.

All the results of the sensitivity test for the intra-transmission analytical model are stable. There is no significant drop for metrics, which means the intra-transmission analytical model is very robust in the stressed environment.

FIG. 25b shows an intra-transmission analytical model feature importance chart 2500 without jc_name. FIG. 25b shows how other variables/features (e.g., some of the features 1304) make up the model when they do not have jc_lname, jc_handlers, and jc_fname dominate the model and try to make up the jc_lname absence. The inventors also determined that the performance of the intra-transmission analytical model was maintained when some features were absent. For example, the test accuracy was fully covered with other variables when excluding forwards, replies, or recipients.

(II) Sensitivity Test for Contextual Analytical Model for the First Prediction Framework Sixteen features were used for the final contextual analytical model, as described above. To prove the model's sensitivity, by eliminating each input variable and re-training the model, it may be seen how much the performance drops. The data includes 55,250 records, with 1,625 positive cases and 53,625 negative cases. FIG. 26 illustrate sensitivity test data 2602 for the example contextual analytical model. All the results of the sensitivity test for the contextual analytical model indicated no significant drop for metrics and the performance of the model. Some metrics and performances even improved in some cases, which means all variables may affect the model equally, and this final contextual analytical model is very robust in the stressed environment.

Outcome Analysis for First Prediction Framework (I) Outcome Analysis for Intra-Transmission Analytical Model of First Prediction Framework Although the intra-transmission analytical model training data set in the illustrated example had imbalanced label ratio, it was randomly sampled without any filters. Therefore, this performance may be maintained at a similar level for data. The intra-transmission analytical model test data included 998 records with 97 positive cases and 901 negative cases. The intra-transmission analytical model evaluation criteria is shown in Table 21 below:

TABLE 21

| Accuracy | Recall | Precision | ROC_AUC |
| --- | --- | --- | --- |
| 99.4% | 95.9% | 97.9% | 97.8% |

Overall intra-transmission analytical model, as depicted in Table 21, showed a decent statistics of 95% to 99%. The precision and recall metrics suggest good performance considering that the example intra-transmission analytical model was trained only to determine the similarity between the sender email address and the recipient email address and metadata.

Figure 20A:
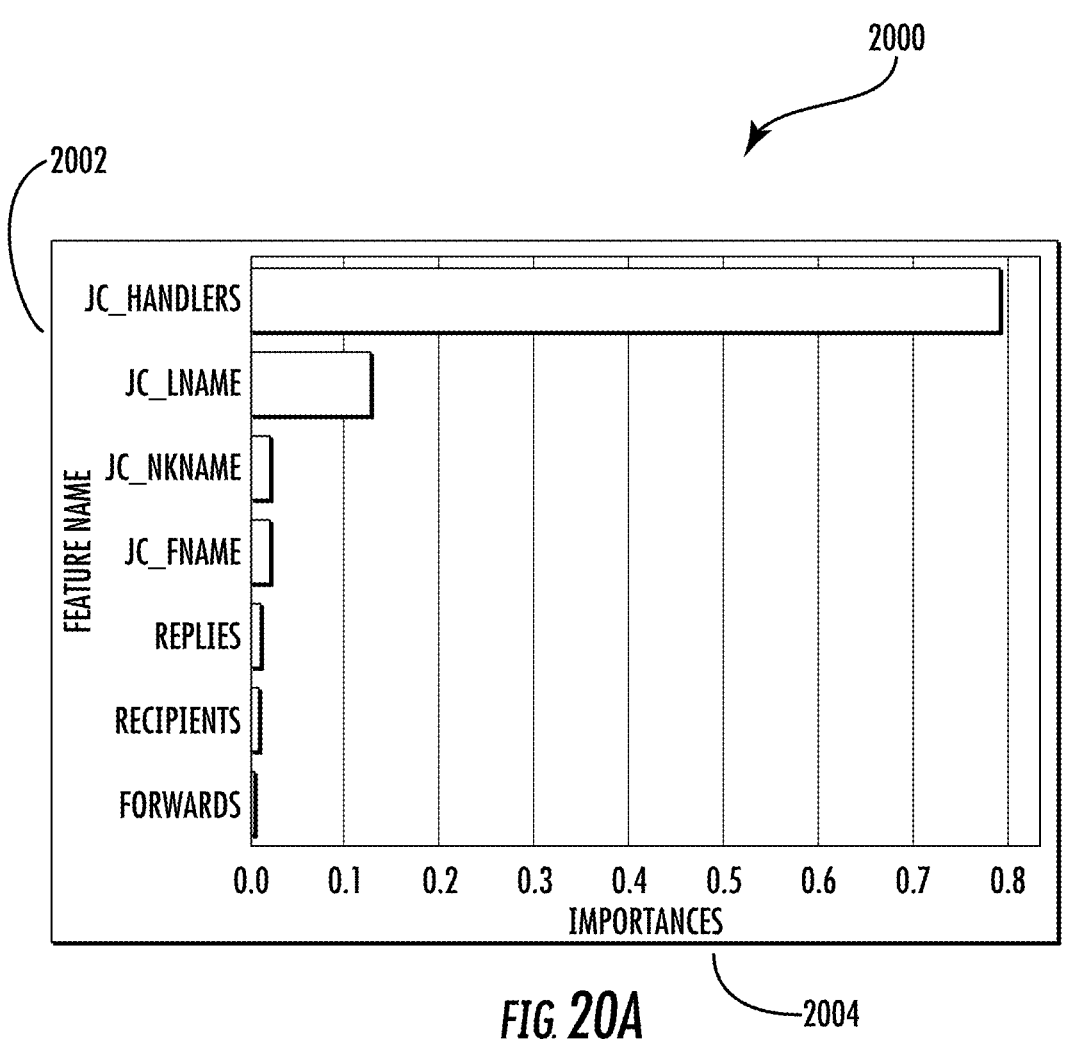
FIG. 20a illustrates a feature importance chart for an example intra-transmission analytical model in accordance with an example embodiment of the present disclosure.

FIG. 20a illustrates a feature importance chart 2000 for an example intra-transmission analytical model. The features 2002 are depicted on the y-axis and the corresponding importance 2004 depicted on the x-axis. Specifically, FIG. 20a shows the feature importance for the final intra-transmission analytical model with respect to the first example embodiment described above. The influence of recipients and replies come from the fact that the number of recipients and replies is smaller for personal emails. The influence of forwards comes from the fact that the number of forwards is bigger for personal emails. This confirms the results of the two-sample t-test.

Figure 20B:
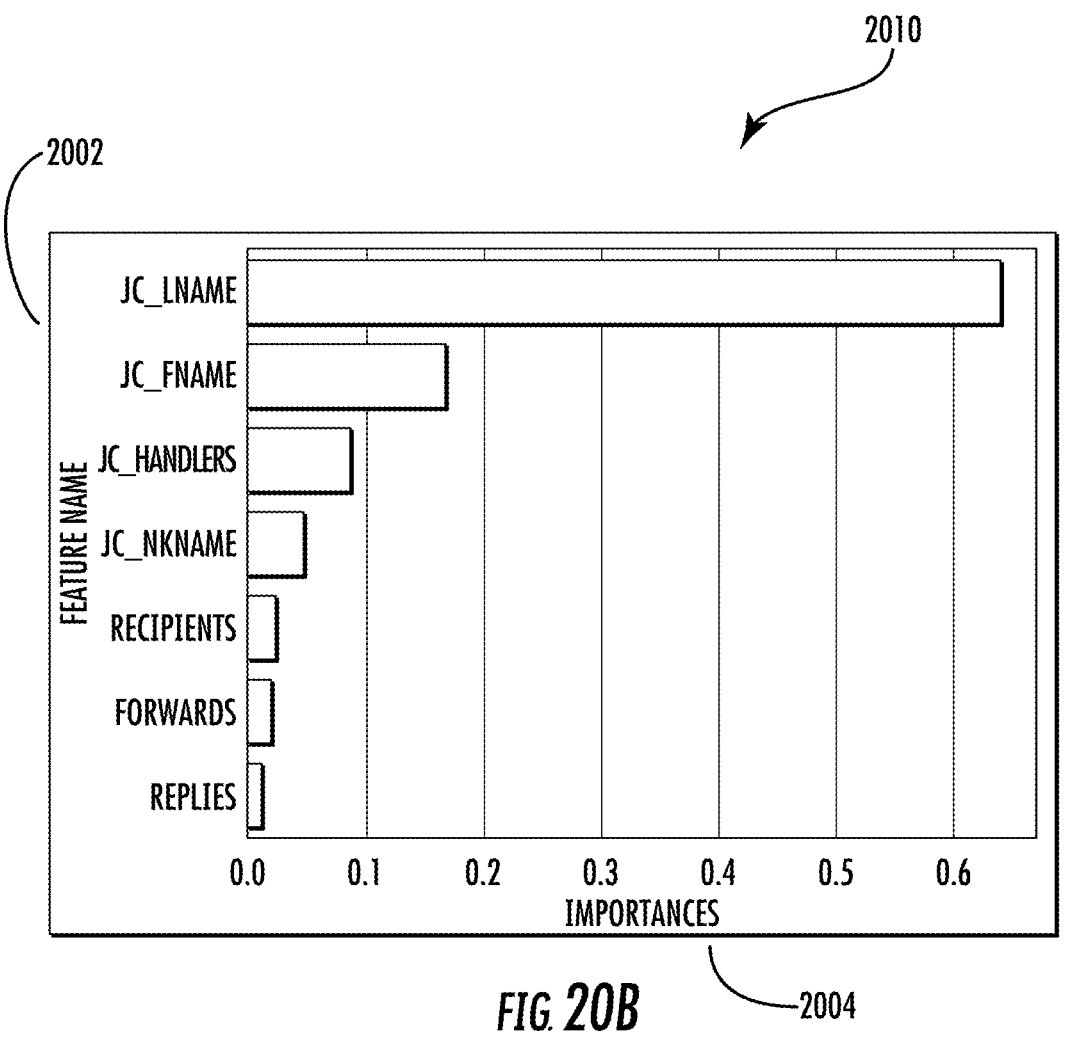
FIG. 20b illustrates a feature importance chart for an example intra-transmission analytical model in accordance with an example embodiment of the present disclosure.

FIG. 20b illustrates a feature importance chart 2010 for another example intra-transmission analytical model. The features 2002 are depicted on the y-axis and the corresponding importance 2004 depicted on the x-axis. Specifically, FIG. 20B illustrates feature importance of an alternative intra-transmission analytical model (with respect to the first example embodiment) that relies heavily on Jaccard similarity score of last name, which may affect performance when a new data set does not include a reliable Jaccard similarity score for last name.

Figure 21:
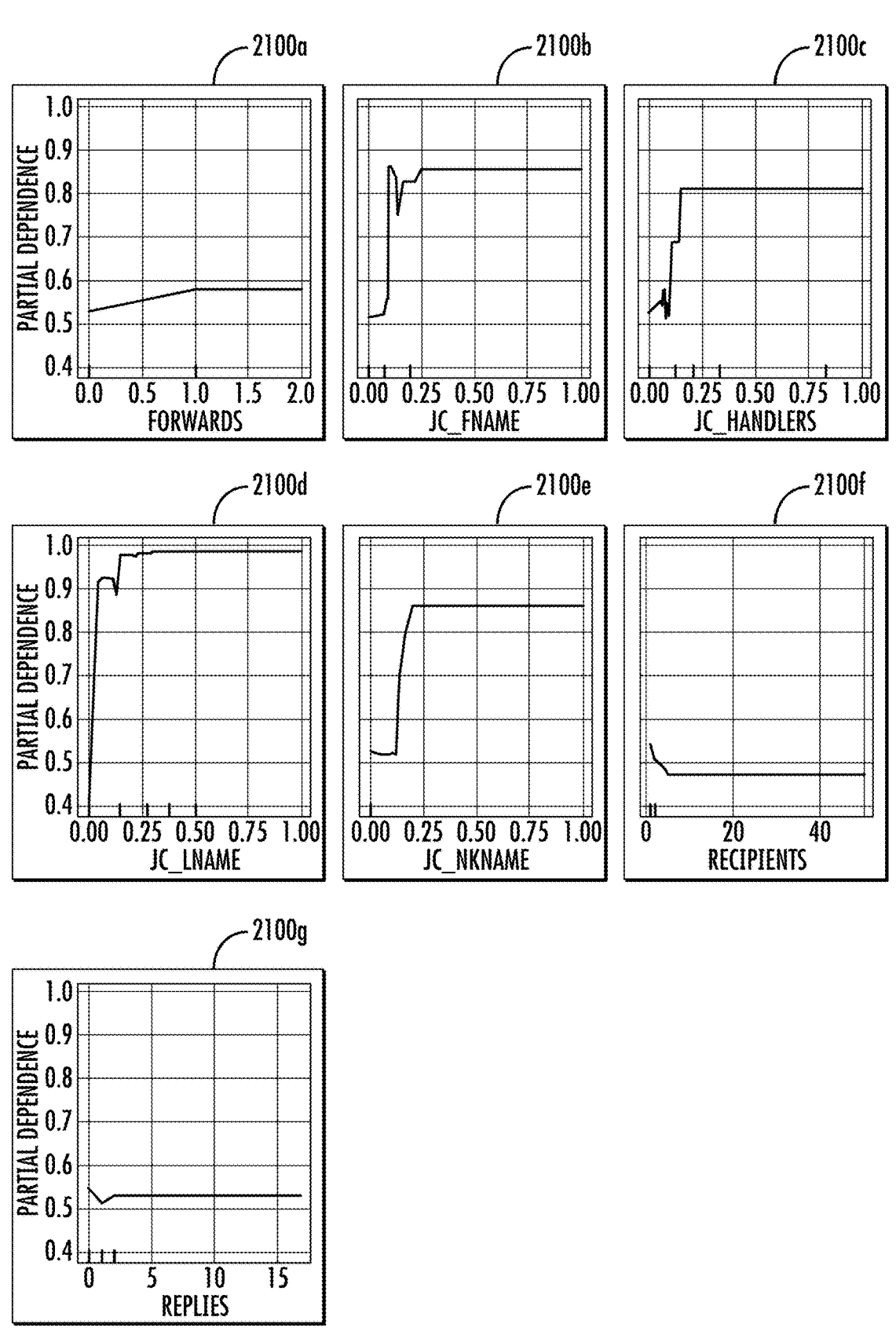
FIG. 21 illustrates partial dependence plots of an intra-transmission analytical model in accordance with an example embodiment of the present disclosure.

In addition to feature importance, partial dependence plots were tested. FIG. 21 illustrates partial dependence plots 2100a-g of the intra-transmission analytical model features. The partial dependence plot require one assumption that all features are independent to each other. The partial dependence plots still provide relational visualization between intra-transmission analytical model features (e.g., lexical features) and label. The partial independence plots confirm the results of feature importance.

(II) Outcome Analysis for Contextual Analytical Model of First Prediction Framework Although the contextual analytical model test data had imbalanced label ratio (as expected/intended in the test example). The ratio of positive cases in an example environment/implementation is around 3% based on the intra-transmission analytical model. In this regard, when the contextual analytical model test data was created, the ratio between positive and negative cases was maintained. Therefore, this performance may be maintained at a similar level for data. The contextual analytical model test data included 55,250 records with 1,625 positive cases and 53,625 negative cases. Since these negative labels have the same limitation with behavior data, this contextual analytical model test data (e.g., behavior test data) may be imperfect. However, considering label ratio and ground truth positive label, this contextual analytical model test data will provide strong reliability for the contextual analytical model performance measurement. The final contextual analytical model evaluation criteria is shown in Table 22 below:

TABLE 22

| Accuracy | Recall | Precision | ROC_AUC | MCC |
|---|---|---|---|---|
| 99.4% | 93.5% | 86.4% | 96.5% | 89.5% |

Table 22 shows the performance of the final contextual analytical model on the contextual analytical model test data. For the data which has more similar label ratio to the email data, the model shows better performance than model selection process. In addition, the performance as may be seen in the Table 22 will be maintained at a similar level to some extent in email data.

Figure 22:
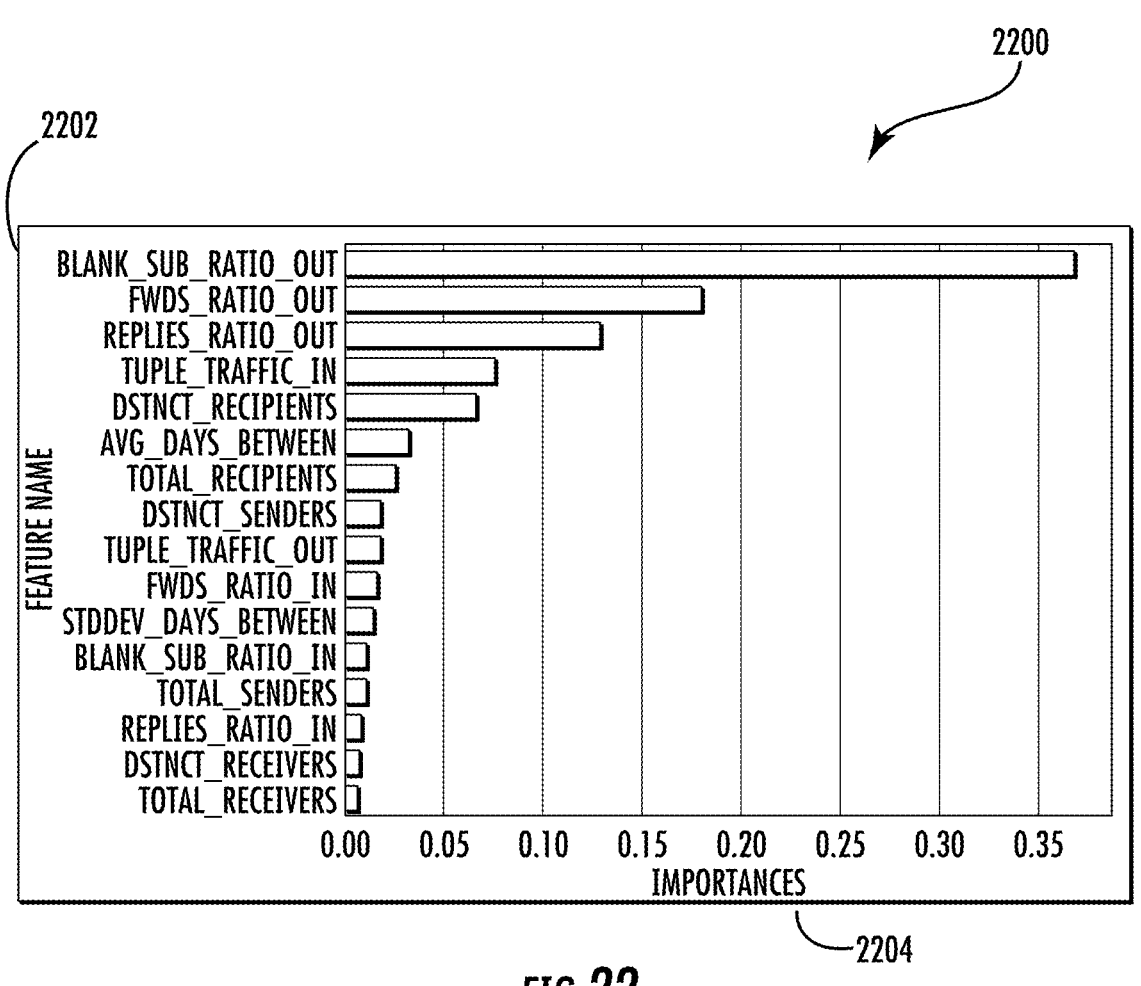
FIG. 22 illustrates an example feature importance chart for a contextual analytical model in accordance with an example embodiment of the present disclosure.

FIG. 22 illustrates an example feature importance chart 2200 of the final contextual analytical model with respect to the first example embodiment. The features 2202 are depicted on the y-axis and the corresponding importance 2204 depicted on the x-axis. FIG. 22 shows the feature importance for the contextual analytical model. As all sixteen variables showed significant differences between the two groups in the two-sample t-test, it was confirmed that all variable contributed to the contextual analytical model. One important observation found is that the more blank subject line email sent by the sender to recipient, the more forward records, and the fewer replies records, the more likely it is a personal email.

Figure 23:
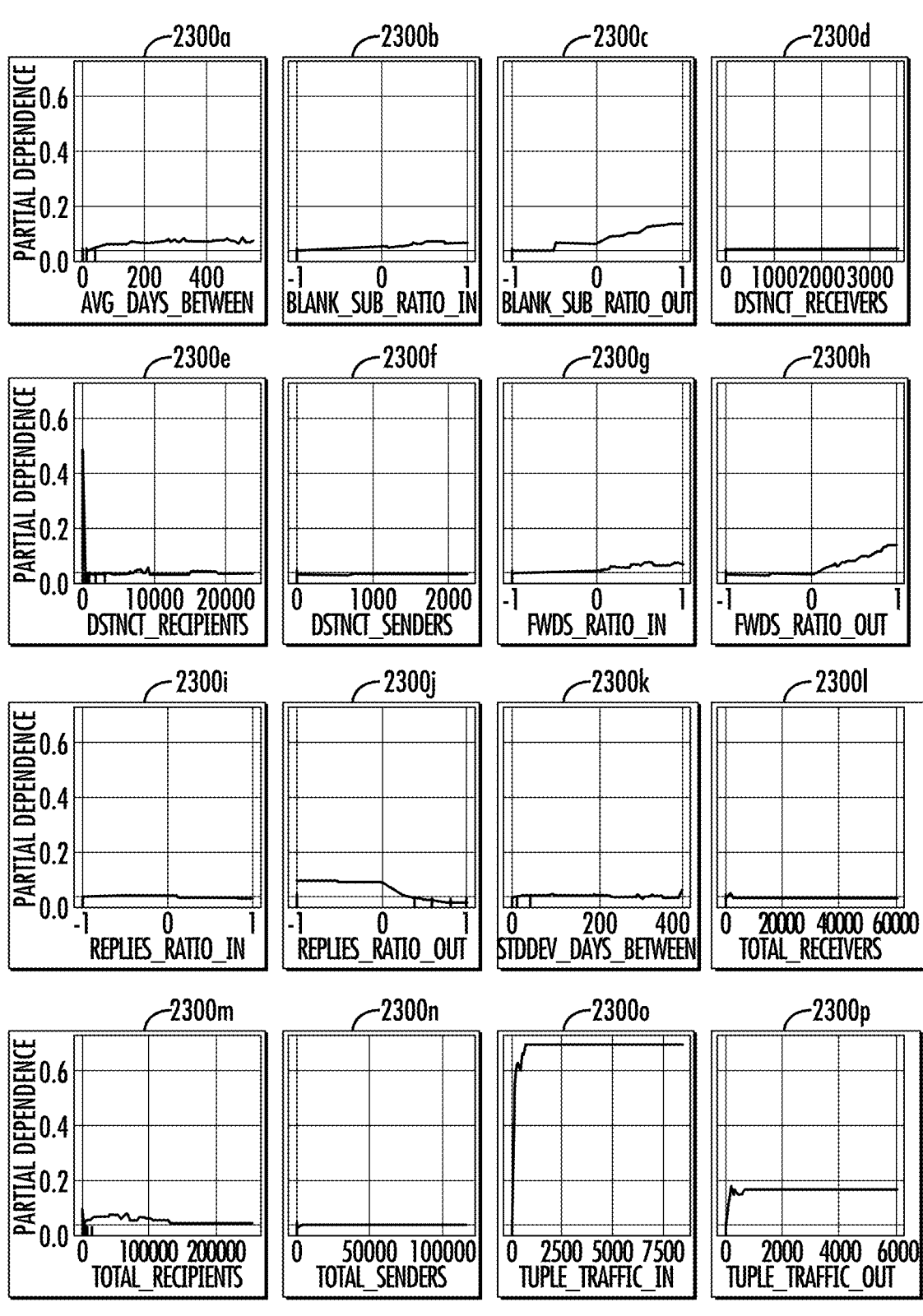
FIG. 23 illustrates partial dependence plots for a contextual analytical model in accordance with an example embodiment of the present disclosure.

In addition to feature importance, partial dependence plots were tested. FIG. 23 illustrates partial dependence plots 2300a-p of the contextual analytical model features (e.g., behavior features). Partial dependence plots still provide relational visualization between the behavior features and label. The partial independence plots confirm the results of feature importance. Top 5 features based on the feature importance show dramatic partial dependence considering other features show stable partial dependence.

Outcome Analysis for the Second Prediction Framework (I) Outcome Analysis for the Intra-Transmission Analytical Model of the Second Prediction Framework The model development here were all balanced data, partitioned considering feature distribution. Test data (e.g., data that has never been exposed during the model development process) was used to objectively measure final model performance after model development is completed. Overfitting was checked by analyzing the outcomes of training, validation, and test data. The final intra-transmission analytical model for the second example embodiment included a rules-based model that was tuned with training and validation data. The intra-transmission analytical model accuracy, with respect to the second example embodiment, to check overfitting is shown in Table 23 below:

TABLE 23

|  | Train + Val | Test |
|---|---|---|
| Size | 2400 | 600 |
| Accuracy | 93% | 94.5% |
| Recall | 88.3% | 90.9% |
| Precision | 97.7% | 98.3% |
| ROC AUC | 93.1% | 94.6% |

As may be seen in Table 23, the outcome of the intra-transmission analytical model on the test data increased, confirming that it was a rules-based model without any overfitting. Although it was confirmed that the recall was somewhat low, in fact, after checking all the false negative cases manually, they were cases with no lexical similarity at all. From the intra-transmission analytical model perspective, when all lexical similarity features are 0, it shows that there is limitation in identifying personal emails using only metadata such as the number of recipients or reply keyword. Also, these features are close to signal that prevents false positive. Contextual analytical model was built to compensate for recall of the intra-transmission analytical model.

(II) Outcome Analysis for the Contextual Analytical Model of the Second Prediction Framework Similar to the intra-transmission analytical model, the model development mentioned here are all balanced data, partitioned considering feature distribution. Test data is data that has never been exposed during the model development process and exists to objectively measure final model performance after model development is completed. Overfitting is checked by analyzing the outcomes of training, validation, and test data. In the process of developing the contextual analytical model, various conventional machine learning algorithms were developed. Each algorithm was trained with 1,800 training data, and the trained algorithms were compared through 600 validation data. After selecting the best algorithm and its hyperparameters, the contextual analytical model was finally trained with 2,400 training and validation data (e.g., 2800 training data and 600 validation data). The final performance of the contextual analytical model was confirmed through 600 test data. The contextual analytical model accuracy, with respect to the second example embodiment, to check overfitting is shown in Table 24 below:

TABLE 24

| | Train | Val | Test |
|---|---|---|---|
| Size | 1800 | 600 | 600 |
| Accuracy | 91.3% | 86.5% | 87.7% |
| Recall | 87.2% | 82.1% | 83.2% |
| Precision | 95.4% | 90.6% | 92.1% |
| ROC AUC | 91.4% | 86.6% | 87.8% |

As may be seen in table 24, the outcome of the contextual analytical model on the test data decreased slightly compared to the outcome shown on the training data. 4 percent performance drop is acceptable, considering that behavior features are weak signals that are not that intuitive like lexical similarity features. Also, the reason for creating a contextual analytical model using these weak features is to cover the blind spots of the intra-transmission analytical model. Although the recall of the contextual analytical model is 83.2% in this second example embodiment, if the contextual analytical model covers the blind spots of the intra-transmission analytical model well, the contextual analytical model is beneficial.

(III) Overall Outcome Analysis for the First Prediction Framework.

As described above, an anomalous transmission prediction model framework largely consists of an intra-transmission analytical model and a contextual analytical model. Each of the first and second example anomalous transmission prediction model frameworks (e.g., prototype anomalous transmission prediction model frameworks) described above include an intra-transmission analytical model and contextual analytical model. Additionally, a phone number-based detection filter may be applied to the rules-based classification output of the intra-transmission analytical model of the second anomalous transmission prediction model framework, as described above. In some examples, the intra-transmission analytical model and contextual analytical model may form the anomalous transmission prediction model framework using UNION concept. The reason it may be integrated into the UNION concept is because the contextual analytical model exists to complement the recall of the intra-transmission analytical model. Performance test results for the second example anomalous transmission prediction model framework as a whole and individual portions are shown in Table 25 below:

TABLE 25

| | Intra-transmission analytical model for the second prediction framework | Intra-transmission analytical model for the second prediction framework plus phone number-based detection filter | Contextual analytical model for the second prediction framework | Second anomalous transmission prediction model framework (second prediction framework) |
|---|---|---|---|---|
| Test data | | 600 | | |
| Accuracy | 94.5% | 94.7% | 87.7% | 94.5% |
| Recall | 90.9% | 91.3% | 83.2% | 98.1% |
| Precision | 98.3% | 98.3% | 92.1% | 91.8% |
| False positives | 5 | 5 | 22 | 27 |

TABLE 25-continued

| | Intra-transmission analytical model for the second prediction framework | Intra-transmission analytical model for the second prediction framework plus phone number-based detection filter | Contextual analytical model for the second prediction framework | Second anomalous transmission prediction model framework (second prediction framework) |
|---|---|---|---|---|
| False negatives | 28 | 27 | 52 | 6 |

As may be seen in Table 25, the contextual analytical model compensated for many of the false negatives of the intra-transmission analytical model, increasing the recall of the anomalous transmission prediction model framework to 98.1%. Because of UNION, the number of false positive cases increased. However, considering the nature of cybersecurity, increasing 22 false positives and reducing 21 false negatives is a good trade-off.

Benchmarking

Figure 24:
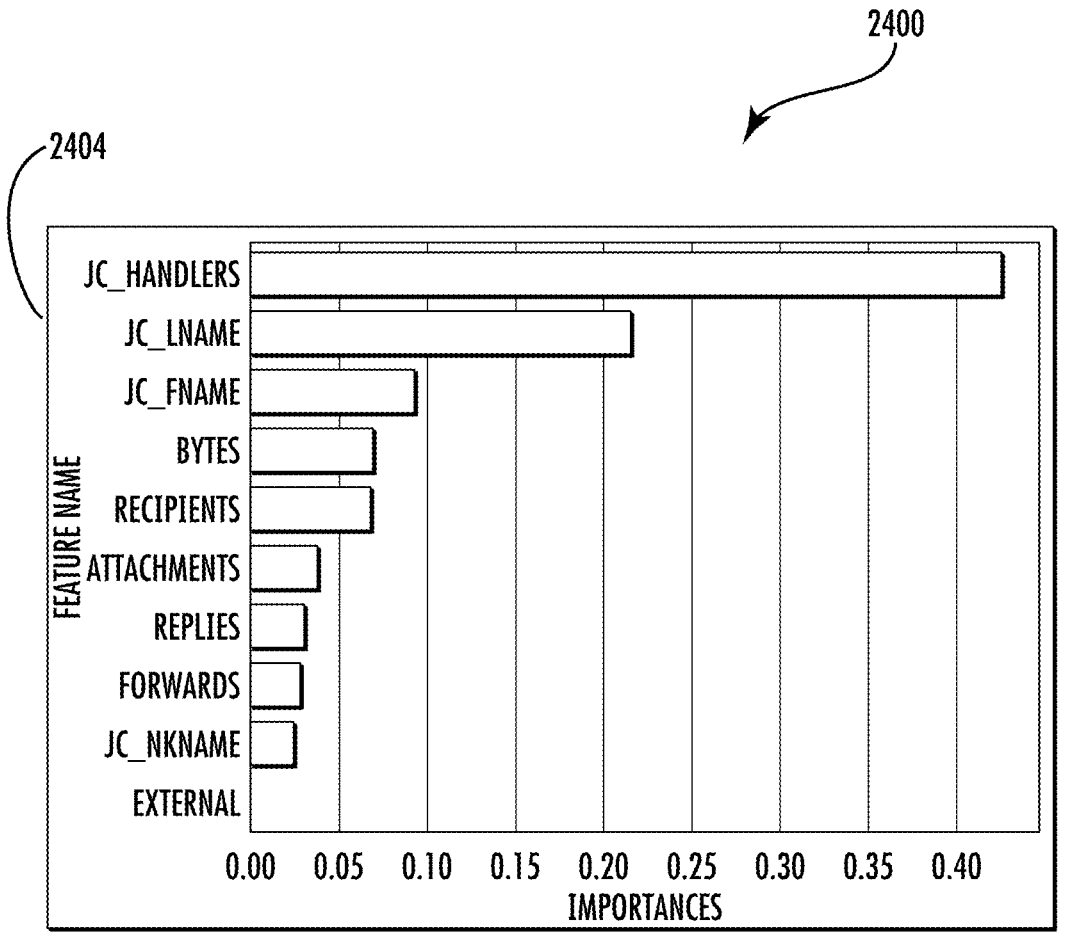
FIG. 24 illustrates a feature importance chart for an intra-transmission analytical model in accordance with an example embodiment of the present disclosure.

For the first prediction framework, a first iteration of the intra-transmission analytical model and a second iteration of the intra-transmission analytical models used features that were different. The first iteration calculated the Jaccard Similarity Score with a 3-gram base and is trained with a training data set using 10 lexical features. However, the second iteration calculated the Jaccard Similarity Score with a 5-gram base and was trained with an updated training data set using only 7 lexical features after feature selection process. The test data of benchmark was the model test data. This data was not exposed to the training and model selection process of the intra-transmission analytical model, so it was suitable data for the benchmarking. Through this benchmarking, the inventors determined how overfitted the first iteration was, and also calculated the performance improvement of the second iteration. Table 26 below shows that the second iteration increased the precision significantly while maintaining recall. This improvement was oriented from removing variables that potentially lead to overfitting. FIG. 24 illustrates feature importance chart 2400 for the first iteration. FIG. 24 confirms that some of the features 2404 of the first iteration, such as bytes and attachments, which may potentially lead to overfitting, contributed to the feature importance of the first iteration.

TABLE 26

| | First iteration of intra-transmission analytical model for first prediction framework | Second iteration intra-transmission analytical model for firs prediction framework |
|---|---|---|
| Accuracy | 95.8 | 99.4 |
| Recall | 95.9 | 95.9 |
| precision | 71 | 97.9 |
| ROC AUC | 95.8 | 97.8 |

The intra-transmission analytical model of the first prediction framework described above comprises this second iteration. As described above, the performance of the first anomalous transmission prediction model framework was measured through test data. The test data was modified to 5-gram for Jaccard similarity features, and null values of behavior features were replaced with −1.

The first and second anomalous transmission prediction model framework have almost similar assumptions. However, the second anomalous transmission prediction model framework differs in that it has better labeling quality and a large amount of data was used for training leveraging personal email of internal email users, where available. Performance data for the first anomalous transmission prediction model framework is shown in Table 27 below:

TABLE 27

| | Intra-transmission analytical model for first prediction framework | Intra-transmission analytical model for the first prediction framework plus filter | Contextual analytical model for the first prediction framework | First anomalous transmission prediction model framework (first prediction framework) |
|---|---|---|---|---|
| Test data | 600 | | | |
| Accuracy | 92.8% | 92.3% | 81.7% | 90.3% |
| Recall | 86.4% | 85.4% | 79.9% | 97.1% |
| Precision | 99.6% | 99.6% | 83.7% | 86.0% |
| False positives | 1 | 1 | 48 | 49 |
| False negatives | 42 | 45 | 62 | 9 |

With regard to intra-transmission analytical model, unlike the intra-transmission analytical model for the second prediction framework, the intra-transmission analytical model for the first prediction framework used 5-gram. Therefore, it naturally had quite high precision, but had somewhat low recall. Phone number detection filter was used with the intra-transmission analytical model for the second prediction framework to increase recall while preserving the precision, and a different filter was used with the intra-transmission analytical model for the first prediction framework. The filter was intended to increase precision by setting the classification threshold more conservatively. However, as may be seen in the test outcome, there was no effect of further increasing the already high precision, and a slight decrease in recall was observed.

With regard to contextual analytical model, the contextual analytical model for the first prediction framework shows significant low performance compared to the contextual analytical model for the second prediction framework. Even though more than 1 million data entries were used for training the contextual analytical model for the first prediction framework, the reason why its performance was lower than the contextual analytical model for the second anomalous transmission prediction model framework, which was trained with 2,400 data, was likely due to label quality. For the first prediction framework, the intra-transmission analytical model thereof was used to label the contextual analytical model development data. In other words, this shows how much the new labeling technique of the second prediction framework minimizes bias and also shows that the internal email user personal email representing true positive cases have improved the performance of the contextual analytical model of the second prediction framework.

Although the performance of the intra-transmission analytical model and the contextual analytical model of the first prediction framework could be improved, they formed a good prediction framework by complementing their blind spots. Therefore, when comparing the first and second prediction frameworks, recall increased by 1% and precision increased by 4.2% in the second prediction framework. Since the recall and precision of the first prediction framework were not significantly low, the amount of improvement in the second prediction framework seems small. However, by looking at false positives and false negatives, the extent of improvement in the second prediction framework may be clearly seen. False positives decreased by 33% from 9 to 6, and false negatives decreased by 45% from 49 to 27.

Data Assumptions and Limitations

To avoid labeling bias as much as possible, in addition to visual similarity, relational strength was considered in the labeling process. In addition, a total of 9 label outputs were created by dividing visual similarity and relational strength into 3 levels each. The model developer tried to assign accurate labels by examining the subjects of all emails. Additionally, the labeler's recall was measured by adding 200 true positive email data to the 2000 labeling data. In the second anomalous transmission prediction model framework development, labeler's recall was 95%, which is an acceptable performance. With respect to compensating controls, in the process of sampling 3,000 cases, the feature distribution of the entire population was considered to ensure that the model could be generalized well in the production.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A computer-implemented method for multi-factor digital transmission screening, the computer-implemented method comprising:

detecting an outbound digital transmission originating from a monitored enterprise management system;

applying one or more data elements associated with the outbound digital transmission to a plurality of anomalous transmission prediction models to generate predictions associated with the outbound digital transmission, the plurality of anomalous transmission prediction models comprising:

a contextual analytical model configured to generate a first prediction of the predictions associated with the outbound digital transmission based at least in part on historical digital transmission activity data based on a plurality of past digital transmissions originating from the monitored enterprise management system; and an intra-transmission analytical model configured to generate a second prediction of the predictions associated with the outbound digital transmission based at least in part on one or more of (i) one or more lexical similarity scores associated with the one or more data elements or (ii) one or more metadata features associated with the one or more data elements; and responsive to at least one of the predictions corresponding to an anomalous transmission prediction, initiating performance of one or more data exfiltration mitigation actions to mitigate risk of data theft, wherein the one or more data exfiltration mitigation actions comprise generating and storing an anomalous digital transmission flag associated with the outbound digital transmission.

2. The computer-implemented method of claim 1, wherein applying the one or more data elements associated with the outbound digital transmission to the plurality of anomalous transmission prediction models comprises:

generating a contextual analytical model data structure comprising at least a portion of the one or more data elements associated with the outbound digital transmission by executing one or more natural language processing operations with respect to the outbound digital transmission; and processing the contextual analytical model data structure, using the contextual analytical model to generate a first model output corresponding to the first prediction.

3. The computer-implemented method of claim 2, further comprising:

retrieving, from one or more training data sources associated with the monitored enterprise management system, the historical digital transmission activity data;

generating one or more contextual features based on the historical digital transmission activity data; and generating the contextual analytical model based on the one or more contextual features.

4. The computer-implemented method of claim 3, wherein processing the contextual analytical model data structure, using the contextual analytical model to generate the first model output comprises:

executing, using the contextual analytical model, one or more decision trees, wherein each decision tree of the one or more decision trees is constructed based on at least a portion of the one or more contextual features.

5. The computer-implemented method of claim 1, further comprising:

retrieving, from one more training data sources associated with the monitored enterprise management system, the plurality of past digital transmissions;

generating one or more lexical features based on the plurality of past digital transmissions; and generating the intra-transmission analytical model based on the one or more lexical features.

6. The computer-implemented method of claim 1, wherein the contextual analytical model and the intra-transmission analytical model are simultaneously executed to generate the first prediction and the second prediction.

7. The computer-implemented method of claim 1, wherein the one or more lexical similarity scores is generated by:

extracting, from a first portion of the one or more data elements associated with the outbound digital transmission, a first data string corresponding to sender handler data associated with the outbound digital transmission and second data string corresponding to recipient handler data associated with the outbound digital transmission; and executing a similarity algorithm based on the first data string and the second data string to generate a first lexical similarity score.

8. The computer-implemented method of claim 1, wherein generating the second prediction comprises:

executing, using the intra-transmission analytical model, a rules-based algorithm by iteratively analyzing the one or more lexical similarity scores and the one or more metadata features based on one or more conditions, wherein execution of the rules-based algorithm is configured for being terminated in response to determining (i) that at least a portion of the one or more lexical similarity scores or metadata features satisfies a corresponding portion of the one or more conditions or (ii) each of the one or more lexical similarity scores and metadata features has been analyzed.

9. The computer-implemented method of claim 8, further comprising:

responsive to determining that none of the one or more lexical similarity scores and the one or more metadata features satisfies the corresponding portion of the one or more conditions, executing one or more phone number-based matching operations based on (i) phone number data associated with an internal sender associated with the outbound digital transmission and (ii) internal sender handler data associated with the internal sender by iteratively comparing one or more predetermined portions of the phone number data to a corresponding portion of the internal sender handler data, wherein the executing of the one or more phone number-based matching operations is configured for being terminated in response to determining (i) that output of at least a portion of the one or more phone number-based matching operations indicates a match or (ii) each of the one or more phone number-based matching operations has been performed.

10. The computer-implemented method of claim 1, wherein the one or more data exfiltration mitigation actions further comprises transmitting data associated with the predictions to a user terminal associated with the monitored enterprise management system.

11. The computer-implemented method of claim 1, wherein the one or more data exfiltration mitigation actions further comprises triggering a suspension of sender identifier account associated with the outbound digital transmission.

12. The computer-implemented method of claim 1, wherein the outbound digital transmission comprises one or more of (i) an email message, (ii) an instant message, or (iii) a file transfer.

13. A system for multi-factor digital transmission screening, the system comprising one or more processors and at least one non-transitory memory comprising instructions that, with the one or more processors, cause the system to:

detect an outbound digital transmission originating from a monitored enterprise management system;

apply one or more data elements associated with the outbound digital transmission to a plurality of anomalous transmission prediction models to generate predictions associated with the outbound digital transmission, the plurality of anomalous transmission prediction models comprising:

a contextual analytical model configured to generate a first prediction of the predictions associated with the outbound digital transmission based at least in part on historical digital transmission activity data based on a plurality of past digital transmissions originating from the monitored enterprise management system; and an intra-transmission analytical model configured to generate a second prediction of the predictions associated with the outbound digital transmission based at least in part on one or more of (i) one or more lexical similarity scores associated with the one or more data elements or (ii) one or more metadata features associated with the one or more data elements; and responsive to at least one of the predictions corresponding to an anomalous transmission prediction, initiate performance of one or more data exfiltration mitigation actions to mitigate risk of data theft, wherein the one or more data exfiltration mitigation actions comprise generating and storing an anomalous digital transmission flag associated with the outbound digital transmission.

14. The system of claim 13, wherein the system applies the one or more data elements associated with the outbound digital transmission to the plurality of anomalous transmission prediction models by:

generating a contextual analytical model data structure comprising at least a portion of the one or more data elements associated with the outbound digital transmission by executing one or more natural language processing operations with respect to the outbound digital transmission; and processing the contextual analytical model data structure, using the contextual analytical model to generate a first model output corresponding to the first prediction.

15. The system of claim 14, wherein the system is further caused to:

retrieving, from one or more training data sources associated with the monitored enterprise management system, the historical digital transmission activity data;

generating one or more contextual features based on the historical digital transmission activity data; and generating the contextual analytical model based on the one or more contextual features.

16. The system of claim 15, wherein the system processes the contextual analytical model data structure, using the contextual analytical model to generate the first model output by:

executing, using the contextual analytical model, one or more decision trees, wherein each decision tree of the one or more decision trees is constructed based on at least a portion of the one or more contextual features.

17. An apparatus for multi-factor digital transmission screening, the apparatus comprising at least one processor and at least one memory including program code, the at least one memory and the program code configured to, with the at least one processor, cause the apparatus to at least:

detect an outbound digital transmission originating from a monitored enterprise management system;

apply one or more data elements associated with the outbound digital transmission to a plurality of anomalous transmission prediction models to generate predictions associated with the outbound digital transmission, the plurality of anomalous transmission prediction models comprising:

a contextual analytical model configured to a first prediction of the predictions associated with the outbound digital transmission based at least in part on historical digital transmission activity data based on a plurality of past digital transmissions originating from the monitored enterprise management system; and an intra-transmission analytical model configured to generate a second prediction of the predictions associated with the outbound digital transmission based at least in part on one or more of (i) one or more lexical similarity scores associated with the one or more data elements or (ii) one or more metadata features associated with the one or more data elements; and responsive to at least one of the predictions corresponding to an anomalous transmission prediction, initiate performance of one or more data exfiltration mitigation actions to mitigate risk of data theft, wherein the one or more data exfiltration mitigation actions comprise generating and storing an anomalous digital transmission flag associated with the outbound digital transmission.

* * * * *